(12) United States Patent
Kishigami et al.

(10) Patent No.: US 8,265,182 B2
(45) Date of Patent: Sep. 11, 2012

(54) RADIO TRANSMISSION DEVICE AND RADIO RECEPTION DEVICE

(75) Inventors: Takaaki Kishigami, Tokyo (JP); Shozo Okasaka, Tokyo (JP); Yutaka Murakami, Osaka (JP)

(73) Assignee: Panasonic Corporation, Osaka (JP)

( * ) Notice: Subject to any disclaimer, the term of this patent is extended or adjusted under 35 U.S.C. 154(b) by 277 days.

(21) Appl. No.: 12/532,165

(22) PCT Filed: Mar. 21, 2008

(86) PCT No.: PCT/JP2008/000677
§ 371 (c)(1),
(2), (4) Date: Sep. 20, 2009

(87) PCT Pub. No.: WO2008/129811
PCT Pub. Date: Oct. 30, 2008

(65) Prior Publication Data
US 2010/0104044 A1 Apr. 29, 2010

(30) Foreign Application Priority Data

Mar. 23, 2007 (JP) ................................. 2007-077887
Oct. 17, 2007 (JP) ................................. 2007-270647
Mar. 18, 2008 (JP) ................................. 2008-070074

(51) Int. Cl.
*H04K 1/10* (2006.01)
*H04L 27/28* (2006.01)

(52) U.S. Cl. ........ 375/260; 375/295; 370/210; 370/329; 455/45

(58) Field of Classification Search ................... 375/260, 375/299, 295; 370/210, 329; 455/45, 91
See application file for complete search history.

(56) References Cited

U.S. PATENT DOCUMENTS

| | | | |
|---|---|---|---|
| 6,992,990 B2 | 1/2006 | Sakusabe | |
| 2004/0028157 A1 | 2/2004 | Aoki | |
| 2005/0089085 A1 | 4/2005 | Sudo | |
| 2005/0163082 A1 | 7/2005 | Sudo | |
| 2007/0127593 A1* | 6/2007 | Lee et al. | 375/299 |
| 2007/0280365 A1* | 12/2007 | Seki | 375/260 |

FOREIGN PATENT DOCUMENTS

| | | |
|---|---|---|
| EP | 1 776 901 | 4/2007 |
| EP | 1 865 638 | 12/2007 |

(Continued)

OTHER PUBLICATIONS

International Search Report dated Jun. 24, 2008.

(Continued)

*Primary Examiner* — Ted Wang
(74) *Attorney, Agent, or Firm* — Dickinson Wright PLLC

(57) ABSTRACT

Provided is a radio transmission device (100) which can flexibly cope with a request for assuring an error ratio feature during a high transmission rate, a request for increasing a cell coverage, or the like. The radio transmission device (100) includes a first subcarrier modulation unit (104) which forms a first subcarrier modulation signal obtained by converting a plurality of modulation signals into a frequency region; a second subcarrier modulation unit (105) which forms a second subcarrier modulation signal obtained by parallel conversion of a plurality of signals; an IFFT unit (111) which forms an OFDM signal by performing inverse Fourier transform on the first and the second subcarrier modulation signal; and a subcarrier mapping unit (110) which controls allocation of the first and the second subcarrier modulation signals.

20 Claims, 50 Drawing Sheets

FOREIGN PATENT DOCUMENTS

| | | |
|---|---|---|
| JP | 07-321765 | 12/1995 |
| JP | 2000-123000 | 4/2000 |
| JP | 2002-033714 | 1/2002 |
| JP | 2003-273837 | 9/2003 |
| JP | 2004-088268 | 3/2004 |
| JP | 2005-006035 | 1/2005 |
| JP | 2005-286508 | 10/2005 |
| JP | 2006-287895 | 10/2006 |
| WO | 2006/011524 | 2/2006 |
| WO | 2006/109492 | 10/2006 |

OTHER PUBLICATIONS

NTT DoCoMo et al., "DFT-spread OFDM with Pulse Shaping Filter in Frequency Domain in Evolved UTRA Uplink," 3GPP TSG RAN WG1 #42 on LTE, R1-050702, Sep. 2005, pp. 1-8.

Weinstein, S.B. and P.M. Ebert, "Data Transmission by Frequency-Division Multiplexing Using the Discrete Fourier Transform," IEEE vol. com-19, No. 5, Oct. 1971, pp. 628-634, p. 2, line 16.

Lin, S. and P. Yu, "A Hybrid ARQ Scheme with Parity Retransmission for Error Control of Satellite Channels," IEEE vol. com-30, No. 7, Jul. 1982, pp. 1701-1719, p. 2, line 20.

Chase, D., "Code Combining—a Maximum-Likelihood Decoding Approach for Combining an Arbitrary Number of Noisy Packets," IEEE vol. com-33, No. 5, May 1985, pp. 385-393, p. 2, line 23.

Hagenauer, J., "Rate-Compatible Punctured Convolutional Codes (RCPC Codes) and their Applications," IEEE vol. 36, No. 4, Apr. 1988, pp. 389-400, p. 2, line 27.

"Physical Layer Aspects for evolved Universal Terrestrial Radio Access (UTRA)," 3GPP TR 25.814 v7.1.0, Sep. 2006, 132 pages, p. 2, line 30.

"Multiplexing and channel coding (FDD)," 3GPP TS 25.212 v7.3.0, Dec. 2006, 84 pages, p. 2, line 32.

Mitsubishi Electric Corporation, "Rate Compatible LDPC codes with low complexity encoder & decoder," 3GPP TSG RAN WG1 # 42bis, R1-051167, Oct. 2005, 22 pages, p. 2, line 34.

Japanese Office Action dated Jun. 26, 2012.

\* cited by examiner

FIG.18A (TRANSMISSION UNIT 1)
FIG.18B (TRANSMISSION UNIT 2)

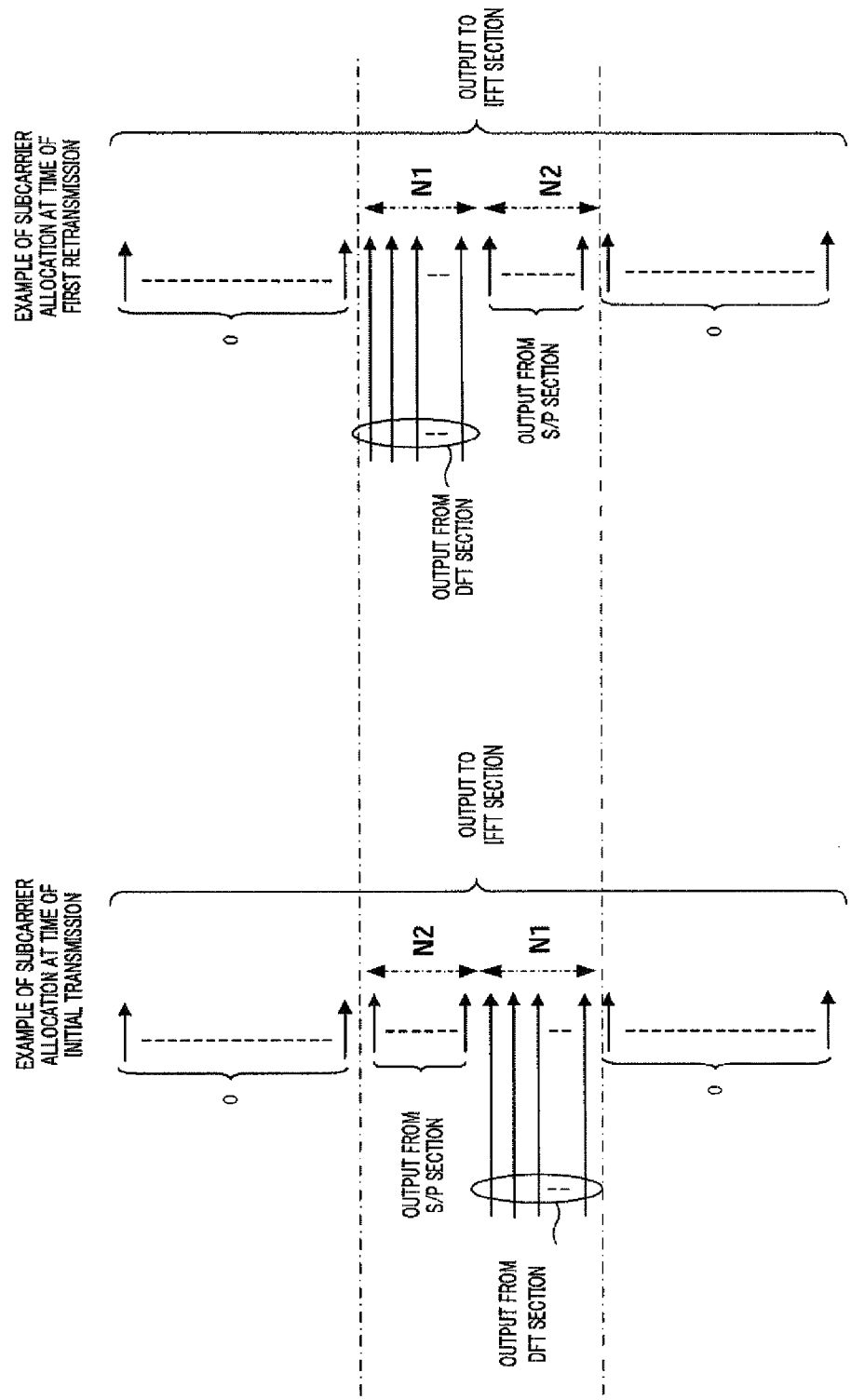

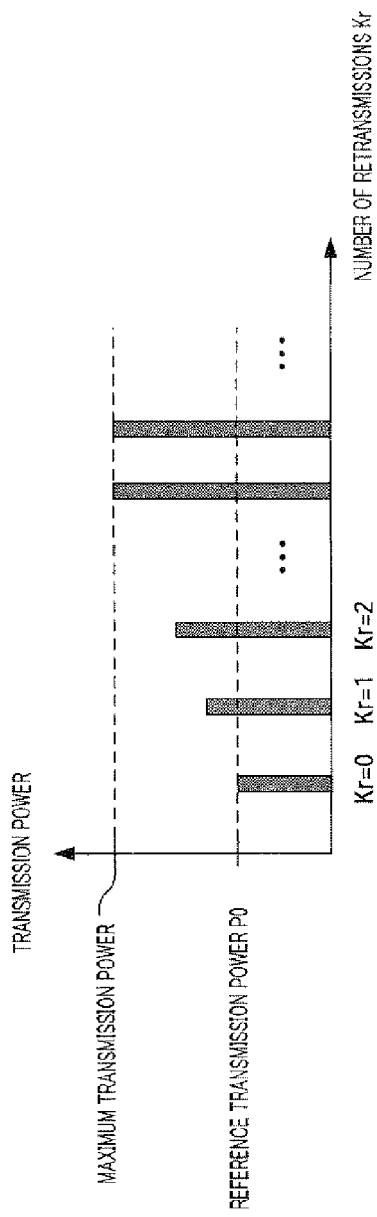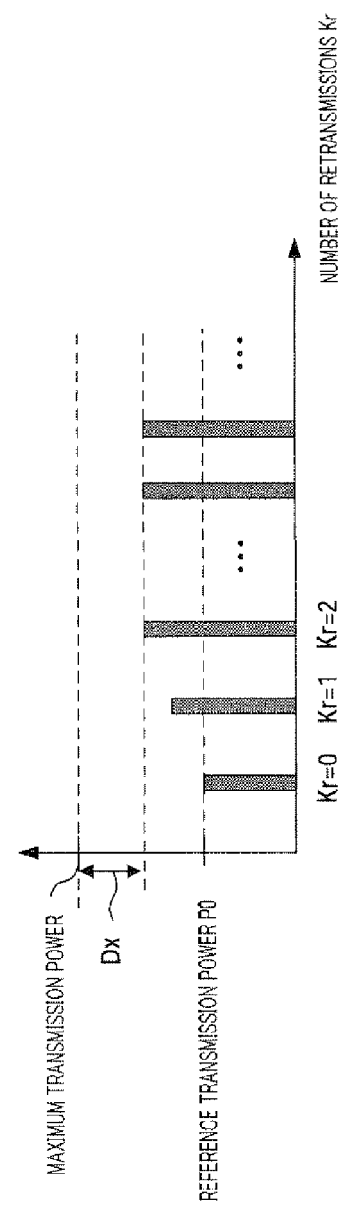
FIG.42A
FIG.42B

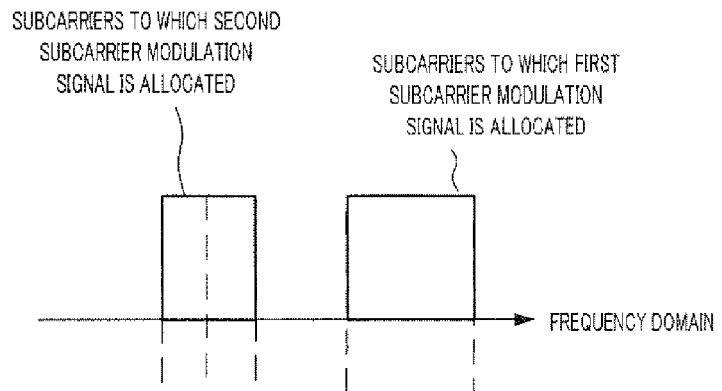
FIG.50A
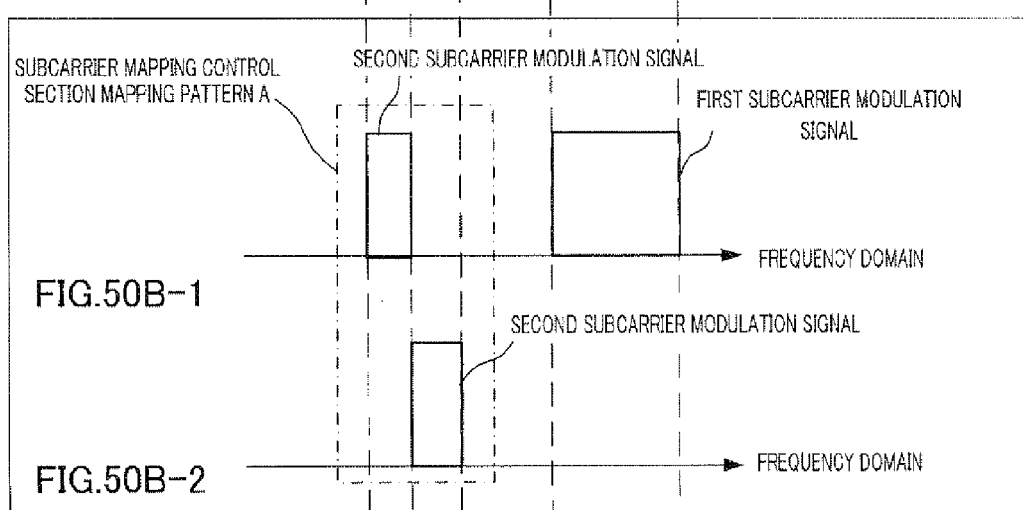
FIG.50B-1
FIG.50B-2
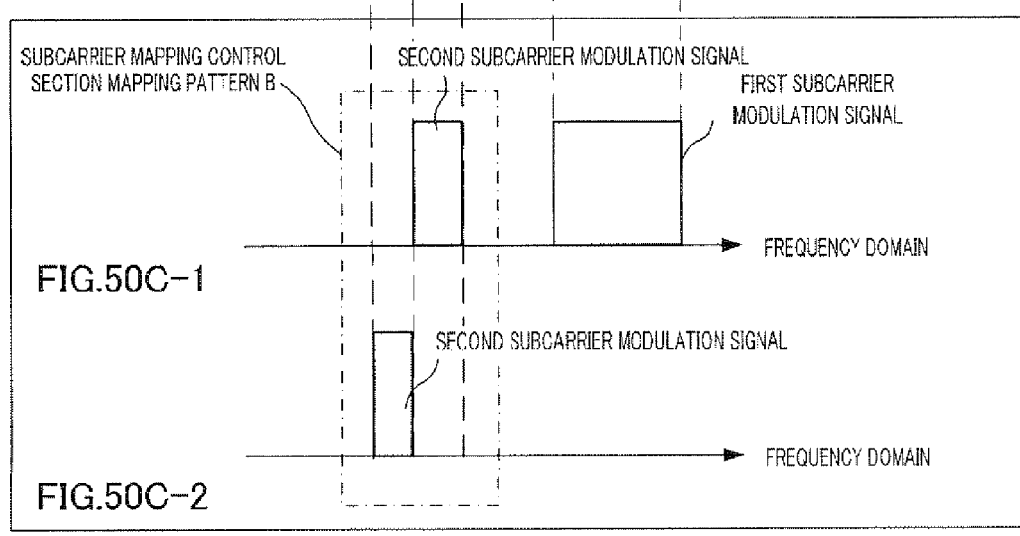
FIG.50C-1
FIG.50C-2

RADIO TRANSMISSION DEVICE AND RADIO RECEPTION DEVICE

TECHNICAL FIELD

The present invention relates to a radio transmitting apparatus using a layered modulation technology, and a radio receiving apparatus that receives a signal thereof.

BACKGROUND ART

In radio communication, layered modulation generally comprises a method whereby layering is achieved through combination with error correction or suchlike encoding, or a method whereby layering is achieved by modulation that physically places an information signal on a carrier separately from encoding.

The method disclosed in Patent Document 1 is an example of the latter type of layered modulation method. With the layered modulation method disclosed in Patent Document 1, a band for OFDM transmission is divided into a plurality of frequency blocks, carrier modulation is performed on each frequency block using a different modulation method, and OFDM modulation is performed via a combining circuit.

Specifically, an example of a conventional radio transmitting apparatus using the layered modulation method disclosed in Patent Document 1 will be described using FIG. 1 and FIG. 2. As shown in FIG. 1, transmitting apparatus 10 has switch 11, plurality of encoding sections 12-1 through 12-3, plurality of carrier modulation sections 13-1 through 13-3, combining circuit 14, IFFT (Inverse Fast Fourier Transform) section 15, and control information synchronization circuit 16.

Switch 11 sends transmission data to one of plurality of encoding sections 12-1 through 12-3. Plurality of encoding sections 12-1 through 12-3 encode transmission data using different encoding methods (for example, different coding rates). Plurality of carrier modulation sections 13-1 through 13-3 modulate encoded data using different modulation methods (for example, different M-ary modulation values).

Combining circuit 14 allocates subcarrier modulation signals S1, S2, and S3 output from carrier modulation sections 13-1 through 13-3 to corresponding frequency blocks. IFFT section 15 generates an OFDM signal by executing an IFFT on combining circuit 14 output and control information synchronization circuit 16 output. Control information synchronization circuit 16 outputs frequency block allocation information and a pilot signal.

FIG. 2 illustrates frequency block allocation by transmitting apparatus 10. Subcarrier modulation signal S1 output from carrier modulation section 13-1 is transmitted allocated to frequency block BL1 comprising a plurality of subcarriers. Similarly, subcarrier modulation signal S2 is transmitted allocated to frequency block BL2, and subcarrier modulation signal S3 is transmitted allocated to frequency block BL3.

In transmitting apparatus 10, changing the modulation method allocation to a frequency block for each OFDM symbol enables bit error rate degradation to be minimized even if only a specific frequency within the transmission band is greatly affected by multipath interference.

Patent Document 1: Japanese Patent Application Laid-Open No. HEI 7-321765

Non-Patent Document 1: S. B. Weinstein and P. M. Ebert, "Data Transmission by frequency-division multiplexing using the discrete fourier transform," IEEE Trans. Commun. Technol., Vol. COM-19, pp. 624-634, October. 1971

Non-Patent Document 2: S. Lin and P. Yu, "A Hybrid ARQ Scheme with Parity Retransmission for Error Control of Satellite Channels," IEEE Trans. Commun., vol. 30, no. 7, pp. 1701-1719, July 1982

Non-Patent Document 3: D. Chase, "Code combining—a maximum-likelihood decoding approach for combining an arbitrary number of noisy packets," IEEE Trans. Commun., vol. 33, no. 5, pp. 385-393, May 1985

Non-Patent Document 4: J. Hagenauer, "Rate-compatible punctured convolutional codes (RCPC codes) and their applications," IEEE Trans. Commun., vol. 36, no. 4, pp. 389-400, April 1988

Non-Patent Document 5: 3GPP TR 25.814 Physical Layer Aspects for Evolved Universal Terrestrial Radio Access v7.1.0

Non-Patent Document 6: 3GPP TS 25.212 Multiplexing and channel coding (FDD) v7.3.0

Non-Patent Document 7: 3GPP TSG RAN WG1 #42 R1-051167 Rate-compatible LDPC codes with low complexity encoder & decoder, San Diego, US, October, 2005

DISCLOSURE OF INVENTION

Problems to be Solved by the Invention

The use of a 4 GHz to 5 GHz carrier frequency band, higher than heretofore, has been investigated for next-generation mobile communication systems.

When a high carrier frequency band is used, distance decay increases, and consequently securing cell coverage becomes a problem.

Here, in a radio transmitting apparatus, a PAPR (Peak to average power ratio) stipulates the transmission power of the transmitting apparatus. Also, when using the same transmitting amplifier, a radio communication apparatus can achieve higher transmission power by means of an access method with a small PAPR than by means of an access method with a large PAPR.

However, with a conventional layered modulation method the PAPR is not considered, and as a result, cell coverage decreases. Consequently, a drawback of constructing a cellular system using a conventional method is the necessity of installing a large number of base station apparatuses, resulting in increased installation costs and running costs.

It is an object of the present invention to provide a radio transmitting apparatus and radio receiving apparatus that can flexibly respond to a demand for securement of an error rate characteristic when using a high transmission rate, and for an increase in cell coverage.

Means for Solving the Problem

One aspect of a radio transmitting apparatus of the present invention is a radio transmitting apparatus that transmits a layered-modulated OFDM signal, and employs a configuration having: a first subcarrier modulation section that forms a first subcarrier modulation signal obtained by converting a plurality of modulation signals to the frequency domain; a second subcarrier modulation section that forms a second subcarrier modulation signal obtained by parallel conversion of a plurality of modulation signals; an inverse Fourier transform section that forms an OFDM signal by performing an inverse Fourier transform on the first and second subcarrier modulation signals; and a subcarrier mapping section that is provided ahead of the inverse Fourier transform section and controls allocation of the first and second subcarrier modulation signals to a plurality of subcarriers forming the OFDM signal.

According to this configuration, an OFDM signal can be formed for which the PAPR is reduced compared with a conventional layered-modulated OFDM signal. By this means, low power consumption and effective transmission power of a radio transmitting apparatus can be improved. Also, using a first subcarrier modulation signal and second subcarrier modulation signal makes more flexible frequency resource allocation possible. Specifically, only limited methods (localized placement or distributed placement) can be used for the first subcarrier modulation signal since the PAPR is reduced, but there are no constraints on subcarrier mapping for the second subcarrier modulation signal. As a result, PAPR reduction is possible for subcarrier modulation signals overall without impairing flexibility of frequency resource allocation.

One aspect of a radio receiving apparatus of the present invention is a radio receiving apparatus that receives an OFDM signal formed by performing an inverse Fourier transform of a signal including a first subcarrier modulation signal obtained by converting a plurality of modulation signals to the frequency domain, and a second subcarrier modulation signal obtained by parallel conversion of a plurality of modulation signals, and that employs a configuration having: a Fourier transform section that obtains the first and second subcarrier modulation signals by performing a Fourier transform of the OFDM signal; a first demodulation section that performs conversion to the time domain and demodulation of the first subcarrier modulation signal; a second demodulation section that performs serial conversion and demodulation of the second subcarrier modulation signal; and a decoding section that makes the likelihood of a demodulation result of the second demodulation section higher than the likelihood of a demodulation result of the second demodulation section, and performs error correction decoding of demodulation results of the first and second demodulation sections.

One aspect of a radio transmitting apparatus of the present invention employs a configuration further having: a retransmission request detection section that detects a retransmission request reported from a receiving apparatus, and a number of retransmission requests that is a number of times the retransmission request has been reported; and a subcarrier allocation control section that variably controls allocation to and placement on the plurality of subcarriers of the first and second subcarrier modulation signals by the subcarrier mapping section according to the number of retransmission requests.

ADVANTAGEOUS EFFECTS OF INVENTION

According to the present invention, a radio transmitting apparatus and radio receiving apparatus can be implemented that can flexibly respond to a demand for securement of an error rate characteristic when using a high transmission rate, and for an increase in cell coverage.

BRIEF DESCRIPTION OF DRAWINGS

FIG. 4 is a drawing showing the nature of subcarrier allocation of first and second subcarrier modulation signals, in which FIG. 4A shows an example of subcarrier allocation when localized placement is performed, and FIG. 4B shows an example of subcarrier allocation when distributed placement is performed;

FIG. 17 is a drawing showing examples of subcarrier allocation in the case of localized placement of a first subcarrier modulation signal, in which FIG. 17A shows antenna 1 subcarrier allocation, and FIG. 17B shows antenna 2 subcarrier allocation;

FIG. 18 is a drawing showing examples of subcarrier allocation in the ease of distributed placement of a first subcarrier modulation signal, in which FIG. 18A shows antenna 1 subcarrier allocation, and FIG. 18B shows antenna 2 subcarrier allocation;

FIG. 30 is a drawing showing examples of subcarrier allocation, in which FIG. 30A shows an example of subcarrier allocation at the time of an initial transmission, and FIG. 30B shows an example of subcarrier allocation at the time of a first retransmission;

FIG. 31 is a drawing showing examples of per-retransmission subcarrier allocation, in which

FIG. 32 is a drawing showing examples of frequency resource allocation corresponding to "Method 1" of Embodiment 6, in which

FIG. 33 is a drawing showing examples of frequency resource allocation corresponding to "Method 2" of Embodiment 6, in which

FIG. 42 is a drawing showing examples of transmission power control by a transmitting apparatus of Embodiment 10, in which FIG. 42A shows transmission power control when using a modulation method for which robustness against residual multipath interference is good, and FIG. 42B shows transmission power control when using a modulation method for which robustness against residual multipath interference is poor;

FIG. 45 is a drawing showing examples of the nature of subcarrier modulation signal mapping according to Embodiment 11, in which

FIG. 48 is a drawing showing examples of the nature of subcarrier modulation signal mapping according to Embodiment 12, in which

FIG. 50 is a drawing showing examples of the nature of subcarrier modulation signal mapping according to Embodiment 13, in which FIG. 50A shows a result of frequency domain allocation by subcarrier allocation control section 124, FIG. 50B-1 shows subcarrier signals input to IFFT section 111a when the subcarrier mapping control section 2601 mapping pattern is A, FIG. 50B-2 shows subcarrier signals input to IFFT section 111d when the subcarrier mapping control section 2601 mapping pattern is A, FIG. 50C-1 shows subcarrier signals input to IFFT section 111a when the subcarrier mapping control section 2601 mapping pattern is B, and FIG. 50C-2 shows subcarrier signals input to IFFT section 111d when the subcarrier mapping control section 2601 mapping pattern is B;

BEST MODE FOR CARRYING OUT THE INVENTION

Now, embodiments of the present invention will be described in detail with reference to the accompanying drawings.

(Embodiment 1)

Figure 3:
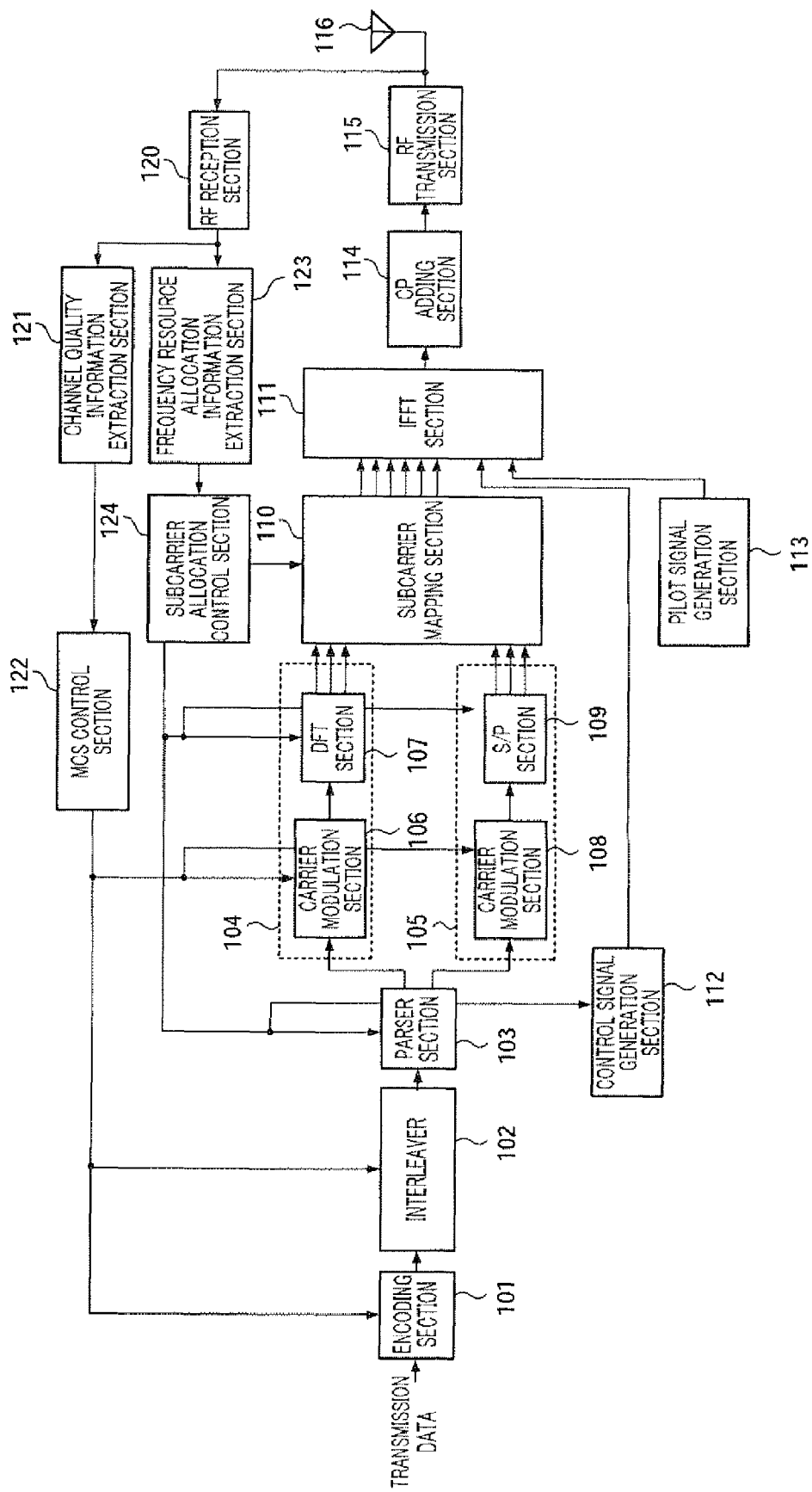
FIG. 3 is a block diagram showing a configuration of a transmitting apparatus according to Embodiment 1 of the present invention.

FIG. 3 shows a configuration of a transmitting apparatus according to Embodiment 1 of the present invention. Transmitting apparatus 100 is provided in a terminal, and performs uplink transmission.

In transmitting apparatus 100, transmission data is input to encoding section 101. Encoding section 101 performs error correction encoding of a transmission data sequence using a coding rate specified by MCS (adaptive Modulation and Coding Scheme) control section 122. Interleaver 102 performs interleaving of an encoded bit sequence using a predetermined interleave pattern.

Based on distribution information from subcarrier allocation control section 124, parser section 103 outputs an input bit sequence to either first subcarrier modulation section 104 or second subcarrier modulation section 105. In other words, parser section 103 distributes an input bit sequence to first subcarrier modulation section 104 and second subcarrier modulation section 105 based on distribution information.

First subcarrier modulation section 104 has carrier modulation section 106 and DFT (Discrete Fourier Transform) section 107. Carrier modulation section 106 modulates an input bit sequence using a modulation method (M-ary modulation value) based on modulation method information from MCS control section 122. By this means, a symbol data sequence mapped to a symbol with an M-ary modulation value in accordance with modulation method information is output from carrier modulation section 104.

When subcarrier distribution to first subcarrier modulation section 104 is N1 units, DFT section 107 takes N1 units of symbol data as one block and converts a plurality of modulation signals to the frequency domain by DFT processing, and outputs a post-processing signal to subcarrier mapping section 110. Below, a signal output from first subcarrier modulation section 104 may also be referred to as a first subcarrier modulation signal.

Second subcarrier modulation section 105 has carrier modulation section 108 and S/P (serial/parallel conversion) section 109. Carrier modulation section 108 modulates an input bit sequence using a modulation method (M-ary modulation value) based on modulation method information from MCS control section 122. By this means, a symbol data sequence mapped to a symbol with an M-ary modulation value in accordance with modulation method information is output from carrier modulation section 108. Here, if modulation method information different from modulation method information input to carrier modulation section 106 is input to carrier modulation section 108, carrier modulation section 108 performs modulation using a different modulation method from that of carrier modulation section 106.

When subcarrier distribution to second subcarrier modulation section 105 is N2 units, S/P section 109 takes N2 units of symbol data as one block, converts this to parallel data, and outputs the parallel data to subcarrier mapping section 110. Below, a signal output from second subcarrier modulation section 105 may also be referred to as a second subcarrier modulation signal.

Subcarrier mapping section 110 places first subcarrier modulation section 104 output and second subcarrier modulation section 105 output respectively on subcarriers based on control information from subcarrier allocation control section 124, and outputs the resulting output to IFFT section 111.

Figure 4:
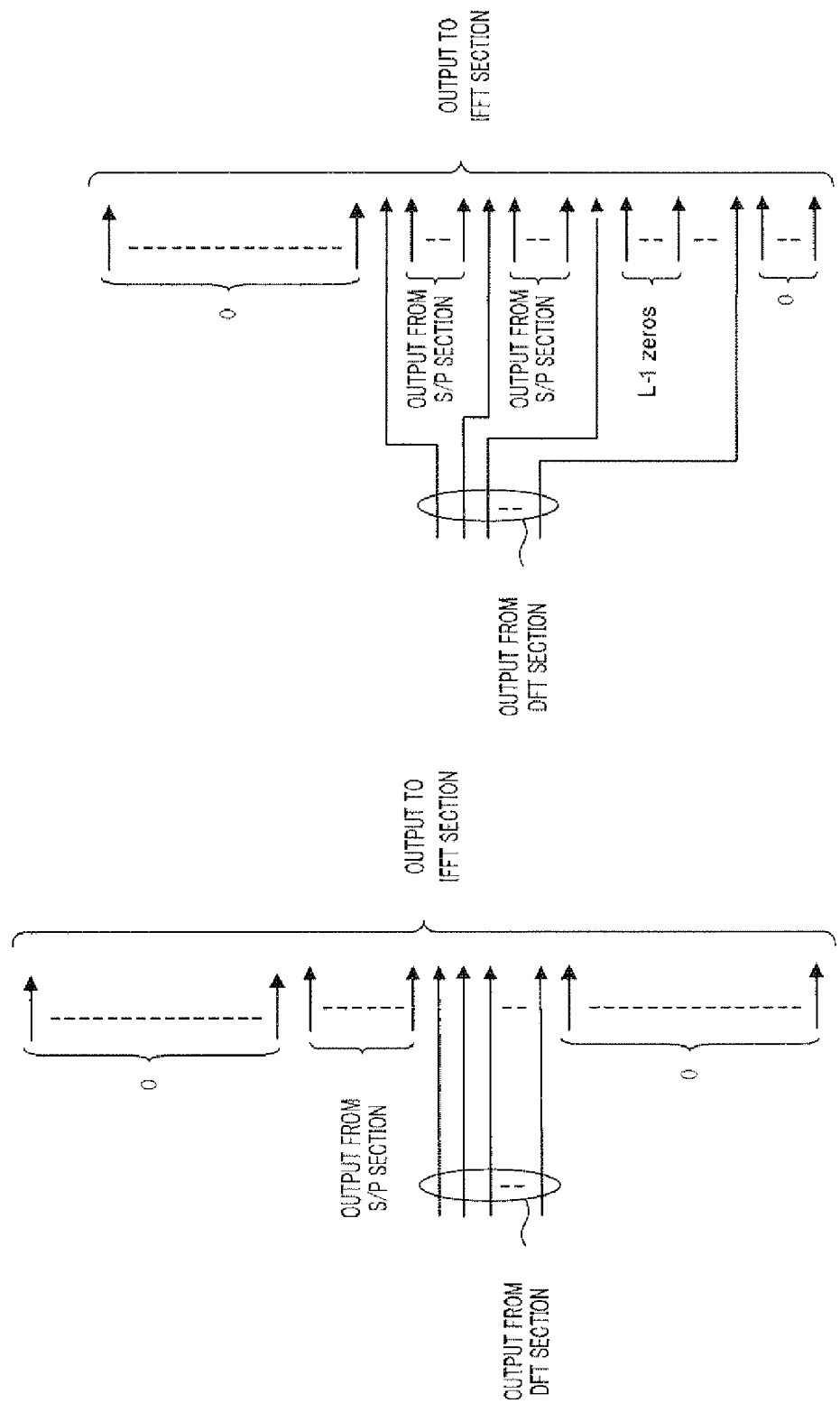

FIG. 4 shows the nature of subcarrier allocation by subcarrier allocation control section 124. FIG. 4A shows a case in which output from DFT section 107 is placed on subcarriers in a localized manner (hereinafter referred to as localized placement), and FIG. 4B shows a case in which output from DFT section 107 is placed on subcarriers in a distributed manner (hereinafter referred to as distributed placement).

It is preferable for subcarrier allocation control section 124 to place first and second subcarrier modulation section 104 and 105 output on subcarriers based on frequency resource allocation information while satisfying the relationships described in 1) and 2) below.

1) The number of subcarriers to which second subcarrier modulation section 105 output is allocated should be less than or equal to the number of subcarriers to which first subcarrier modulation section 104 output is allocated. This enables the PAPR to be reduced.

2) For subcarriers to which first subcarrier modulation section 104 output is allocated, consecutive subcarriers should be allocated (localized placement), or equally-spaced subcarriers should be used (distributed placement). FIG. 4B shows distributed placement using L equally-spaced subcarriers.

Incidentally, transmission of a control signal such as frequency resource allocation information may be performed using a predetermined method (first subcarrier modulation section 104 or second subcarrier modulation section 105). If this is done, it is not necessary to report which subcarrier modulation signal the control signal has been allocated to, enabling overhead to be reduced correspondingly. In FIG. 3, a control signal generation section 112 signal is input directly to IFFT section 111, but if the above-described processing is performed, a control signal generation section 112 signal can be input to first subcarrier modulation section 104 or second subcarrier modulation section 105.

In addition to a data signal from subcarrier mapping section 110, a control signal from control signal generation section 112 and a pilot signal from pilot signal generation section 113 are also input to IFFT section 111, and IFFT section 111 performs Ns-unit-size IFFT processing on these. CP adding section 114 adds a CP (Cyclic Prefix) to an IFFT section 111 output signal. RF transmission section 115 executes predetermined radio transmission processing such as up-conversion and transmission power control on a signal output from CP adding section 114, and sends a post-processing signal to antenna 116.

Next, the reception system of transmitting apparatus 100 will be described.

A signal received by antenna 116 undergoes predetermined radio reception processing such as amplification processing and down-conversion by RF reception section 120, and is then sent to channel quality information extraction section 121 and frequency resource allocation information extraction section 123.

Channel quality information extraction section 121 extracts channel quality information measured by a receiving apparatus of a communicating station (in this embodiment, a base station) and transmitted from that communicating station. That is to say, transmitting apparatus 100 extracts channel quality information when receiving a transmitted signal, and sends this to MCS control section 122. Based on the channel quality information, MCS control section 122 decides a coding rate of encoding section 101, an M-ary modulation value of carrier modulation sections 106 and 108, and so forth.

Frequency resource allocation information extraction section 123 extracts frequency resource allocation information included in a received signal transmitted from the communicating station. Frequency resource allocation information includes information indicating which subcarrier modulation signals should be placed on which subcarriers in the transmission band by transmitting apparatus 100 when transmitting.

Based on the frequency resource allocation information, subcarrier allocation control section 124 decides subcarrier distribution and subcarrier placement to be used by first subcarrier modulation section 104 and second subcarrier modulation section 105 output, and outputs the decision results to parser section 103 and subcarrier mapping section 110.

Figure 5:
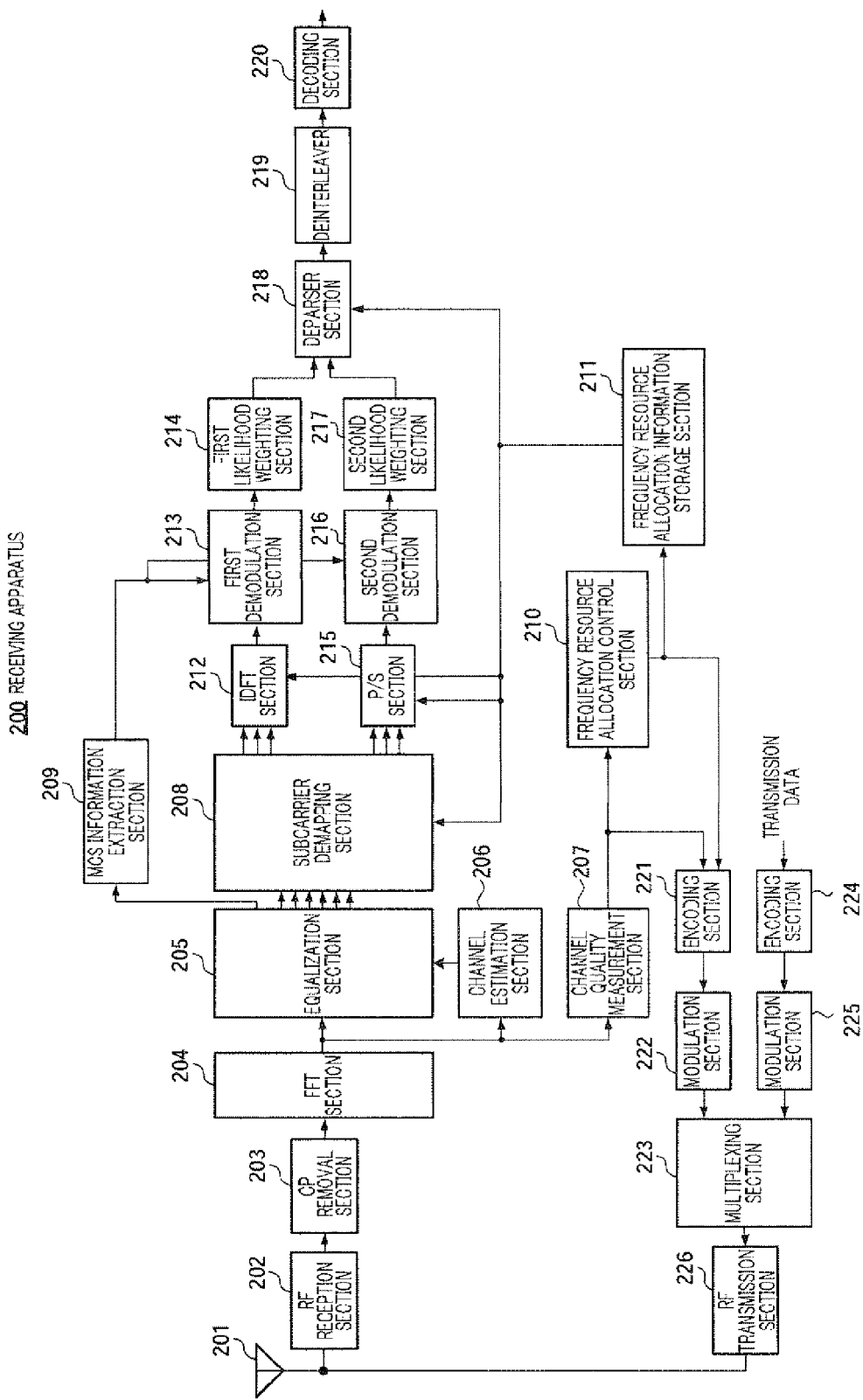
FIG. 5 is a block diagram showing a configuration of a receiving apparatus of Embodiment 1.

FIG. 5 shows a configuration of a receiving apparatus of this embodiment. Receiving apparatus 200 is provided in a base station, and receives and demodulates a signal transmitted from transmitting apparatus 100.

In receiving apparatus 200, predetermined radio reception processing such as amplification processing and down-conversion is executed by RF reception section 202 on a signal received by antenna 201, and a signal from which the CP has been removed by CP removal section 203 is input to FFT section 204. FFT section 204 executes FFT processing on the input signal, and sends a post-processing signal to equalization section 205, channel estimation section 206, and channel quality measurement section 207.

Using a per-subcarrier channel estimate value estimated by channel estimation section 206, equalization section 205 performs equalization using a ZF (Zero Forcing) standard or MMSE (Minimum Mean Squared Error) standard. Equalization section 205 can also perform frequency domain equalization by means of an MMSE standard on a subcarrier to which a first subcarrier modulation signal has been allocated. Furthermore, equalization section 205 can also perform frequency domain equalization by means of a ZF standard on a subcarrier to which a second subcarrier modulation signal has been allocated. As described above, provision may also be made for equalization section 205 to switch its equalization method according to which subcarrier modulation signal is being handled. Equalization section 205 output is sent to subcarrier mapping section 208 and MCS information extraction section 209.

Channel quality measurement section 207 measures per-subcarrier channel quality, and sends the measurement results to frequency resource allocation control section 210 and encoding section 221.

Based on per-subcarrier channel quality, frequency resource allocation control section 210 controls which of first and second subcarrier modulation section 104 and 105 outputs is allocated to which subcarriers. That is to say, frequency allocation information decided by frequency resource allocation control section 210 is transmitted to transmitting apparatus 100 via encoding section 221, modulation section 222, multiplexing section 223, RF transmission section 226, and antenna 201, and in transmitting apparatus 100, which subcarriers first and second subcarrier modulation section 104 and 105 output is allocated to is controlled based on this frequency allocation information. Frequency resource allocation information is stored in frequency resource allocation information storage section 211.

Receiving apparatus 200 transmits transmission data to transmitting apparatus 100 via encoding section 224, modulation section 225, multiplexing section 223, RF transmission section 226, and antenna 201.

Based on frequency resource allocation information, subcarrier mapping section 208 outputs a subcarrier group to which a first subcarrier modulation signal is allocated to IDFT section 212. On the other hand, subcarrier mapping section 208 outputs a subcarrier group to which a second subcarrier modulation signal is allocated to P/S conversion section 215.

When N1 subcarrier signals are included in an input signal based on frequency resource allocation information, IDFT section 212 performs an IDFT using an N1-unit size.

When N2 subcarrier signals are included in an input signal based on frequency resource allocation information, P/S section 215 performs parallel/serial conversion using an N2-unit size.

First and second demodulation sections 213 and 216 each perform symbol mapping processing in accordance with modulation method information from MCS information extraction section 209 on an input modulation symbol sequence, and calculate per-bit soft decision likelihood values.

Here, MCS settings by carrier modulation sections 106 and 108 for a first subcarrier modulation signal and second subcarrier modulation signal can be decided based on a first subcarrier modulation signal reception characteristic. That is to say, an M-ary modulation value and coding rate that satisfy a predetermined error rate are decided based on a characteristic comprising an error rate characteristic (BER, PER, or the like) with respect to reception quality (SIR, CIR, or the like) in a first subcarrier modulation signal in an AWGN (additive white Gaussian noise (thermal noise)) environment.

In such a case, a received signal corresponding to a first subcarrier modulation signal is susceptible to the influence of multipath interference due to the influence of channel estimation error or the like, and its reception characteristics are prone to degradation. In particular, the larger the M-ary modulation value of a received signal corresponding to a first subcarrier modulation signal, the greater is the susceptibility of that received signal. Consequently, if the reception characteristics of first and second subcarrier modulation signals are compared when channel quality is of the same level for both and the same M-ary modulation value is used for both, there is a high probability of second subcarrier modulation signal reception characteristics being better than first subcarrier modulation signal reception characteristics.

First and second likelihood weighting sections 214 and 217 utilize this property in performing weighting on soft decision likelihood values output by first and second demodulation sections 213 and 216. That is to say, second likelihood weighting section 217 multiplies a soft decision likelihood value output by second demodulation section 216 by weighting coefficient c that increases reliability, where $\alpha > 1$. Or again, first likelihood weighting section 214 multiplies a soft decision likelihood value output by first demodulation section 213 by weighting coefficient $\beta$ that lowers reliability, where $\beta > 1$. That is to say, the weighting coefficient of first likelihood weighting section 214 is made smaller than the weighting coefficient of second likelihood weighting section 217. By performing this kind of likelihood weighting, first subcarrier modulation signal reception characteristics can be improved by performing error correction decoding processing.

Based on frequency resource allocation information, deparser section 218 makes output from first and second likelihood weighting sections 214 and 217 a serial signal by performing processing that is the reverse of the distribution processing of parser section 103 in transmitting apparatus 100. Deparser section 218 output is made received data by being deinterleaved by deinterleaver 219 and undergoing error correction decoding processing by decoding section 220.

Figure 6:
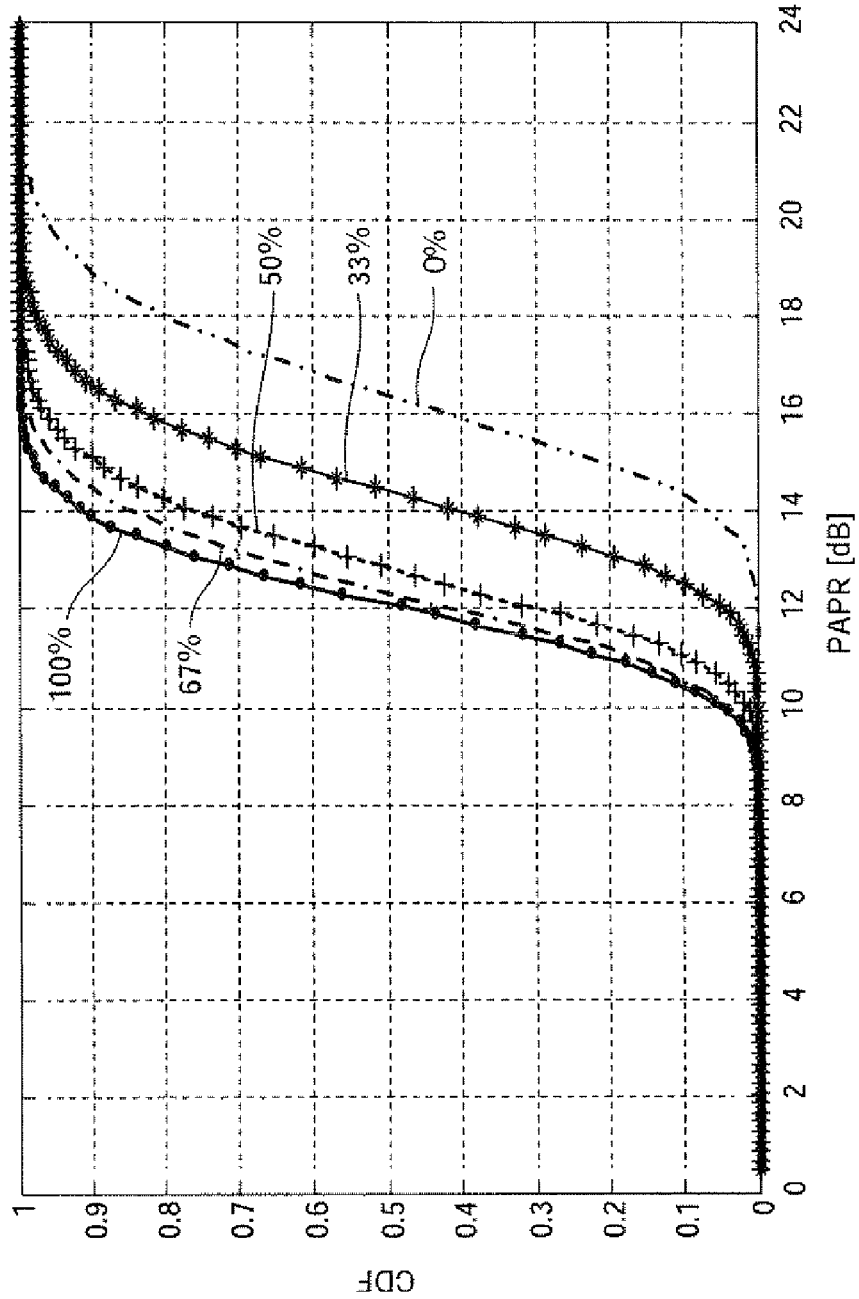
FIG. 6 is a drawing showing PAPR cumulative probability distribution when the proportion of a first subcarrier modulation signal is changed.

FIG. 6 shows PAPR cumulative probability distribution when the proportion of a first subcarrier modulation signal is changed. The horizontal axis in FIG. 6 indicates the PAPR, and the vertical axis indicates cumulative probability distribution (the cumulative distribution function: CDF). FIG. 6 shows simulation results when the modulation method is QPSK and an RB (Resource Block) comprises 12 subcarriers. From FIG. 6, it can be seen that the PAPR can be made extremely small if the proportion of a first subcarrier modulation signal is set to 50 [%] or above.

Figure 7A:
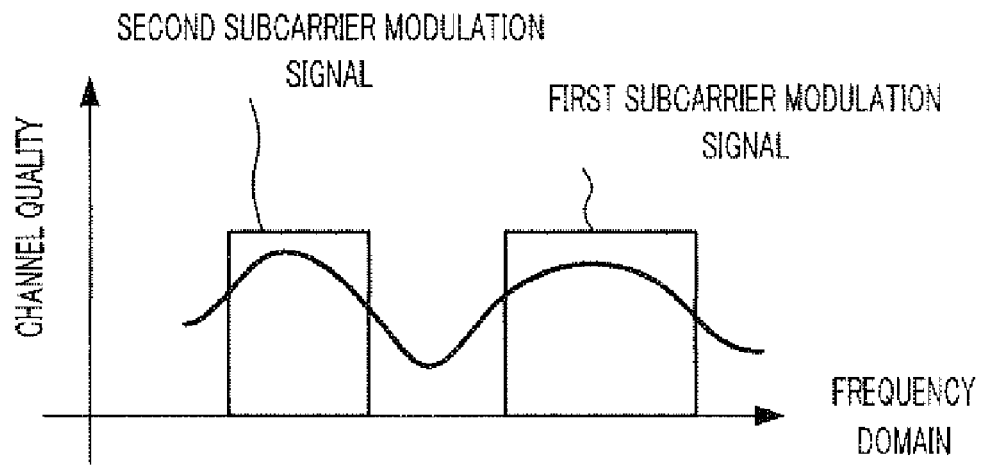
FIG. 7A is a drawing showing an example of frequency resource allocation of this embodiment.
Figure 7B:
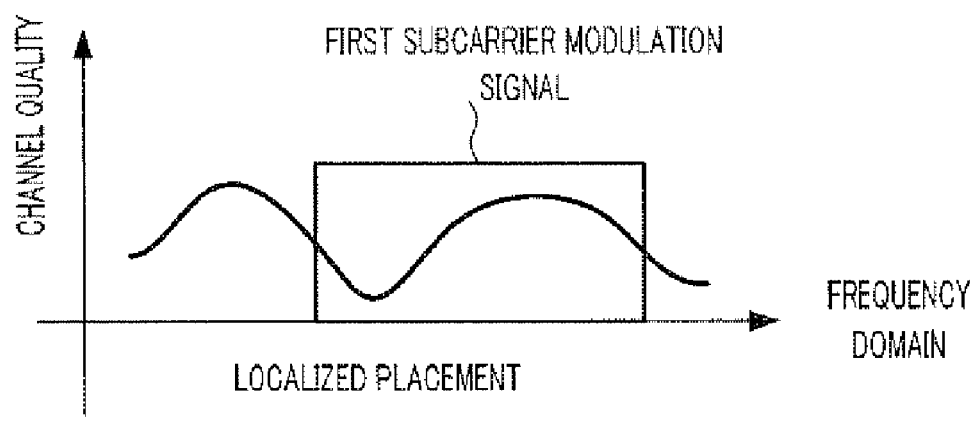
FIG. 7B is a drawing showing an example of conventional frequency resource allocation.

FIG. 7 shows comparative examples of frequency resource allocation of this embodiment (FIG. 7A) and conventional frequency resource allocation (FIG. 7B). FIG. 7B shows an example of conventional allocation in which only a first subcarrier modulation signal is subjected to localized placement. From FIG. 7B it can be seen that, although an increase in the PAPR is suppressed with only a first subcarrier modulation signal, performing resource allocation whereby optimal quality is obtained is difficult since subcarrier placement is restricted.

That is to say, it can be seen from FIG. 7B that, although an increase in the PAPR can be suppressed, performing resource allocation whereby optimal quality is obtained is difficult because of the first subcarrier modulation signal subcarrier placement restriction.

In contrast, in this embodiment, as shown in FIG. 7A, first and second subcarrier modulation signals are used, enabling flexible and favorable frequency allocation to be achieved. That is to say, it is possible to perform resource allocation whereby optimal quality is obtained while suppressing the PAPR.

Examples of first and second subcarrier modulation signal subcarrier allocation methods that can be used here are described in 1) and 2) below. Use of the following methods enables frequency resource allocation to be performed that takes the QoS of transmission data into consideration.

1) Quality prioritization: A first subcarrier modulation signal is allocated preferentially to subcarriers with good channel quality, and a second subcarrier modulation signal is allocated to the remaining subcarriers.

2) Rate prioritization: A second subcarrier modulation signal is allocated preferentially to subcarriers with good channel quality, and a first subcarrier modulation signal is allocated to the remaining subcarriers.

As described above, according to this embodiment, by providing first subcarrier modulation section 104 that forms a first subcarrier modulation signal obtained by converting a plurality of modulation signals to the frequency domain, second subcarrier modulation section 105 that forms a second subcarrier modulation signal obtained by parallel conversion of a plurality of modulation signals, IFFT section 111 that forms an OFDM signal by performing an inverse Fourier transform on the first and second subcarrier modulation signals, and a subcarrier mapping section that is provided ahead of the inverse Fourier transform section and controls allocation of the first and second subcarrier modulation signals to a plurality of subcarriers forming the OFDM signal, transmitting apparatus 100 can be implemented that can flexibly respond to a demand for securement of an error rate characteristic, and for an increase in cell coverage.

Figure 8:
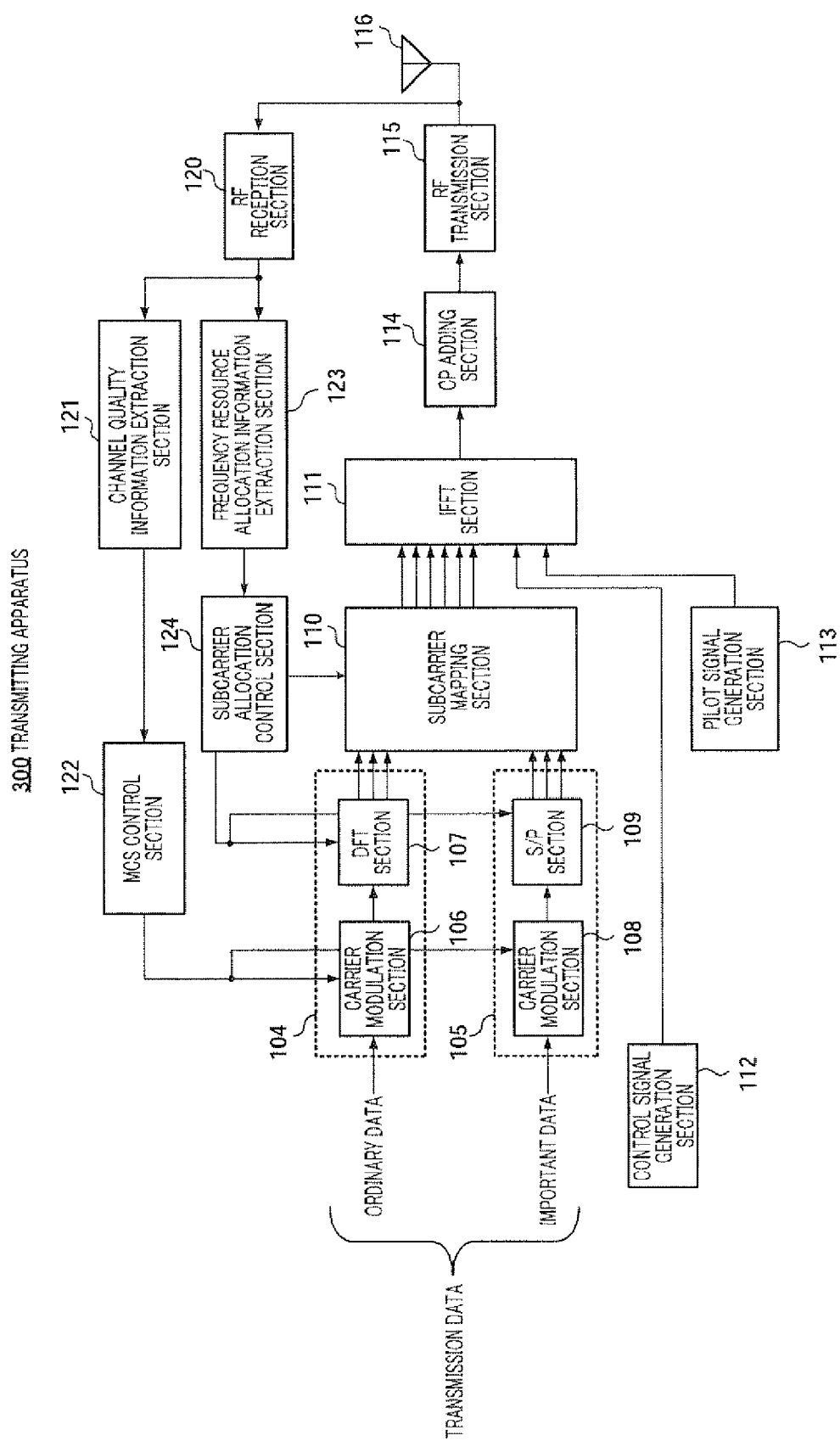
FIG. 8 is a block diagram showing another configuration of a transmitting apparatus of Embodiment 1.

FIG. 8, in which parts corresponding to those in FIG. 3 are assigned the same reference codes as in FIG. 3, shows another example of a configuration of a transmitting apparatus of this embodiment. In FIG. 8, the configuration ahead of first and second subcarrier modulation sections 104 and 105 is omitted. In transmitting apparatus 300, important data among transmission data is input to second subcarrier modulation section 105. On the other hand, in transmitting apparatus 300, ordinary data without a high degree of importance among transmission data is input to first subcarrier modulation section 104. By this means, the overall transmission signal reception quality can be improved by utilizing the characteristic whereby the reception quality of a second subcarrier modulation signal is better than that of a first subcarrier modulation signal.

Important data includes a control signal. As another example, when an error correction encoder (encoding section 101 in FIG. 3) has a configuration that uses a systematic code (Turbo code or LDPC), a systematic bit may be transmitted as important data allocated preferentially to a second subcarrier modulation signal, and a parity bit may be transmitted as ordinary data allocated to a first subcarrier modulation signal.

Figure 9:
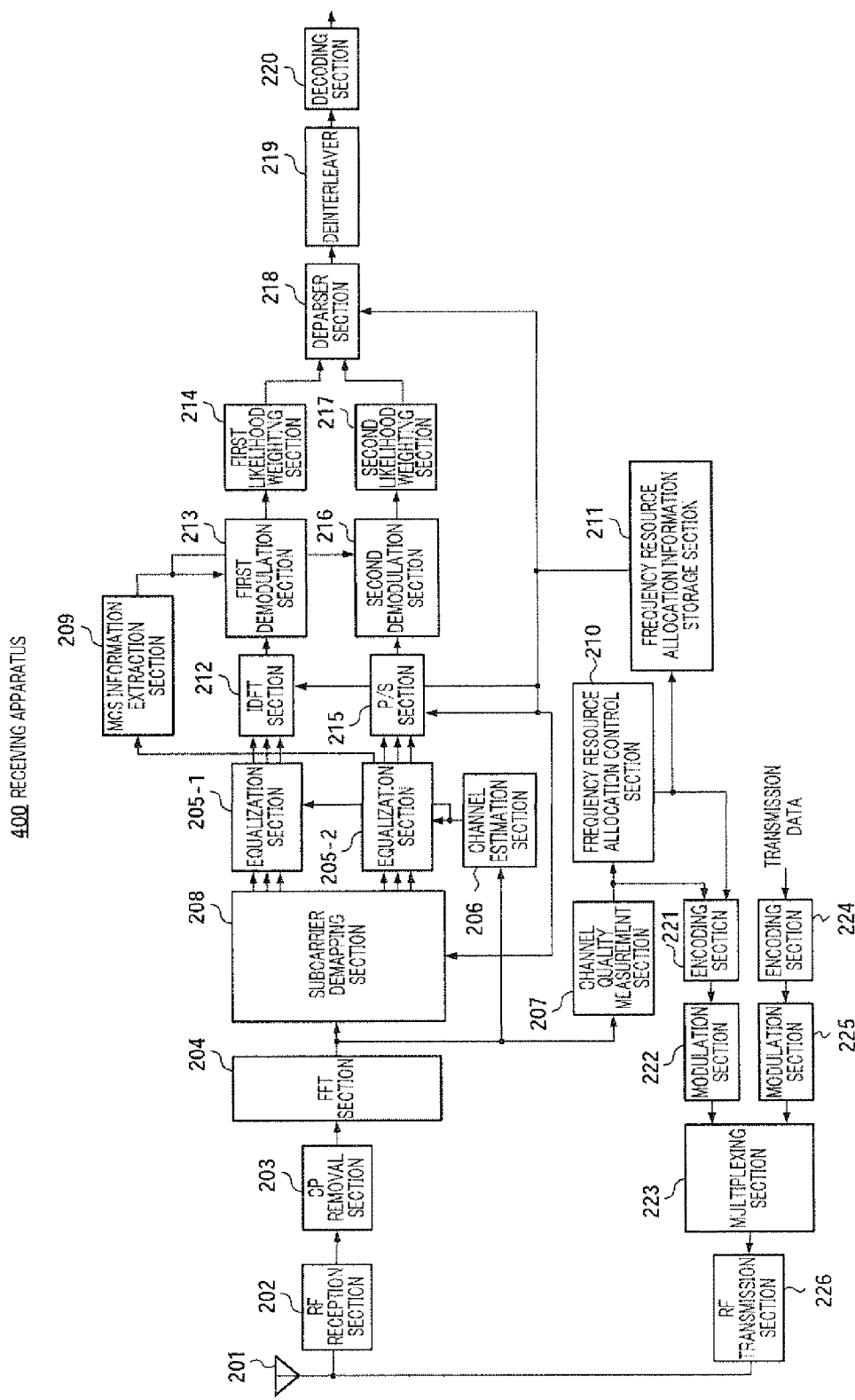
FIG. 9 is a block diagram showing another configuration of a receiving apparatus of Embodiment 1.

FIG. 9, in which parts corresponding to those in FIG. 5 are assigned the same reference codes as in FIG. 5, shows another example of a configuration of a receiving apparatus of this embodiment. In receiving apparatus 400, equalization sections 205-1 and 205-2 are provided independently for first and second subcarrier modulation signals subsequent to subcarrier mapping section 208. Thus, equalization processing can be performed by equalization sections 205-1 and 205-2 using an optimal equalization method for first and second subcarrier modulation signals respectively, and reception characteristics can be improved as compared with a case in which equalization processing is performed on first and second subcarrier modulation signals using the same equalization method.

In this embodiment, a case has been described in which one encoding section 101 is provided in transmitting apparatus 100, but a plurality of encoding sections may also be provided, and, for example, provision may be made for a first subcarrier modulation signal and a second subcarrier modulation signal to be encoded by separate encoding sections. This also applies to other embodiments described later herein.

In this embodiment, cases have been described in which first and second likelihood weighting sections 214 and 217 are provided in receiving apparatuses 200 and 400, but weighting sections may be omitted. This also applies to other embodiments described later herein.

(Embodiment 2)

In Embodiment 1, a configuration was described for a case in which a transmitting apparatus that transmits a signal in which first and second subcarrier modulation signals are mixed is provided in a terminal of an FDD communication system (that is, a case in which, in Embodiment 1, a signal in which first and second subcarrier modulation signals are mixed is transmitted in uplink).

In Embodiment 2, a configuration will be described for a case in which a transmitting apparatus that transmits a signal in which first and second subcarrier modulation signals are mixed is provided in a base station (that is, a case in which a signal in which first and second subcarrier modulation signals are mixed is transmitted in downlink).

Only configuration parts that differ from Embodiment 1 are described below.

Figure 10:
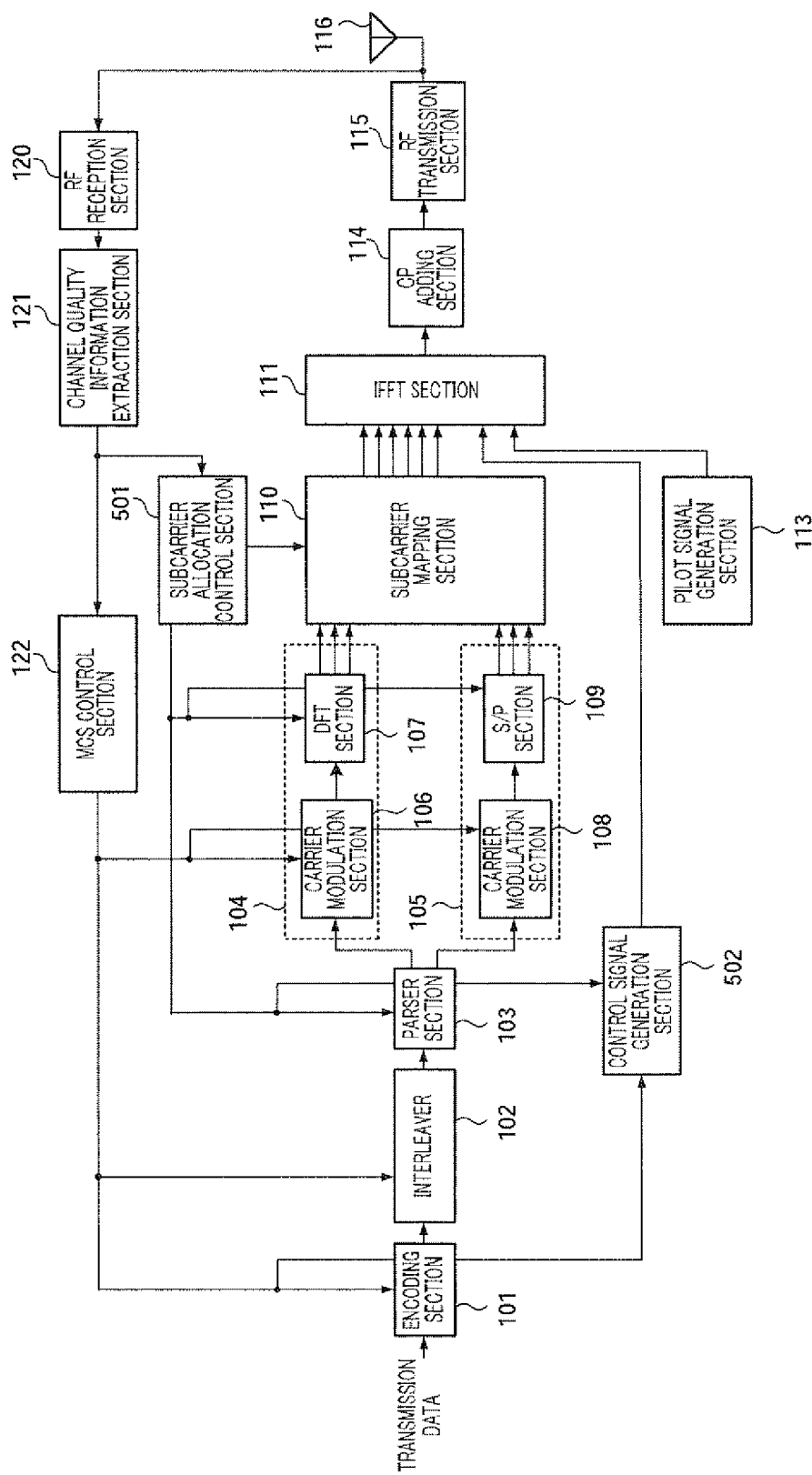
FIG. 10 is a block diagram showing a configuration of a transmitting apparatus of Embodiment 2.

FIG. 10, in which parts corresponding to those in FIG. 3 are assigned the same reference codes as in FIG. 3, shows the configuration of transmitting apparatus 500 of this embodiment. Transmitting apparatus 500 is provided in a base station.

Channel quality information extraction section 121 of transmitting apparatus 500 extracts channel quality information transmitted from a receiving apparatus (terminal) from a received signal. Based on the channel quality information, subcarrier allocation control section 501 decides which subcarriers in the transmission band are to be used by transmitting apparatus 500 when transmitting. In addition, based on the channel quality information, storage section 501 decides subcarrier distribution for allocating a first subcarrier modulation signal and second subcarrier modulation signal, and outputs the result to parser section 103 and subcarrier mapping section 110.

Control signal generation section 502 generates a control signal including subcarrier allocation information and information on an MCS allocated to a subcarrier (MCS information) for reporting to the receiving apparatus.

Figure 11:
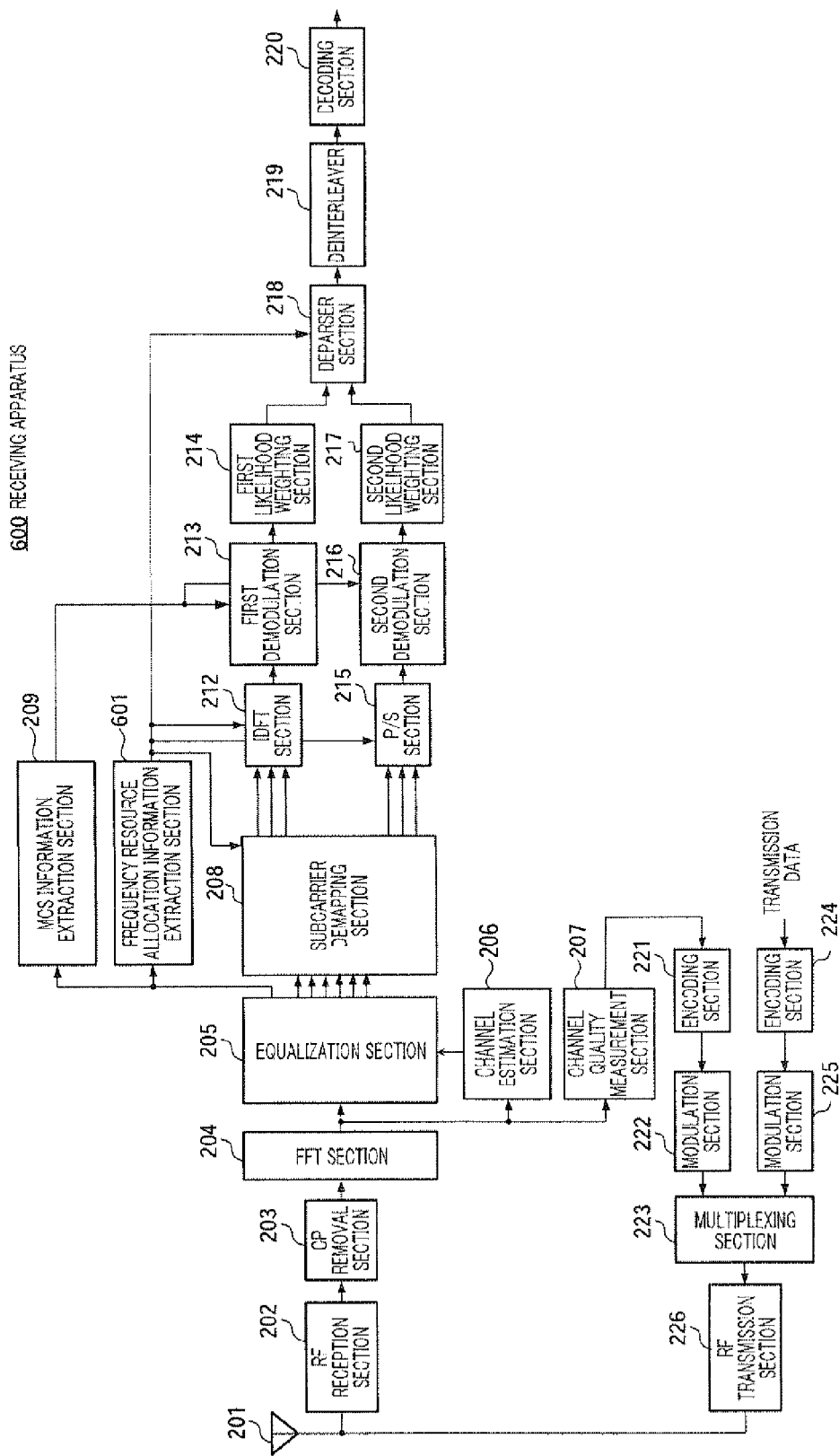
FIG. 11 is a block diagram showing a configuration of a receiving apparatus of Embodiment 2.

FIG. 11, in which parts corresponding to those in FIG. 5 are assigned the same reference codes as in FIG. 5, shows a configuration of a receiving apparatus of this embodiment. Receiving apparatus 600 is provided in a terminal.

Frequency resource allocation information extraction section 601 extracts frequency resource allocation information included in a control signal transmitted by transmitting apparatus 500. Frequency resource allocation information is information indicating a distribution showing which subcarrier modulation signal, a first or second, has been mapped to which subcarriers. Frequency resource allocation information extraction section 601 sends extracted frequency resource allocation information to subcarrier mapping section 208, IDFT section 212, P/S section 215, and deparser section 218.

According to this embodiment, the same kind of effect can be obtained as in Embodiment 1.

(Embodiment 3)

Figure 12:
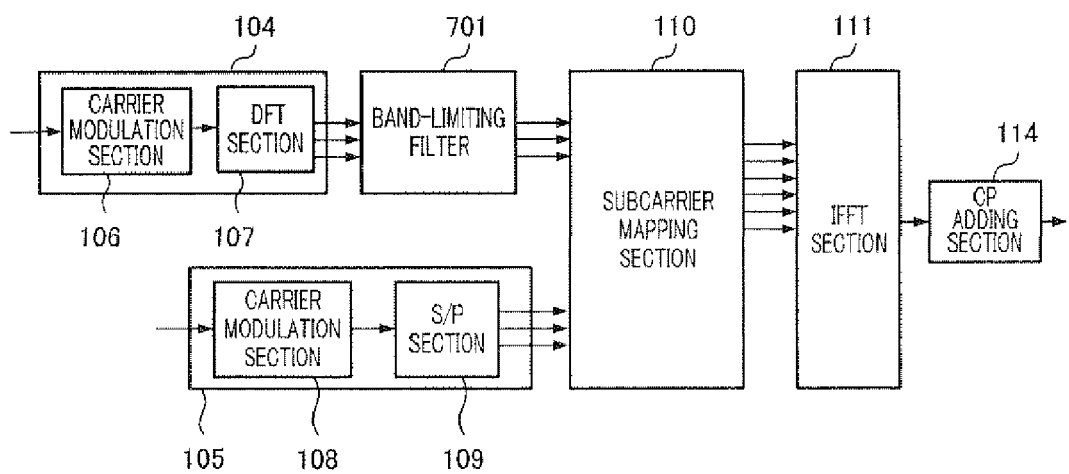
FIG. 12 is a block diagram showing a configuration of a transmitting apparatus of Embodiment 3.

FIG. 12, in which parts corresponding to those in FIG. 3 and FIG. 8 are assigned the same reference codes as in FIG. 3 and FIG. 8, shows a configuration of the principal parts of a transmitting apparatus of this embodiment. In FIG. 12, only configuration peripheral parts newly proposed in this embodiment are shown, and the rest of the configuration is omitted.

In transmitting apparatus 700, band-limiting filter 701 is provided on the output side of first subcarrier modulation section 104, and the band of a first subcarrier modulation signal is limited by band-limiting filter 701 before the signal is input to subcarrier mapping section 110.

Figure 13:
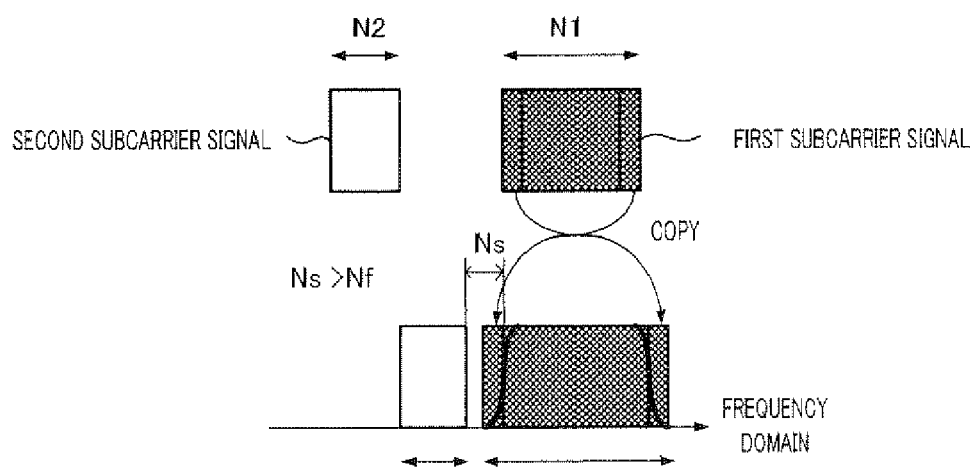
FIG. 13 is a drawing provided to explain filtering processing by the band-limiting filter in FIG. 12.

As shown in FIG. 13, band-limiting filter 701 performs localized placement of a first subcarrier modulation signal that is DFT output, and Nf subcarriers at both ends of that band are copied to a separate band and then filtered by an RRC (Root Raised Cosine) filter. The number of subcarriers copied here is decided according to roll-off rate α of the RRC filter. When DFT section 107 performs a DFT here using an N1-unit size based on frequency resource allocation information, Nf=CEIL[(N1×α)/2] subcarrier signals are copied at one end of the band, and subcarrier signals are extrapolated at the opposite end of the band. Here, CEIL[x] represents the smallest integer greater than x.

Details of an RRC filter are given in Non-Patent Document 1, for example, and therefore a detailed description thereof is omitted here.

Subcarrier mapping section 110 finds subcarrier interval Ns greater than or equal to an Nf-unit interval dependent upon roll-off rate α of the RRC filter for band-limited first subcarrier modulation signal output, and maps a second subcarrier modulation signal.

By means of the above, the first subcarrier modulation signal PAPR is further reduced. On the other hand, by extending second subcarrier modulation signal placement by at least an interval dependent upon the roll-off rate, first subcarrier modulation signal interference can be eliminated, and a second subcarrier modulation signal can be received on the receiving side without SIR degradation.

Figure 14:
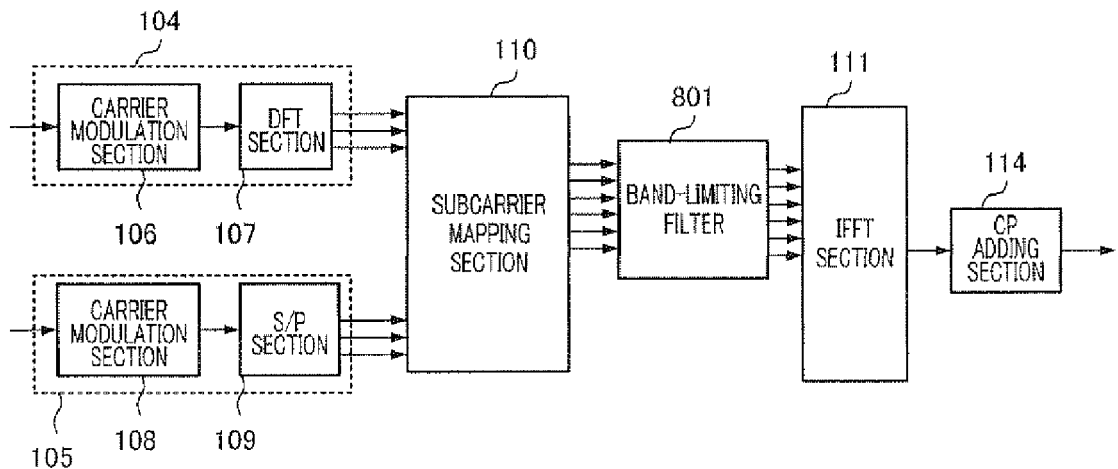
FIG. 14 is a block diagram showing another configuration of a transmitting apparatus of Embodiment 3.

FIG. 14 shows another example of a configuration of a transmitting apparatus of this embodiment. In transmitting apparatus 800, band-limiting filter 801 is provided on the output side of subcarrier mapping section 110.

Figure 15:
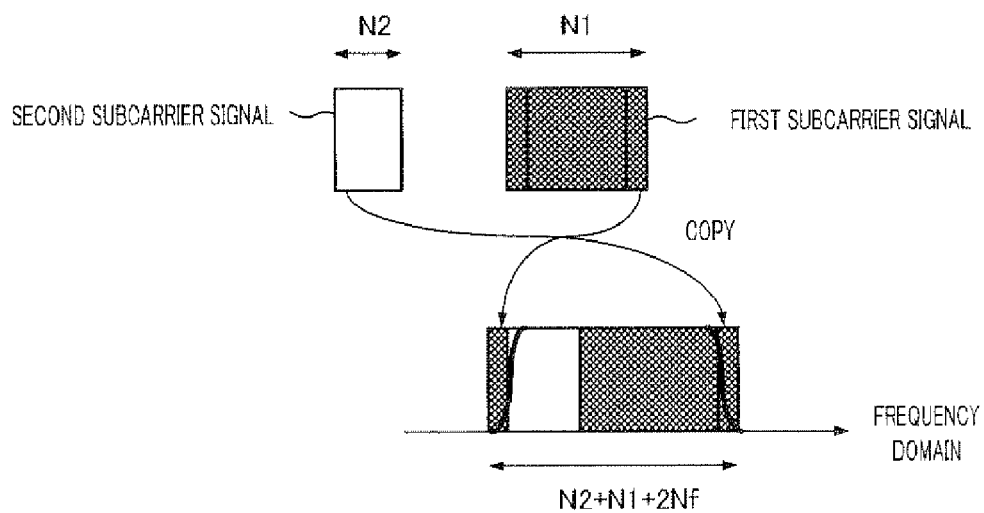
FIG. 15 is a drawing provided to explain filtering processing by the band-limiting filter in FIG. 14.

FIG. 15 shows subcarrier mapping section 110 output. As shown in the figure, subcarrier mapping section 110 performs localized placement of a first subcarrier modulation signal, and places a second subcarrier modulation signal adjacent thereto. In this figure, there is no interval between the first subcarrier modulation signal and second subcarrier modulation signal, but there may also be an interval.

As shown in FIG. 15, band-limiting filter 801 copies Nf subcarriers at both ends of the entire subcarrier signal band formed by first and second subcarrier modulation signals to a separate band, and then applies an RRC (Root Raised Cosine) filter. The number of subcarriers copied here is decided according to roll-off rate α of the RRC filter. When DFT section 107 performs a DFT using an N1-unit size based on frequency resource allocation information and S/P section 109 performs parallel conversion using in N2-unit size units, subcarrier signal extrapolation is performed as described below.

Namely, Nf=CEIL[(N1+N2)×α/2] subcarriers are copied to a first subcarrier modulation signal at an end of the band constituting an outer side of the allocated band, and are extrapolated at the opposite end of the band. Then Nf=CEIL[(N1+N2)×α/2] subcarriers are copied to a second subcarrier modulation signal at an end of the band constituting an outer side of the allocated band, and are extrapolated at the opposite end of the band. This processing may be performed by band-limiting filter 801, or may be performed by subcarrier mapping section 110. Here, CEIL[x] represents the smallest integer greater than x.

By means of the above, the PAPR can be reduced for a first subcarrier modulation signal and second subcarrier modulation signal.

(Embodiment 4)

Figure 16:
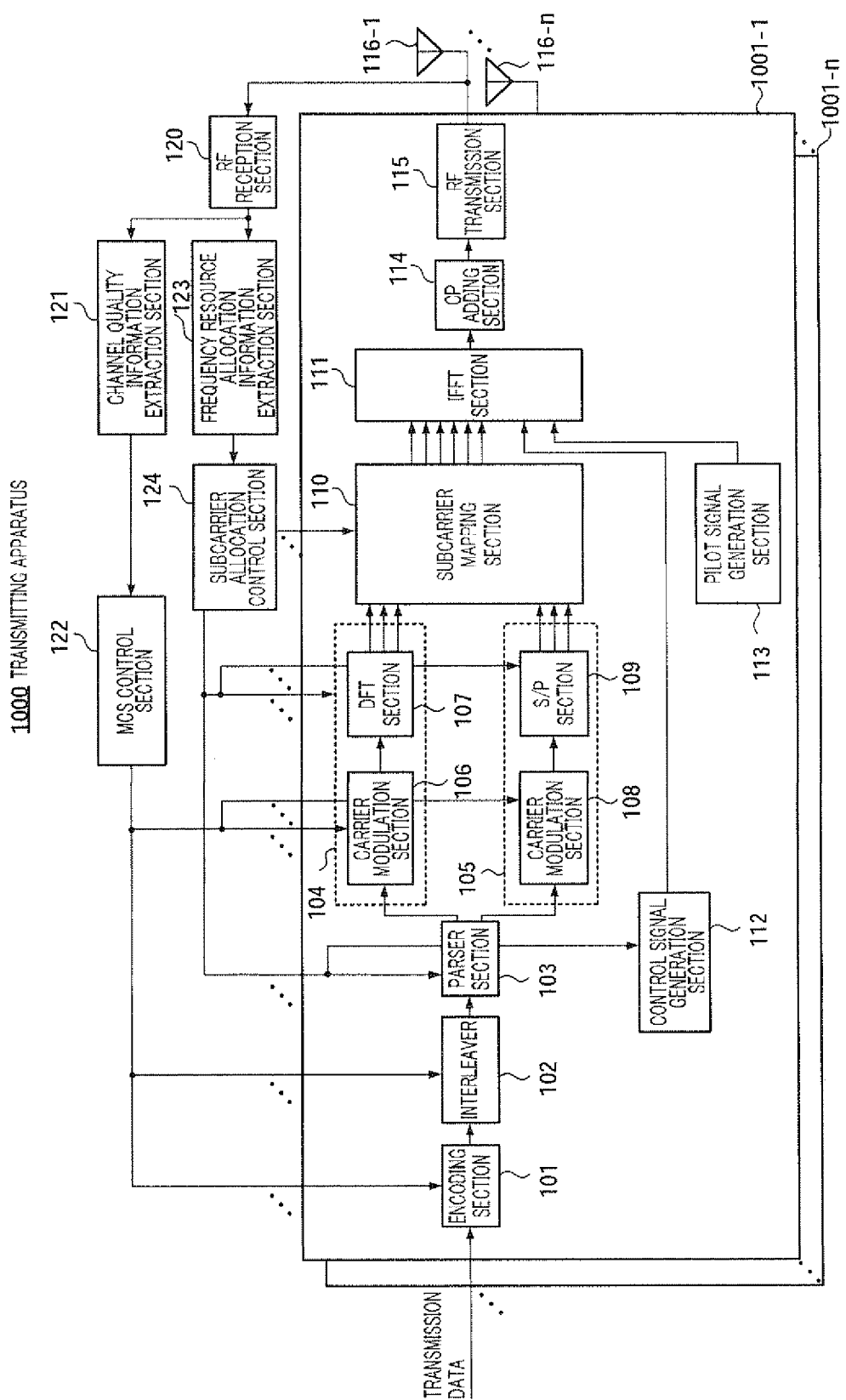
FIG. 16 is a block diagram showing a configuration of a transmitting apparatus of Embodiment 4.

FIG. 16, in which parts corresponding to those in FIG. 3 are assigned the same reference codes as in FIG. 3, shows a configuration of the principal parts of a transmitting apparatus of this embodiment. Transmitting apparatus 1000 has n antennas 116-1 through 116-n, and also has n transmission units 1001-1 through 1001-n corresponding respectively to these antennas. By this means, transmitting apparatus 1000 performs space multiplex transmission of modulation signals described in Embodiment 1 through Embodiment 3 by means of MIMO (Multiple-Input Multiple-Output) transmission using plurality of antennas 116-1 through 116-n.

Transmission units 1001-1 through 1001-n are each configured by means of configuration elements 101 through 115 of the transmission system in FIG. 3 described in Embodiment 1. Signals obtained by transmission units 1001-1 through 1001-n are supplied to corresponding antennas 116-1 through 116-n.

The reception system is similar to the reception system described in Embodiment 1, except that MCS control section 122 sends an MCS to each of transmission units 1001-1 through 1001-n, and subcarrier allocation control section 124 sends subcarrier allocation information to each of transmission units 1001-1 through 1001-n.

In this embodiment, single-user MIMO transmission is assumed, and common subcarrier modulation signal mapping is performed among antennas 116-1 through 116-n. Specifically, common subcarrier mapping is performed for antennas 116-1 through 116-n by making first and second subcarrier modulation signal mapping by subcarrier mapping section 110 common in each of transmission units 1001-1 through 1001-n. At least second subcarrier modulation signal subcarrier mapping is made common among antennas 116-1 through 116-n. At this time, the M-ary modulation value in subcarrier modulation sections 104 and 105 need not be made common among the antennas, and may be controlled adaptively on an antenna-by-antenna basis according to the channel quality.

Figure 17:
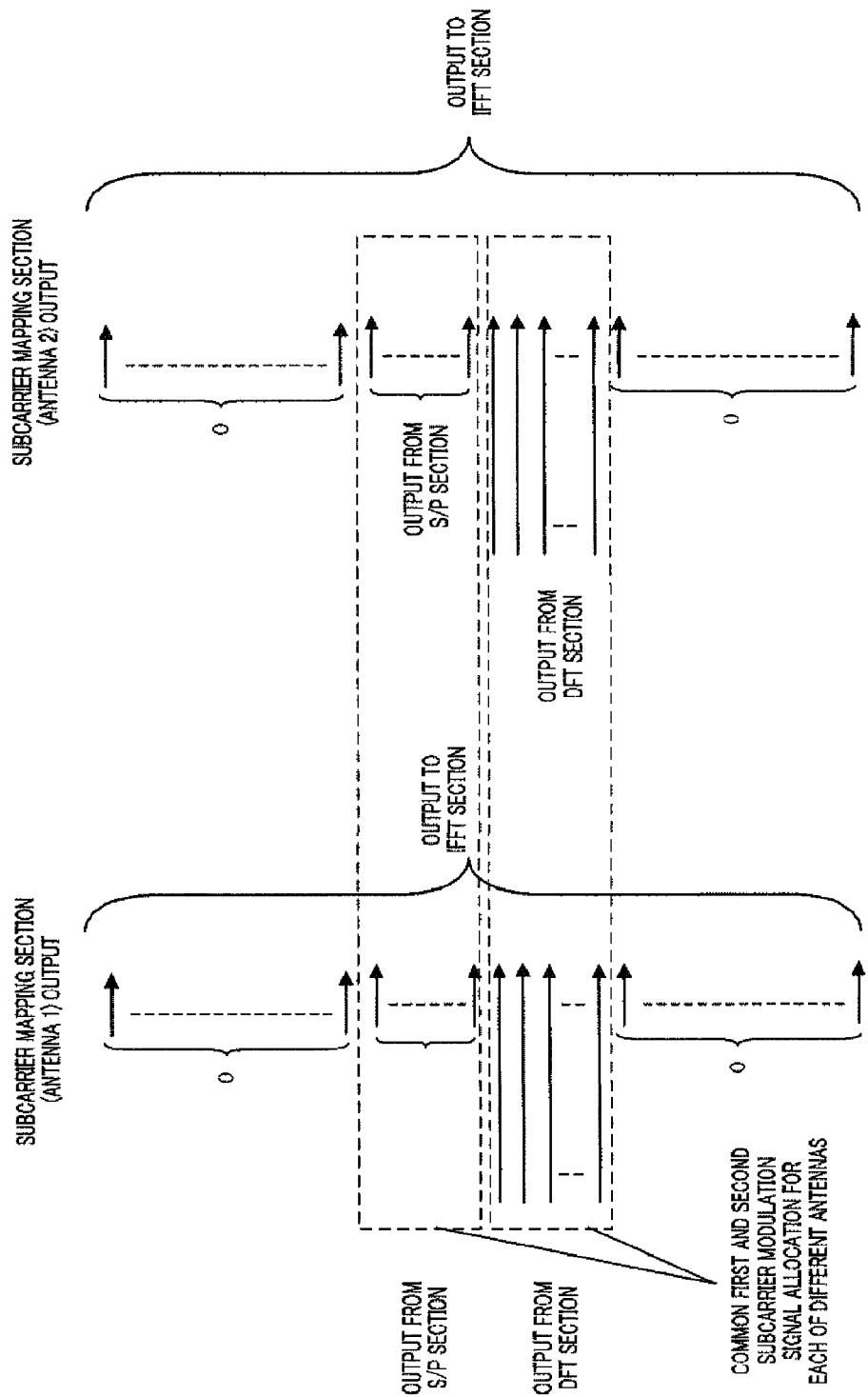
Figure 18:
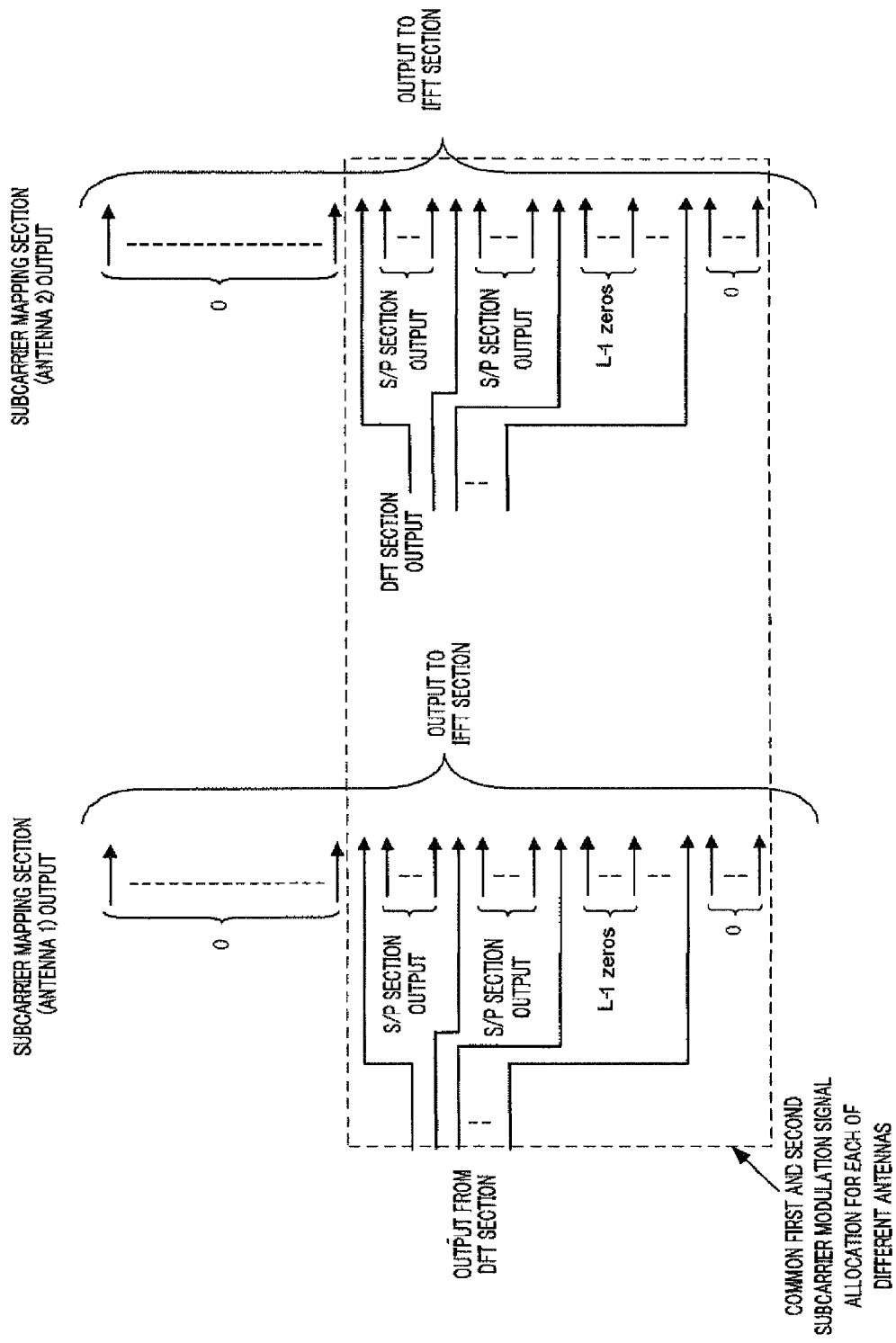

FIG. 17 and FIG. 18 show the nature of subcarrier mapping among antennas 116-1 through 116-n by transmitting apparatus 1000. FIG. 17 illustrates a case in which localized placement is performed for a first subcarrier modulation signal (output from DFT section 107), and FIG. 18 illustrates a case in which distributed placement is performed for a first subcarrier modulation signal (output from DFT section 107).

As shown in FIG. 17 and FIG. 18, both when localized placement is performed and when distributed placement is performed, transmitting apparatus 1000 makes antenna 1 (transmission unit 1) first and second subcarrier modulation signal placement and antenna 2 (transmission unit 2) first and second subcarrier modulation signal placement common.

Figure 19:
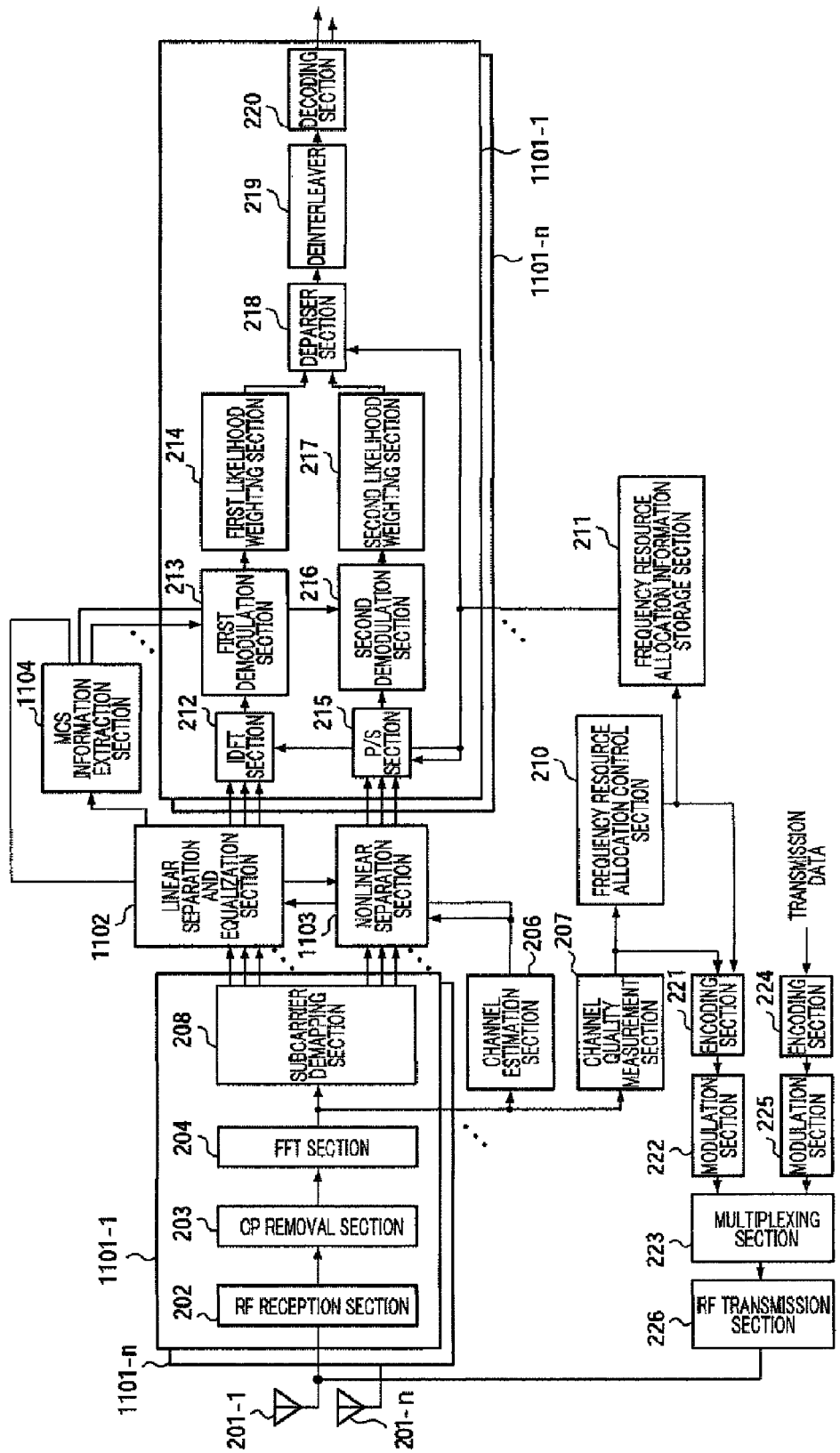
FIG. 19 is a block diagram showing a configuration of a receiving apparatus of Embodiment 4.

FIG. 19, in which parts corresponding to those in FIG. 5 are assigned the same reference codes as in FIG. 5, shows the configuration of a receiving apparatus 1100 that receives and demodulates a space-multiplexed signal transmitted from transmitting apparatus 1000. Receiving apparatus 1100 has n antennas 201-1 through 201-n, and also has n reception units 1101-1 through 1101-n corresponding respectively to these antennas.

Reception units 1101-1 through 1101-n are each configured by means of almost the same configuration elements as the reception system in FIG. 5 described in Embodiment 1. Only parts differing from those of the reception system in FIG. 5 are described below.

Linear separation and equalization section 1102 and nonlinear separation section 1103 are provided subsequent to subcarrier mapping section 208. Based on frequency resource allocation information from frequency resource allocation information storage section 211 (this signal line is omitted in FIG. 19 in order to simplify the drawing), subcarrier mapping section 208 sends a first subcarrier modulation signal to linear separation and equalization section 1102, and a second subcarrier modulation signal to nonlinear separation section 1103.

Linear separation and equalization section 1102 separates the space-multiplex transmitted plurality of first subcarrier modulation signals by performing MMSE, ZF, or suchlike linear space demultiplexing and frequency domain equalization.

Nonlinear separation section 1103 separates the space-multiplex transmitted plurality of second subcarrier modulation signals using a nonlinear space demultiplexing method such as MLD.

MCS information extraction section 1104 extracts MCS information from linear separation and equalization section 1102 output, applies this to first and second demodulation sections 213 and 216, and sends it to linear separation and equalization section 1102.

In the above configuration, transmitting apparatus 1000 transmits the same kind of (first or second) subcarrier modulation signal even if the transmitting antennas are different as long as subcarrier placement is the same. By this means, receiving apparatus 1100 applies a space demultiplexing method to space-multiplexed subcarrier modulation signals of the same kind.

Here, when second subcarrier modulation signals are space-multiplexed as subcarrier modulation signals of the same kind, in particular, a nonlinear separation method using a nonlinear space demultiplexing method such as MLD can be applied rather than a linear space demultiplexing method such as MMSE or ZF. This is an important point in this embodiment.

A case will now be considered in which mixed space multiplexing of a first subcarrier modulation signal and second subcarrier modulation signal is performed. For a first subcarrier modulation signal, a symbol sequence signal is converted to the frequency domain using DFT section 107. Consequently, receiving apparatus 1100 is unable to use a nonlinear space demultiplexing method such as MLD on a signal after subcarrier mapping.

Here, a linear space demultiplexing method can be applied, but if multipath interference cannot be adequately eliminated in the first subcarrier modulation signal, this will cause degradation of second subcarrier modulation signal reception characteristics. That is to say, despite the use of a space demultiplexing method, a disadvantage of not being able to obtain adequate reception quality arises if a first subcarrier modulation signal and second subcarrier modulation signal are mixed in the same subcarriers.

According to this embodiment, as long as subcarrier placement is the same, by transmitting the same kind of (first or second) subcarrier modulation signal, separation of space-multiplex transmitted signals using nonlinear separation section 1103 employing a nonlinear space demultiplexing method such as MLD becomes possible for subcarriers transmitted using a second subcarrier modulation signal. By this means, second subcarrier modulation signal reception quality can be improved, and, by means of likelihood weighting correction, first subcarrier modulation signal post-error-correction reception quality can be further improved by performing weighting processing that improves second subcarrier modulation signal likelihood information.

Figure 20:
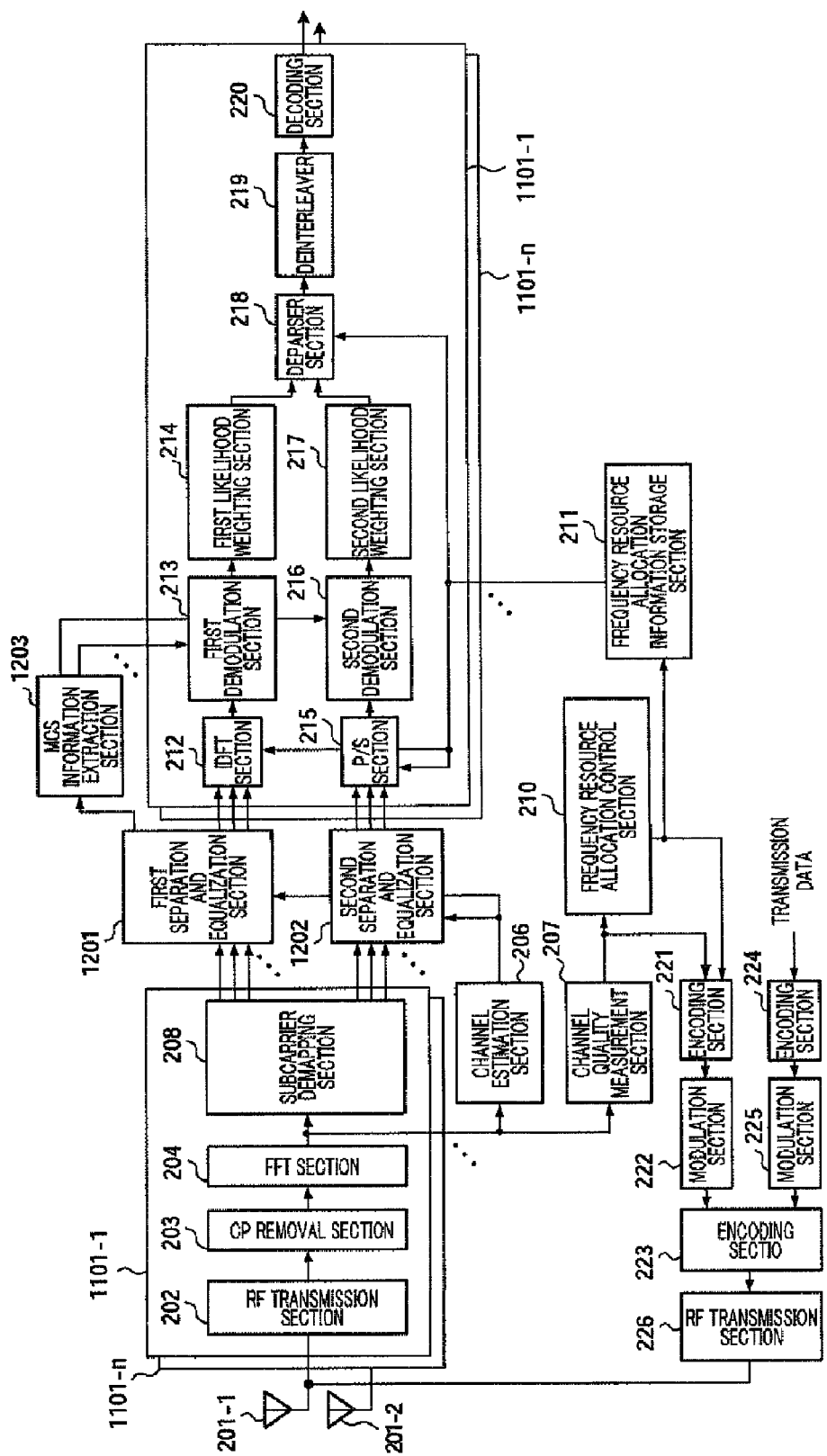
FIG. 20 is a block diagram showing another configuration of a receiving apparatus of Embodiment 4.

FIG. 20, in which parts corresponding to those in FIG. 19 are assigned the same reference codes as in FIG. 19, shows another example of a configuration of a receiving apparatus of this embodiment. In receiving apparatus 1200, first subcarrier modulation signals are input to first separation and equalization section 1201, and second subcarrier modulation signals are input to second separation and equalization section 1202. Second separation and equalization section 1202 performs space demultiplexing of second subcarrier modulation signals using a linear separation method such as ZF or MMSE. Even if the configuration in FIG. 20 is employed, a result of improving first subcarrier modulation signal post-error-correction reception quality can be obtained in the same way as in FIG. 19 by means of likelihood weighting correction, but this result is smaller than with the configuration in FIG. 19.

In this embodiment, configuration examples have been described that assume the use of single-user MIMO transmission, but the principle of this embodiment can also be applied to a case in which uplink multi-user MIMO transmission is performed. In this ease, transmission unit 1101 and antenna 116 can be considered to have been provided for different users, and the relationship between signals transmitted from different users can be made common in the same way as described above. That is to say, frequency resource allocation information is reported to each user from a receiver (base station) so as to make mapping the same for first and second subcarrier modulation signals, and subcarrier mapping sections of different users' transmitting apparatuses (terminals) perform common subcarrier mapping for space-multiplex transmitted signals. At least second subcarrier modulation signal subcarrier mapping is made common among the antennas.

(Embodiment 5)

Figure 21:
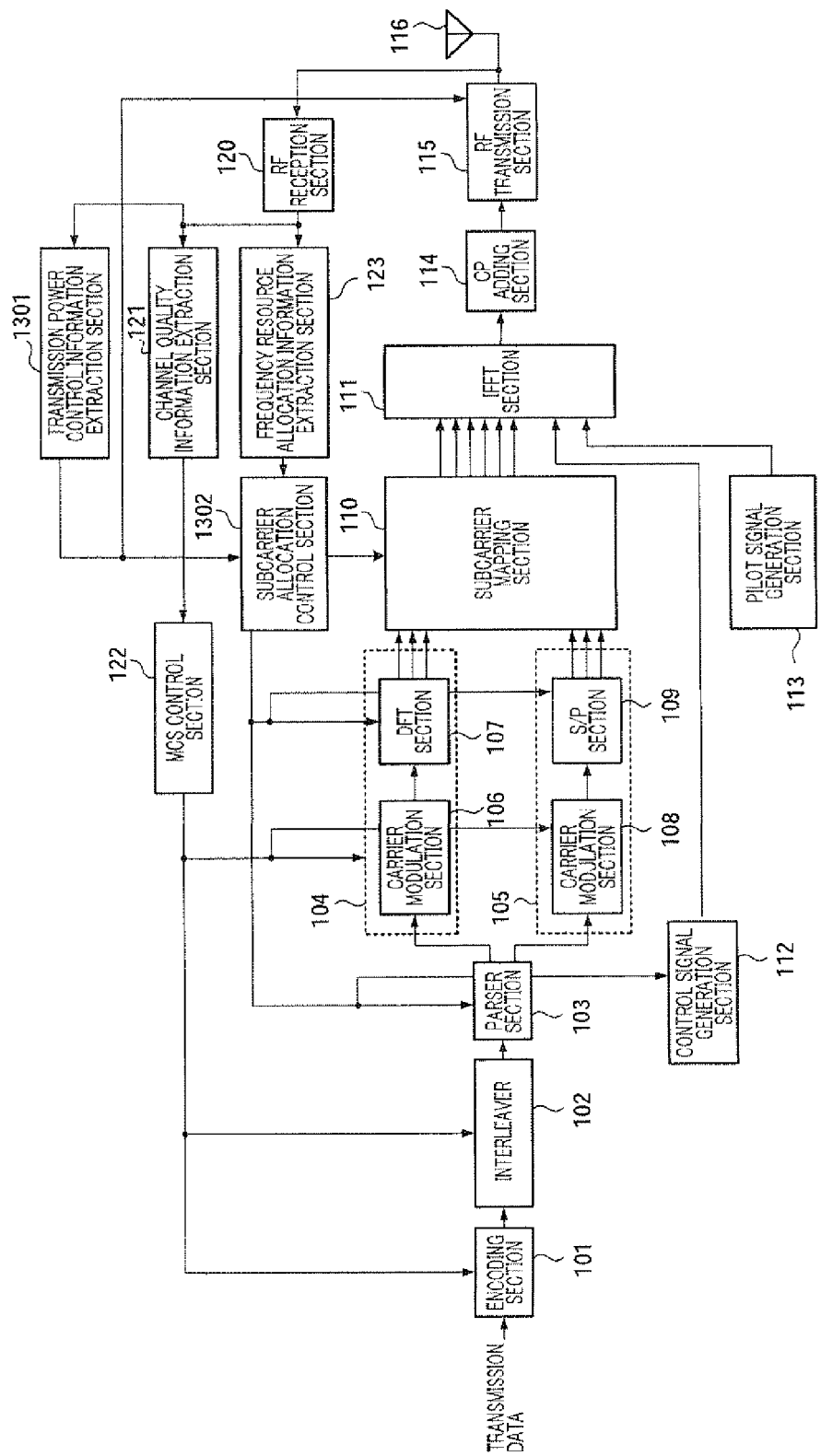
FIG. 21 is a block diagram showing a configuration of a transmitting apparatus of Embodiment 5.

FIG. 21, in which parts corresponding to those in FIG. 3 are assigned the same reference codes as in FIG. 3, shows a configuration of a transmitting apparatus of this embodiment. Transmitting apparatus 1300 has transmission power control information extraction section 1301. Transmission power control information extraction section 1301 extracts transmission power control information reported from a receiver, applies this to RF transmission section 115, and sends it to subcarrier allocation control section 1302.

Subcarrier allocation control section 1302 variably controls subcarrier allocation of the first and second subcarrier modulation signals based on the transmission power control information. Specifically, subcarrier allocation control section 1302 performs control so that the second subcarrier modulation signal proportion is increased as transmission power decreases from maximum transmission power, as shown in FIG. 23.

Figure 22:
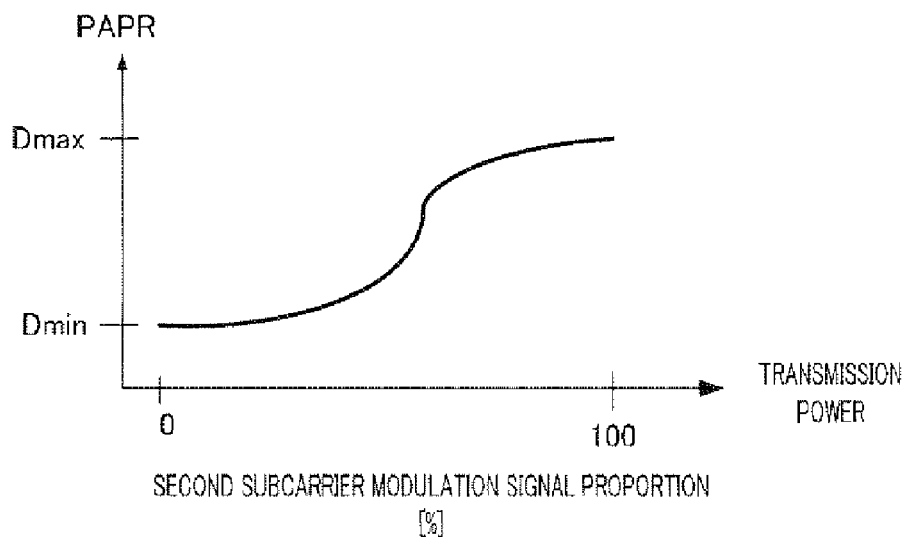
FIG. 22 is a drawing showing a PAPR characteristic with respect to a proportion of a second subcarrier modulation signal.
Figure 23:
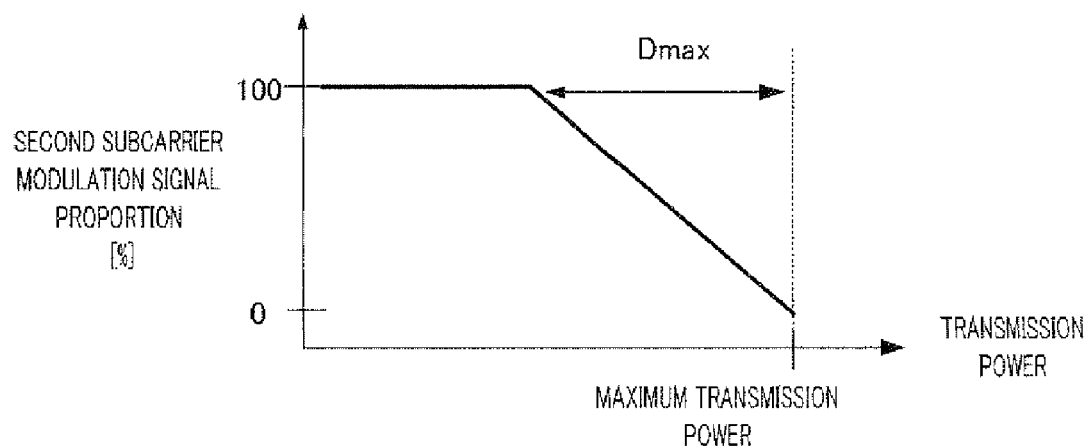
FIG. 23 is a drawing showing a proportion of a second subcarrier modulation signal with respect to transmission power.

At this time, the PAPR characteristic when the second subcarrier modulation signal proportion is varied is measured in advance for each M-ary modulation value used, as shown in FIG. 22, and an index of the control in FIG. 23 is set based on PAPR maximum value Dmax when the proportion is made 100 [%].

By this means, a second modulation method proportion can be varied considering the transmission power margin with respect to maximum transmission power. Consequently, in the vicinity of the base station, subcarriers can be allocated by increasing the distribution of a second modulation method suitable for M-ary modulation and MIMO transmission (in some cases making this distribution 100 [%]). By this means, reception quality can be improved without incurring PAPR restrictions.

On the other hand, at the cell edge distant from the base station, transmission power is increased, as a result of which second modulation method distribution is decreased, and the PAPR can also be decreased. By this means, transmission power at the cell edge can be increased, and an accompanying improvement in reception quality can be achieved.

(Embodiment 6)

In this embodiment, a configuration will be described for a case in which an HARQ function is provided in a transmitting apparatus and receiving apparatus that perform transmission/reception of a signal in which first and second subcarrier modulation signals are mixed.

HARQ (Hybrid ARQ) is a technique based on automatic retransmission request (ARQ: Automatic Repeat reQuest) technology and error correction encoding. Details of HARQ are given in Non-Patent Document 2, for example, and therefore a detailed description thereof is omitted here. In order to perform HARQ processing, a transmitting apparatus according to this embodiment performs packet transmission. In packet transmission, a transmission data sequence is divided into blocks (data packets) of a specific bit-length in accordance with a standard described later herein, and transmission is performed in these block units.

Figure 24:
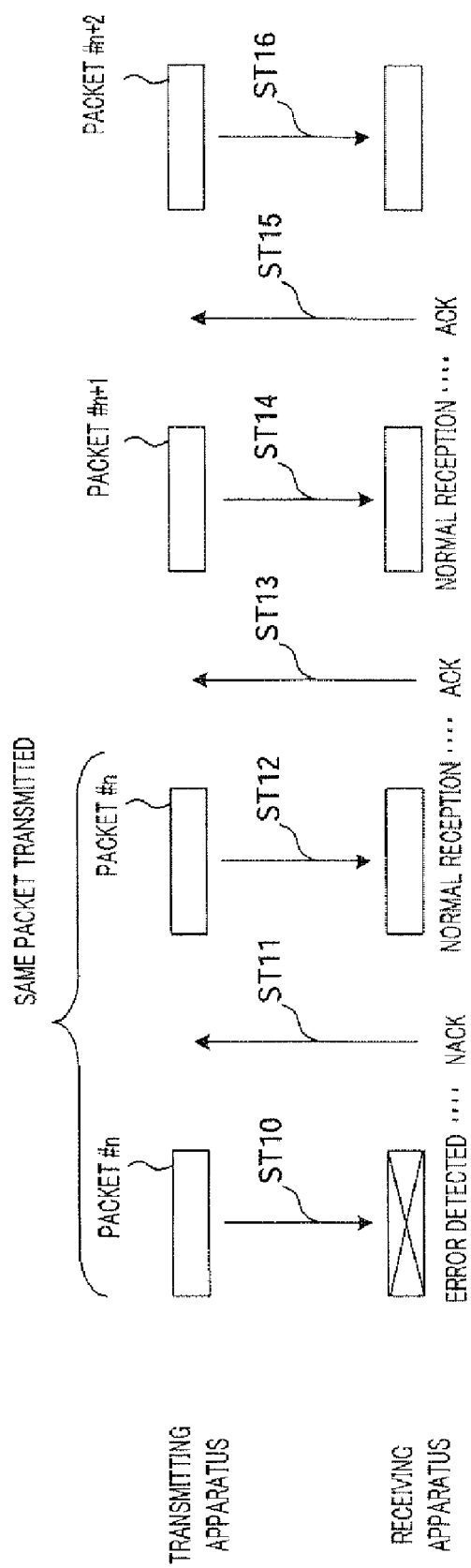
FIG. 24 is a drawing showing HARQ operation of Embodiment 6.

In this embodiment, an HARQ method called CC (Chase Combining) is used. A brief description of HARQ operation using the CC method will now be given using FIG. 24.

First, a transmitting apparatus transmits packet #n (step ST10). A receiving apparatus demodulates and decodes packet #n, and in the event of detecting an error in the decoded result, reports NACK (Negative Acknowledgment) (step ST11). On receiving NACK, the transmitting apparatus retransmits previously transmitted packet #n (step ST12).

The receiving apparatus performs maximal-ratio combining of packet #n transmitted in step ST10 and packet #n transmitted in step ST12, followed by demodulation and decoding. If no error is detected in the decoded result, the receiving apparatus reports ACK (Acknowledgment) (step ST13). On receiving ACK, the transmitting apparatus transmits next new packet #n+1 (step ST14).

Thereafter, in the same way, the transmitting apparatus transmits the same packet repeatedly until it receives ACK from the receiving apparatus in response to a transmitted packet, and on receiving ACK, transmits the next new packet. Details of the CC method are given in Non-Patent Document 3, for example, and therefore a detailed description thereof is omitted here.

In this embodiment, as in Embodiment 1, a configuration is described for a case in which a transmitting apparatus that transmits a signal in which first and second subcarrier modulation signals are mixed is used for uplink transmission in an FDD communication system. Therefore, only configuration parts that differ from Embodiment 1 are described below.

Figure 25:
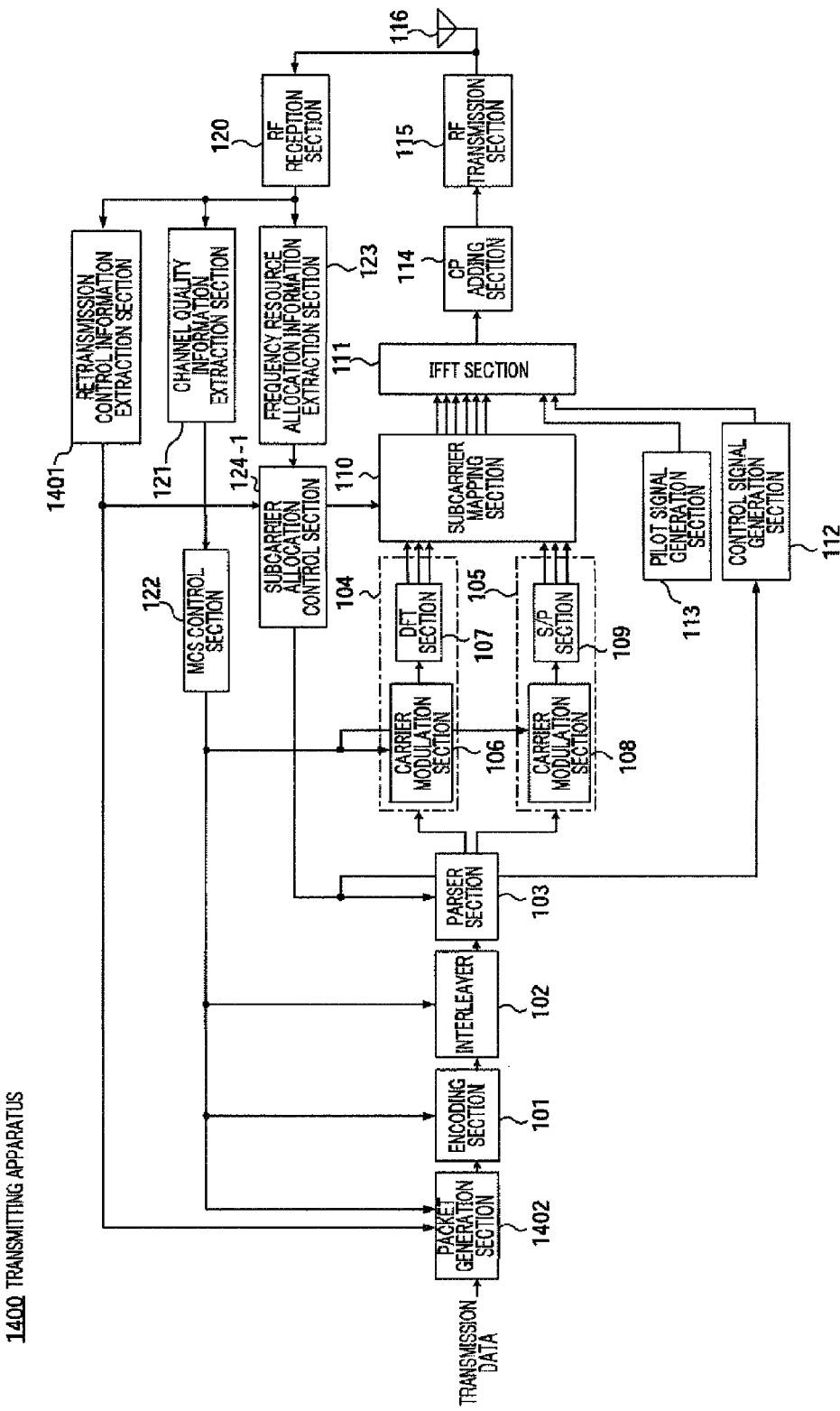
FIG. 25 is a block diagram showing a configuration of a transmitting apparatus of Embodiment 6.

FIG. 25, in which parts corresponding to those in FIG. 3 are assigned the same reference codes as in FIG. 3, shows a configuration of a transmitting apparatus (terminal) of this embodiment. Transmitting apparatus 1400 is provided in a terminal in an FDD communication system. Transmitting apparatus 1400 (terminal) has retransmission control information extraction section 1401 and packet generation section 1402 in addition to the configuration of transmitting apparatus 100 in FIG. 3. Also, in transmitting apparatus 1400 (terminal), the configuration of subcarrier allocation control section 124-1 differs from the configuration of subcarrier allocation control section 124 of transmitting apparatus 100.

Figure 26:
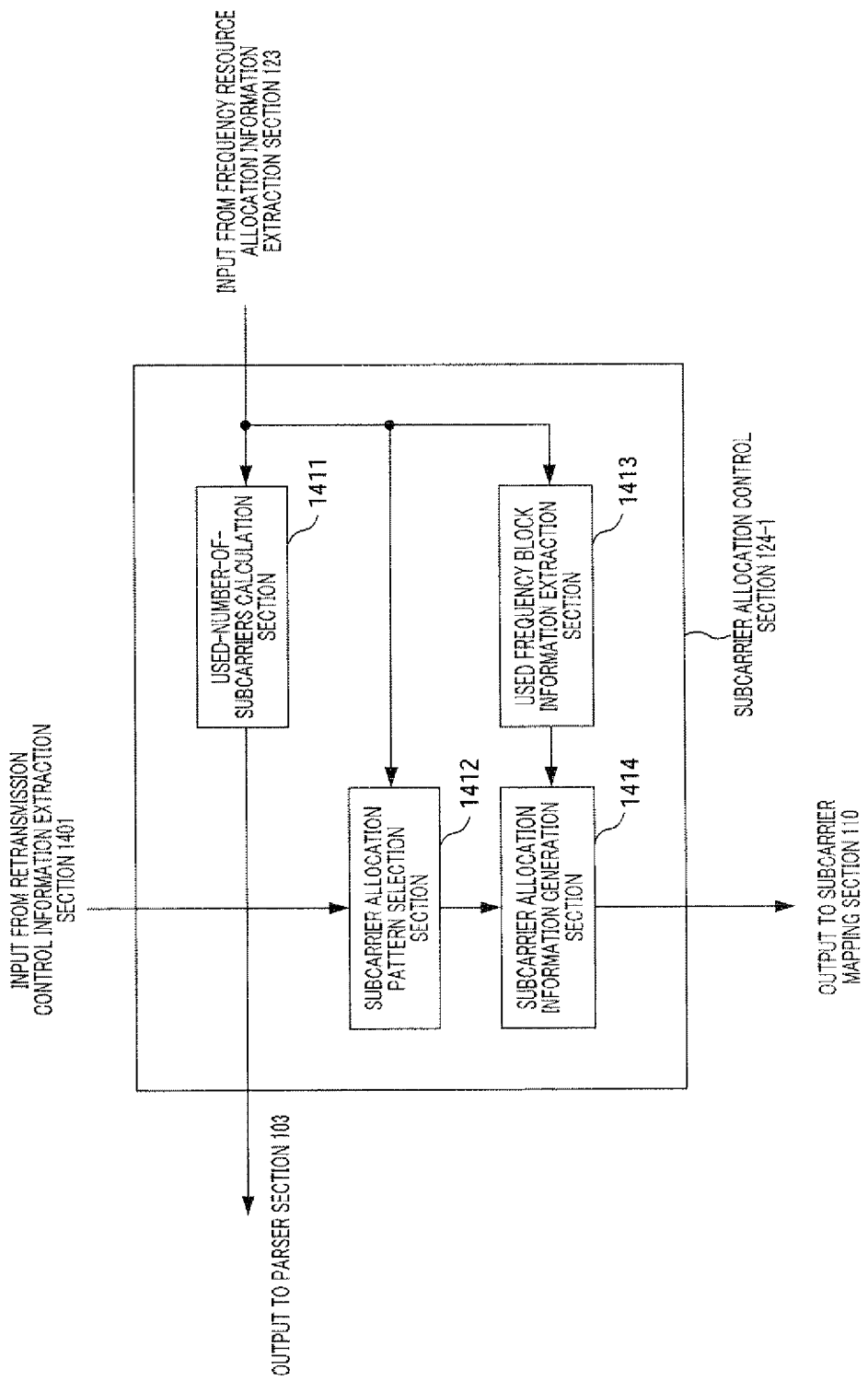
FIG. 26 is a block diagram showing a configuration of the subcarrier allocation control section in FIG. 25.

FIG. 26 shows the internal configuration of subcarrier allocation control section 124-1. Frequency resource allocation information from frequency resource allocation information extraction section 123 and number of retransmissions Kr from retransmission control information extraction section 1401 are input to subcarrier allocation control section 124-1.

Based on frequency resource allocation information, used-number-of-subcarriers calculation section 1411 calculates numbers of subcarriers N1 and N2 used for first and second subcarrier modulation signal allocation. Calculated numbers N1 and N2 are output to parser section 103. N1 and N2 information output to parser section 103 is used to distribute an encoded bit sequence input to parser section 103 from interleaver 102 to a first subcarrier modulation section and second subcarrier modulation section based on an N1:N2 ratio.

Placement patterns of a set of first and second subcarriers (hereinafter, a set of plurality of subcarriers is referred to as a subcarrier group) that can be utilized by the system are stored in subcarrier allocation pattern selection section 1412 in advance. Subcarrier allocation pattern selection section 1412 selects a placement pattern based on a combination of frequency resource allocation information and number of retransmissions Kr, and outputs the selected placement pattern to subcarrier allocation information generation section 1414.

Based on the frequency resource allocation information, used frequency block information extraction section 1413 extracts used frequency block information indicating to which subcarriers a subcarrier group combining first and second subcarrier modulation signals is allocated within the FFT bandwidth that is IFFT section 111 input, and outputs this used frequency block information to subcarrier allocation information generation section 1414.

Subcarrier allocation information generation section 1414 generates subcarrier allocation information based on the used frequency block information and subcarrier allocation pattern, and outputs this subcarrier allocation information to subcarrier mapping section 110. Subcarrier allocation information includes information on subcarrier positions to which first and second subcarrier modulation signals are allocated, and unused subcarrier positions (which have no subcarrier modulation signal allocated, and are regarded as null carriers).

Figure 27:
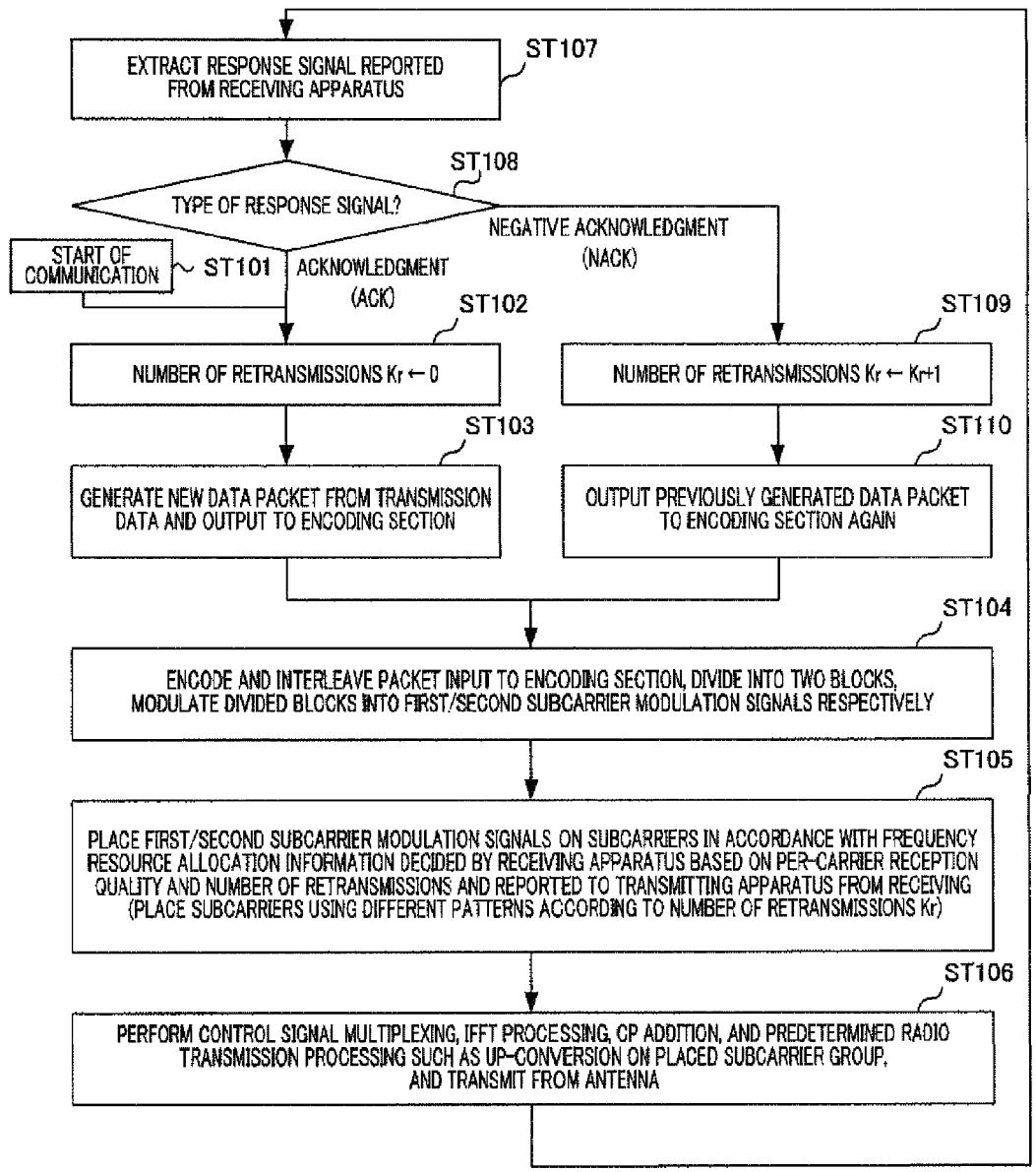
FIG. 27 is a flowchart showing processing performed by a transmitting apparatus of Embodiment 6.

The flowchart in FIG. 27 shows part of the processing performed by transmitting apparatus 1400 (terminal). After starting communication (step ST101), transmitting apparatus 1400 (terminal) first resets number of retransmissions Kr to 0 (step ST102), and then generates a new data packet from transmission data by means of packet generation section 1402 and outputs this to encoding section 101 (step ST103).

Then the same kind of processing as performed on transmission data in Embodiment 1 is performed on the generated data packet, and the data packet is transmitted from the antenna (steps ST104 through ST106). Following this, a response signal responding to the data packet transmitted by transmitting apparatus 1400 (terminal) is reported to transmitting apparatus 1400 (terminal) from the receiving apparatus. Processing from this point onward will now be described in detail.

Transmitting apparatus 1400 (terminal) is equipped with retransmission control information extraction section 1401 as a RF reception section 120 output destination. Retransmission control information extraction section 1401 extracts a response signal transmitted from the communicating-party receiving apparatus (step ST107).

The response signal indicates whether or not the data packet previously transmitted by transmitting apparatus 1400 (terminal) was received without error by the communicating party. The response signal represents ACK (Acknowledgment) if the previously transmitted data packet was received without error, or NACK (Negative Acknowledgment) if received with an error. By extracting this response signal, it is possible to judge whether or not HARQ retransmission is necessary.

A NACK (Negative Acknowledgment) response signal means that the communicating party is requesting retransmission of the data packet previously transmitted by transmitting apparatus 1400 (terminal), while an ACK (Acknowledgment) response signal means that transmitting apparatus 1400 (terminal) may transmit a new data packet. Retransmission control information extraction section 1401 identifies the type of this response signal (step ST108).

If the response signal type is NACK (Negative Acknowledgment), retransmission control information extraction section 1401 goes to step ST109, and calculates the number of times NACK (Negative Acknowledgment) has been reported consecutively for the same data packet—that is, calculates number of retransmissions Kr indicating how many times retransmission has been requested by the receiving apparatus (i.e. increments number of retransmissions Kr). Retransmission control information extraction section 1401 outputs the calculated number of retransmissions Kr to subcarrier allocation control section 124-1. Then, in step ST110, packet generation section 1402 again outputs the same data packet as previously generated to encoding section 101.

On the other hand, if the response signal type is ACK (Acknowledgment), retransmission control information extraction section 1401 goes to step ST102 from step ST108, and resets number of retransmissions Kr to 0.

Figure 28:
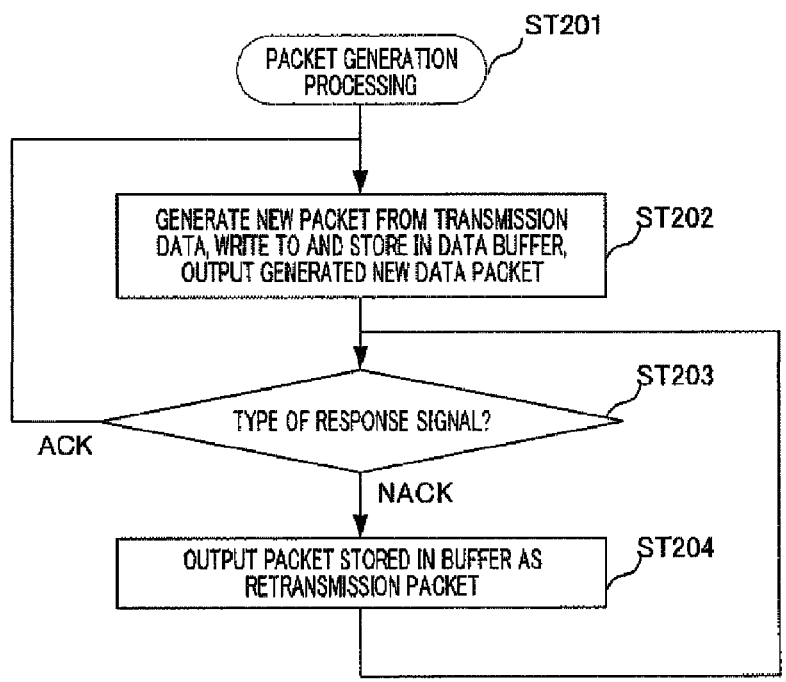
FIG. 28 is a flowchart showing packet generation processing.
Figure 29:
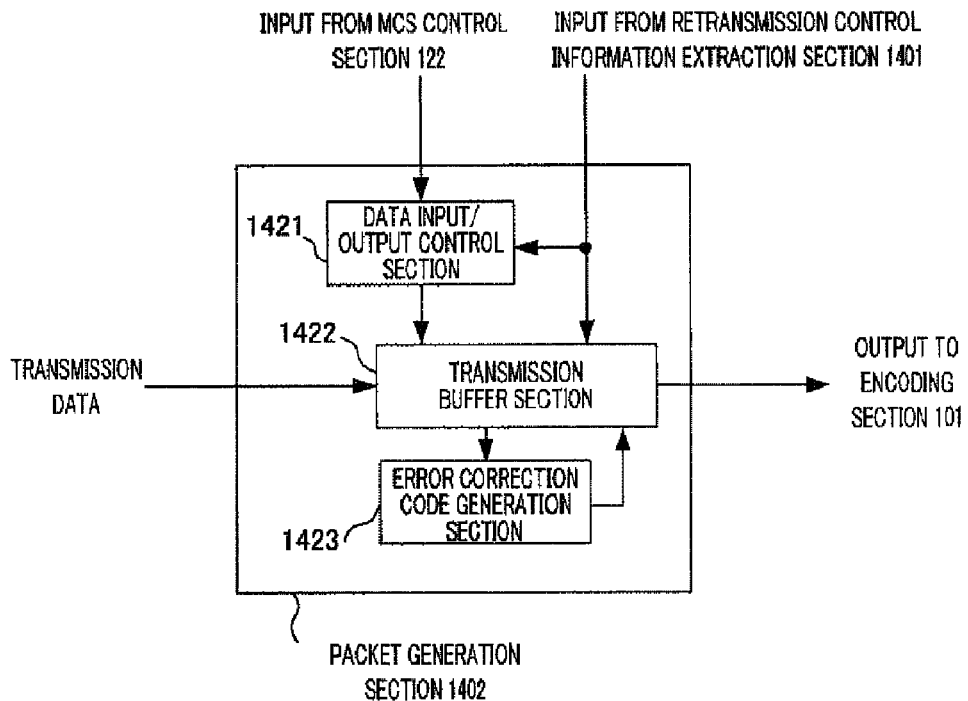
FIG. 29 is a block diagram showing a configuration of a packet generation section.

The flowchart in FIG. 28 shows part of the processing performed by packet generation section 1402, and FIG. 29 shows the internal configuration of packet generation section 1402. The configuration and operation of packet generation section 1402 will now be described using FIG. 28 and FIG. 29.

Packet generation section 1402 is internally equipped with data input/output control section 1421, transmission buffer section 1422, and error correction code generation section 1423. A response signal from retransmission control information extraction section 1401, coding rate and M-ary modulation value information from MCS control section 122, and transmission data, are input to packet generation section 1402. Packet generation section 1402 starts operation from step ST201 and performs packet generation processing. The operation of the packet generation section in each step is described below.

Step ST202: A new data packet is generated from transmission data, and output. A packet output at this time is hereinafter referred to as a "new packet."

First, data input/output control section 1421 calculates a number of bits that can be transmitted in one packet transmission based on the coding rate and M-ary modulation value input from MCS control section 122 and frequency resource allocation information input from frequency resource allocation information extraction section 123, and outputs the calculated result to transmission buffer section 1422 as an input directive signal.

Transmission buffer section 1422 first deletes a packet stored in internal memory (not shown) in accordance with the input directive signal, then fetches transmission data of the transmissible number of bits, and stores this anew in internal memory (not shown). Transmission buffer section 1422 also outputs transmission data of the transmissible number of bits to error correction code generation section 1423.

Error correction code generation section 1423 generates an error correction code for performing error checking on the receiving side from the transmission data, and outputs the generated error correction code to transmission buffer section 1422. An example of an error correction code method is a method using a Cyclic Redundancy Check (CRC).

Next, when the error correction code is input, transmission buffer section 1422 adds the error correction code to the end of the transmission data stored in internal memory and generates one packet, and outputs the generated packet to encoding section 101. One packet transmission processing procedure is performed by transmitting apparatus 1400 (terminal) by executing radio transmission processing described later herein on the new packet output here using the sections connected from encoding section 101 onward.

Transmission buffer section 1422 does not delete the generated packet after outputting it to encoding section 101, but keeps it stored in internal memory (not shown). In the above-described way, transmission data to which an error correction code has been added is output as a new packet, and is stored in transmission buffer section 1422 in preparation for retransmission.

Step ST203: Data input/output control section 1421 determines whether the type of a response signal is ACK (Acknowledgment) or NACK (Negative Acknowledgment). If the response signal is ACK (Acknowledgment), a new packet is generated and output by performing the processing in step ST202 again. If the response signal is NACK (Negative Acknowledgment), the processing in step ST204 described below is performed.

Step ST204: The same packet as previously output in step ST101 is output (hereinafter referred to as a retransmission packet).

Data input/output control section 1421 outputs to transmission buffer section 1422 an output directive signal for outputting again the packet stored in transmission buffer section 1422. Transmission buffer section 1422 outputs the packet stored in internal memory (not shown) to encoding section 101 as a retransmission packet in accordance with the output directive signal.

Thereafter, packet generation section 1402 repeats packet retransmission by repeating the loop comprising steps ST203-ST204-ST203 until ACK (Acknowledgment) is obtained in step ST203.

When a data packet is input from packet generation section 1402, encoding section 101 generates a coded packet by performing error correction encoding of the data packet using the coding rate indicated by MCS control section 122.

The coded packet is converted to a first subcarrier modulation signal and second subcarrier modulation signal via interleaver 102, parser section 103 first subcarrier modulation section 104, and second subcarrier modulation section 105, in the same way as in Embodiment 1, and is output to subcarrier mapping section 110 (step ST104).

Subcarrier mapping section 110 performs subcarrier placement of first subcarrier modulation section 104 output and second subcarrier modulation section 105 output respectively based on subcarrier allocation control information from subcarrier allocation control section 124-1, and outputs the resulting output to IFFT section 111 (step ST105).

In the same way as in Embodiment 1, a subcarrier modulation signal output from subcarrier mapping section 110 undergoes multiplexing with a pilot signal and control signal, IFFT processing, CP addition, and predetermined radio transmission processing such as up-conversion and transmission power control, by passing through IFFT section 111, CP adding section 114, and RF transmission section 115, and is then output to antenna 116 (step ST106).

FIG. 30 shows the nature of subcarrier allocation by subcarrier allocation control section 124-1. FIG. 30 shows examples in which a first subcarrier modulation signal is placed on subcarriers by means of localized placement. FIG. 30A shows placement when an input subcarrier modulation signal corresponds to a new packet, while FIG. 30B shows placement when an input subcarrier modulation signal corresponds to a retransmission packet at the time of a first retransmission.

The most important feature of this embodiment is that subcarriers on which these first and second subcarrier modulation signals are placed are changed according to the number of retransmissions.

Below, examples will be shown of suitable placement methods in a case in which first and second subcarrier modulation signal placement is changed according to the number of retransmissions. For the sake of explanation, subcarriers on which a first subcarrier modulation signal is placed are referred to as a first subcarrier group, and subcarriers on which a second subcarrier modulation signal is placed are referred to as a second subcarrier group. Also, the number of subcarriers included in a first subcarrier group is designated N1, the number of subcarriers included in a second subcarrier group is designated N2, and the number of subcarriers at consecutive positions in the frequency domain to which transmitting apparatus 1400 (terminal) can allocate first and second subcarrier groups is designated N3. In this case, $N1+N2 \leq N4$.

When a first subcarrier modulation signal is placed on subcarriers using localized placement, methods of changing subcarrier allocation every number of retransmissions include [Method 1] and [Method 2] below, for example.

[Method 1] Method based on stipulated pattern: A plurality of subcarrier allocation patterns are stipulated by the system, corresponding to an N1:N2 ratio. Then one pattern is selected from the plurality of provided patterns according to the N1:N2 ratio and number of retransmissions Kr. An advantage of this method is that, in the transmitting apparatus, a first subcarrier group and second subcarrier group can be decided with information on the N1:N2 ratio and number of retransmissions alone, and which subcarriers the first subcarrier group and second subcarrier group are allocated to need not be reported from the receiving apparatus to the transmitting apparatus.

At the time of an initial transmission (when Kr=0), methods of selecting which subcarrier allocation pattern is used include, for example, a method whereby a selection is made based on the criteria described in Embodiment 1 in accordance with channel quality measurement results by the receiving apparatus the first time only, and a method whereby a stipulated pattern is used irrespective of the channel quality.

If the method based on channel quality measurement results is used, first and second subcarrier group allocation can be performed according to per-subcarrier channel quality, and therefore subcarriers with good reception quality at the time of an initial transmission can be selected, and the probability of retransmission occurring can be reduced. On the other hand, with the method whereby a stipulated pattern is used irrespective of the channel quality, the frequency with which channel quality measurement by the receiving apparatus becomes necessary can be reduced, and the amount of information reported from the receiving apparatus to the transmitting apparatus can be decreased.

Examples of subcarrier allocation patterns according to Method 1 from the time of initial transmission onward are shown below for (1) a case in which (N3/2)<N1 and (2) a case in which (N3/2)≧N1.

Figures 31A, 31B:
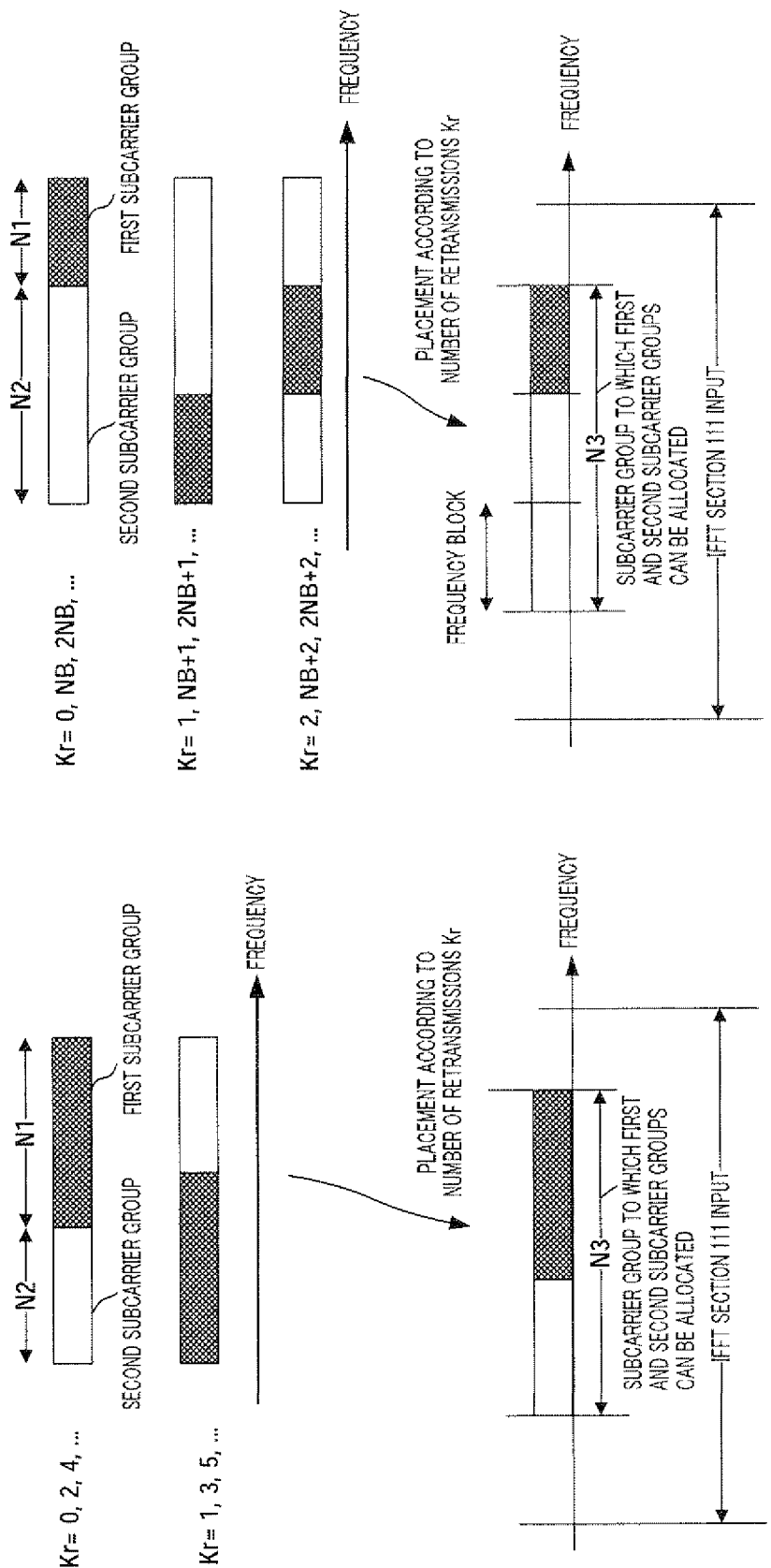
FIG. 31A shows subcarrier allocation when (N3/2)<N1.
FIG. 31B shows subcarrier allocation when (N3/2)≧N1.

(1) When (N3/2)<N1: The nature of subcarrier allocation in this case is shown in FIG. 31A. Subcarrier allocation control section 124-1 places a first subcarrier group on subcarriers with as little overlapping as possible in each retransmission. Consequently, when number of retransmissions Kr is an even number, among subcarriers to which allocation is possible, the first subcarrier group is placed on N1 consecutive subcarriers from the highest-frequency subcarrier to lower-frequency subcarriers (or from the lowest-frequency subcarrier to higher-frequency subcarriers), and a second subcarrier group is placed on subcarriers other than these.

FIG. 31A shows an example in which a first subcarrier group is placed on N1 consecutive subcarriers from the highest-frequency subcarrier to lower-frequency subcarriers when number of retransmissions Kr is an even number. When number of retransmissions Kr is an odd number, among subcarriers to which allocation is possible, a first subcarrier group is placed on N1 consecutive subcarriers from the lowest-frequency subcarrier to higher-frequency subcarriers (or from the highest-frequency subcarrier to lower-frequency subcarriers), and a second subcarrier group is placed on subcarriers other than these.

FIG. 31A shows an example in which a first subcarrier group is placed on N1 consecutive subcarriers from the lowest-frequency subcarrier to higher-frequency subcarriers when number of retransmissions Kr is an odd number. By performing placement in this way, a first subcarrier group is subjected to localized placement on consecutive subcarriers in the frequency domain even at the time of a retransmission, enabling the PAPR to be suppressed.

In addition, the number of first subcarrier group subcarriers placed on the same subcarriers in an overlapping manner can be made extremely small both when number of retransmissions Kr is an even number and when number of retransmissions Kr is an odd number, enabling frequency diversity gain due to retransmission to be increased.

(2) When (N3/2)≧N1: The nature of subcarrier allocation in this case is shown in FIG. 31B. A subcarrier group that can be utilized by allocation of first and second subcarrier groups is divided into frequency blocks comprising equal numbers of subcarriers. The frequency block size is made greater than or equal to N1. Subcarrier allocation control section 124-1 selects one of the frequency blocks in accordance with a pattern stipulated every number of retransmissions Kr, and a first subcarrier group is sequentially placed there.

It is desirable for the size of N1 to be set so that the size of a frequency block can be made equal to N1, but if the size of a frequency block is smaller than N1, the first subcarrier group is allocated to N1 consecutive subcarriers in order from a high-frequency subcarrier or low-frequency subcarrier in the frequency block. A second subcarrier group is placed on subcarriers other than subcarriers to which the first subcarrier group is allocated.

If the number of frequency blocks is NB, one subcarrier group is allocated to the same subcarriers every NB retransmissions. By performing subcarrier allocation in frequency block units in this way, it is possible for the amount of information necessary for control to be made smaller than when allocation is performed in subcarrier units. In addition, in up to NB retransmissions, it is possible to place a second subcarrier group in a subcarrier arrangement that does not overlap every retransmission.

Figure 32A:
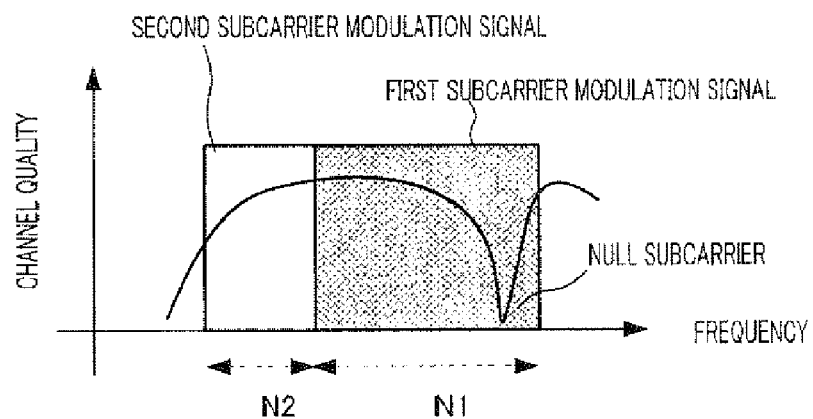
FIG. 32A shows an example of frequency resource allocation at the time of an initial transmission.
Figure 32B:
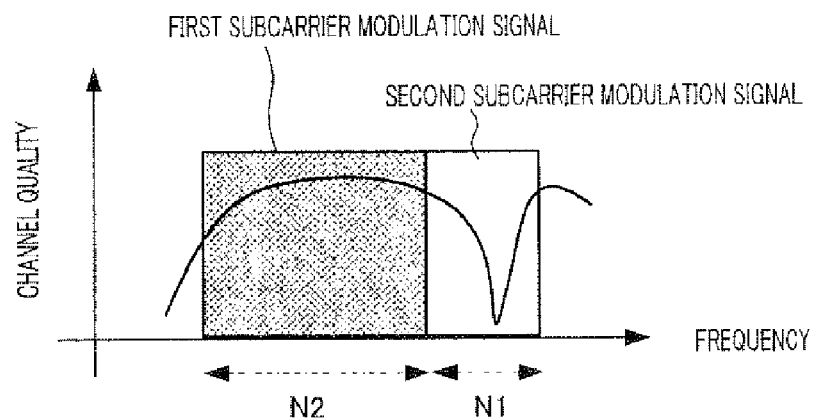
FIG. 32B shows an example of frequency resource allocation at the time of a first retransmission.

FIG. 32A shows an example in which frequency resource allocation at the time of a new packet transmission according to this embodiment is performed in accordance with [Method 1], and FIG. 32B shows an example of frequency resource allocation at the time of a retransmission packet transmission when the packet transmitted in FIG. 32A is erroneously received. In these examples, cases are shown in which channel time fluctuation is gentle with respect to a time period until a packet is retransmitted, and channel quality hardly changes.

At the time of a new transmission in FIG. 32A, a second subcarrier modulation signal is allocated to subcarriers with high channel quality on average. Consequently, a second subcarrier modulation signal can be received with good characteristics. On the other hand, there is a subcarrier with extremely low channel quality (a null subcarrier) among the subcarriers to which a first subcarrier modulation signal is allocated, and this causes degradation of the reception characteristics of a modulation symbol modulated as a first subcarrier modulation signal.

In a first subcarrier modulation signal, individual symbol components included in N1 outputs from carrier modulation section 106 are included in a form in which all DFT section outputs (one subcarrier group) are multiplied by a DFT operator by passing through DFT section 107. In other words, N1 modulation symbol signal components are included in one subcarrier of a first subcarrier modulation signal.

That is to say, with a first subcarrier modulation signal, if the channel quality of one subcarrier degrades, the channel quality of all N1 modulation symbols falls on average. For a first subcarrier modulation signal, individual modulation symbols are extracted while suppressing multipath interference by applying ZF standard or MMSE standard frequency domain equalization, but if a poor-quality subcarrier is present at the time of frequency domain equalization, residual multipath interference after equalization increases, and therefore the channel quality of a plurality of modulation symbols falls.

Here, in a second subcarrier modulation signal, individual symbol components included in N2 outputs from carrier modulation section 108 are mapped one-to-one to individual S/P section outputs. Consequently, with a second subcarrier modulation signal, even if the channel quality of one subcarrier degrades, a fall in channel quality due to that subcarrier is limited to only one of the N2 modulation symbols.

Therefore, if subcarrier allocation is not changed at the time of a retransmission, and retransmission is performed using the same placement as in FIG. 32A, received signals with poor reception quality will be combined for a first subcarrier modulation signal, and characteristic improvement due to combining will be limited.

In contrast, in this embodiment subcarrier allocation is changed as shown in FIG. 32B when retransmitting, and therefore a first subcarrier modulation signal is allocated to subcarriers with good channel quality, and a first subcarrier modulation signal is received with better characteristics than at the time of the initial transmission.

On the other hand, although part of a second subcarrier modulation signal becomes a null subcarrier, it is received with better characteristics than by means of the initial transmission alone. Therefore, by combining an initial transmission packet and a retransmission packet in the receiving apparatus by means of a method described later herein, variance in the post-combining reception quality of code bits corresponding to a first subcarrier modulation signal and second subcarrier modulation signal respectively can be reduced. As a result, the probability of an error being included in a packet after error correction decoding can be reduced.

As described in Embodiment 1, a method may also be applied whereby MCS setting by carrier modulation section 106 and carrier modulation section 108 for a first subcarrier modulation signal and second subcarrier modulation signal is decided based on first subcarrier modulation signal reception characteristics.

In this case, since subcarrier allocation is changed due to a retransmission, even if the channel quality of a subcarrier allocated to a second subcarrier modulation signal degrades, when first and second subcarrier modulation signal reception characteristics are compared the probability of second subcarrier modulation signal reception characteristics being better than first subcarrier modulation signal reception characteristics increases, and therefore the characteristic improvement effect of changing subcarrier allocation at the time of a retransmission is not impaired.

The reason for this is as follows. Namely, a received signal corresponding to a first subcarrier modulation signal is susceptible to multipath interference that cannot be eliminated even by using frequency domain equalization due to the influence of channel estimation error or the like, and its reception characteristics are prone to degradation. In particular, the larger the M-ary modulation value in a modulation method, the greater is such susceptibility. Consequently, if the reception characteristics of first and second subcarrier modulation signals are compared when channel quality is of the same level for both and the same M-ary modulation value is used for both, there is a high probability of second subcarrier modulation signal reception characteristics being better than first subcarrier modulation signal reception characteristics. This is particularly pronounced when a modulation method with a high M-ary modulation value, such as 16QAM or 64QAM, is used.

Therefore, setting an MCS based on first subcarrier modulation signal reception characteristics enables good reception characteristics to be obtained for a single retransmission packet. Furthermore, performing combining with a previous packet transmitted using different subcarrier allocation enables post-combining reception quality variance to be reduced and good reception characteristics to be obtained.

When time fluctuation of a channel is sufficiently fast relative to a time interval until a packet is retransmitted, and per-retransmission channel correlation is low, subcarrier allocation is not changed for each retransmission and variance in the post-combining reception quality of code bits corresponding to a first subcarrier modulation signal and second subcarrier modulation signal respectively is reduced compared with a case in which channel correlation is high, and therefore the characteristic improvement effect due to the use of [Method 1] is weakened. However, even in this case, the use of [Method 1] is not a cause of degradation.

Figure 33A:
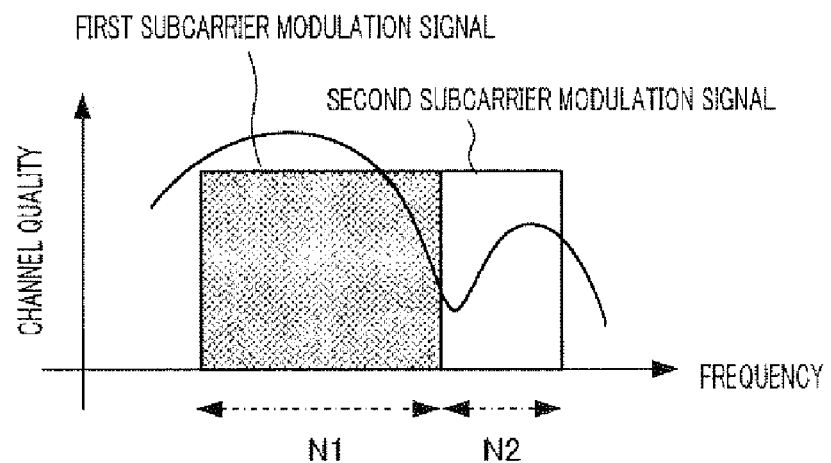
FIG. 33A shows an example of frequency resource allocation at the time of quality prioritization.
Figure 33B:
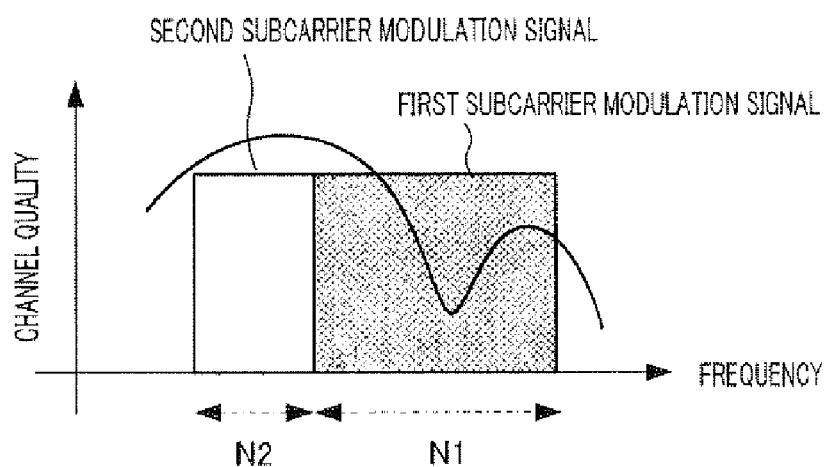
FIG. 33B shows an example of frequency resource allocation at the time of rate prioritization.

[Method 2] Frequency resource allocation is performed that takes the QoS of transmission data into consideration, as described in Embodiment 1. The nature of subcarrier allocation by means of [Method 2] is shown in FIG. 33A and FIG. 33B. Subcarrier allocation for first and second subcarrier modulation signals at the time of a retransmission is changed as described below according to whether quality is prioritized or rate is prioritized. By this means, the same kind of effect as described in Embodiment 1 is obtained.

When quality is prioritized, a first subcarrier modulation signal is allocated preferentially to subcarriers with good channel quality, and a second subcarrier modulation signal is allocated to the remaining subcarriers, as shown in FIG. 33A. Since characteristic degradation due to multipath interference is greater for a first subcarrier modulation signal than for a second subcarrier modulation signal, preferentially allocating that first subcarrier modulation signal to subcarriers with good channel quality enables characteristic degradation due to multipath interference to be suppressed, and high reception quality to be obtained.

When rate is prioritized, a second subcarrier modulation signal is allocated preferentially to subcarriers with good channel quality, and a first subcarrier modulation signal is allocated to the remaining subcarriers, as shown in FIG. 33B. Since characteristic degradation due to multipath interference is small and a rate increasing effect of application of a high M-ary modulation value is great for a second subcarrier modulation signal, preferentially allocating a second subcarrier modulation signal to subcarriers with good channel quality enables a high transmission rate to by obtained by using a high M-ary modulation value.

The above-described configuration is particularly effective when channel time fluctuation is sufficiently fast relative to a time interval until a packet is retransmitted (that is, when channel time fluctuation is shorter than a packet transmission interval, and correlation between channels on which packets are transmitted is low), and transmission of channel quality measurement information from a receiving apparatus keeps pace with channel fluctuation.

Figure 34:
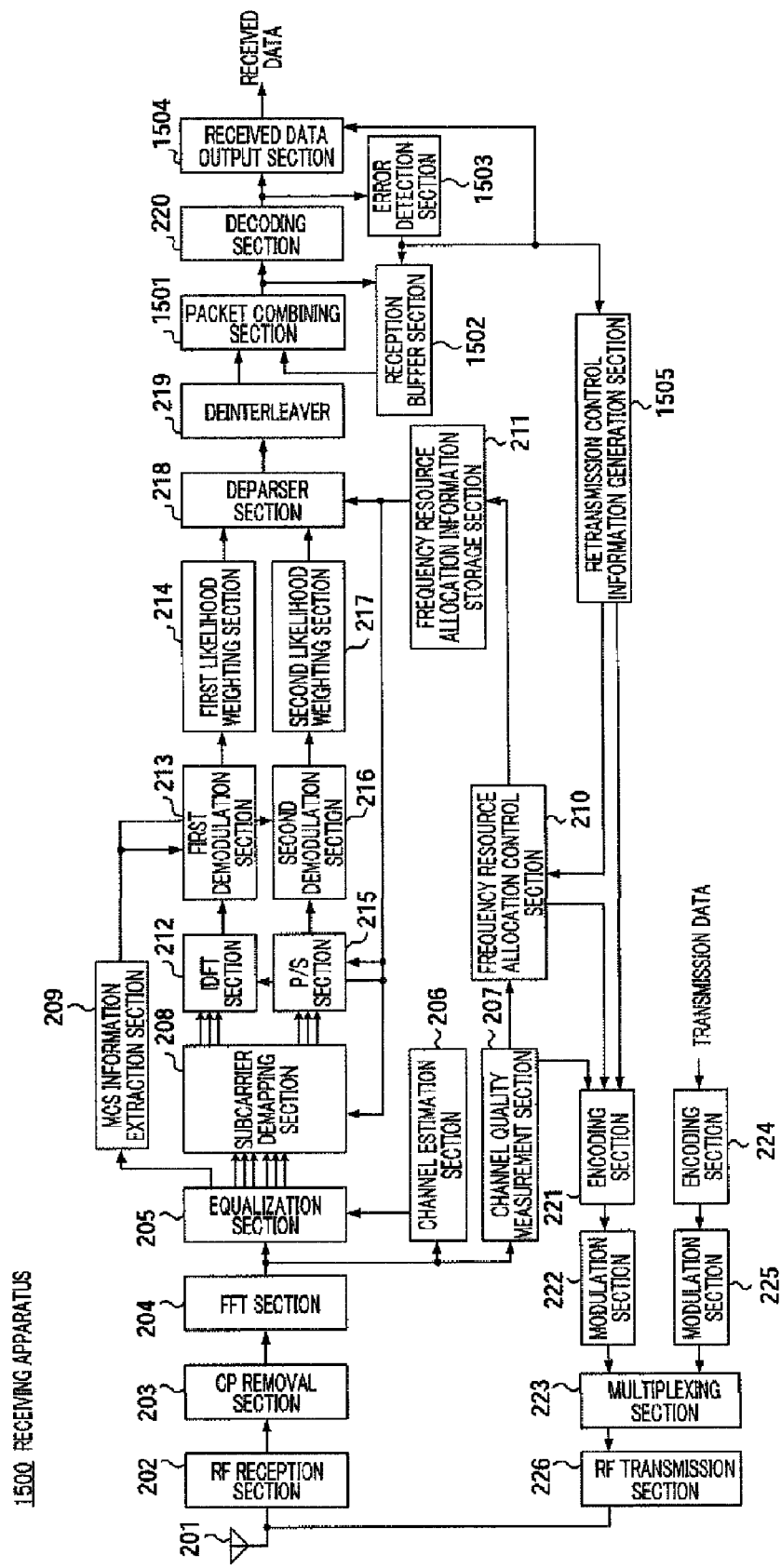
FIG. 34 is a block diagram showing a configuration of a receiving apparatus of Embodiment 6.

A configuration of a receiving apparatus of this embodiment is shown in FIG. 34. Parts in FIG. 34 corresponding to parts in FIG. 5 are assigned the same reference codes as in FIG. 5. Receiving apparatus 1500 (base station) is provided in a base station of a communication system, and receives and demodulates a signal transmitted from transmitting apparatus 1400 (terminal).

First, the reception system of receiving apparatus 1500 (base station) will be described.

A series of processing operations performed by antenna 201 through deinterleaver 219 in receiving apparatus 1500 (base station) are the same as in Embodiment 1, and therefore detailed descriptions thereof are omitted here, but it is a particular presupposition of this embodiment that these reception processing operations are performed in packet units. Consequently, per-code-bit soft decision likelihood values output from deinterleaver 219 are output collectively in received packet units. All processing described hereinafter in this embodiment is also performed in packet units.

A soft decision likelihood value of a packet received in current reception processing, output from deinterleaver 219, is input to packet combining section 1501. In addition, a packet soft decision likelihood value accumulated up to the previous time, output from reception buffer section 1502, is also input to packet combining section 1501. However, provision is made for input to be performed from reception buffer section 1502 only when an error was detected in the packet received the previous time—that is, when the packet received this time is a retransmission packet.

Figure 36A:
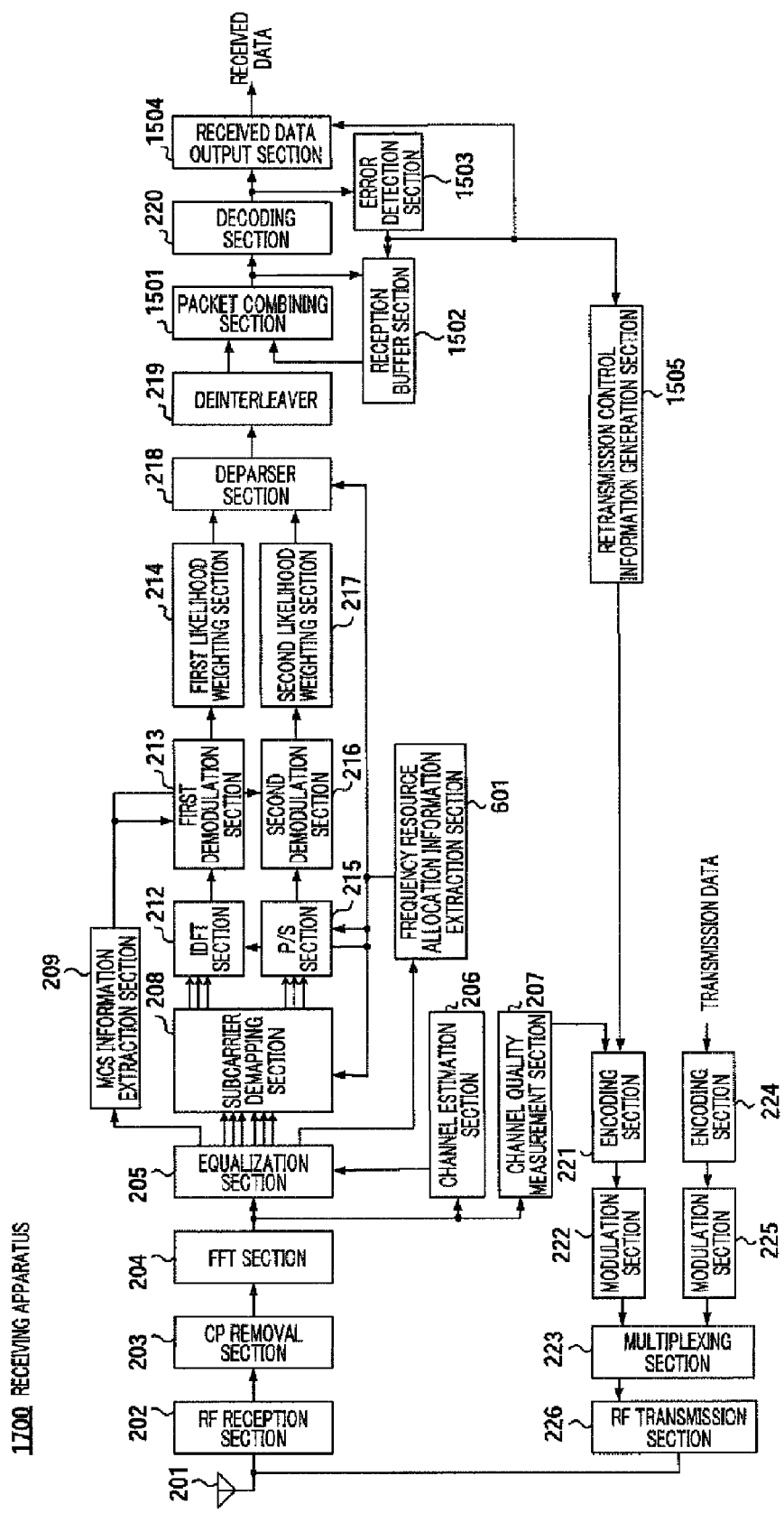
FIG. 36A is a block diagram showing a configuration of a receiving apparatus of Embodiment 7.
Figure 36B:
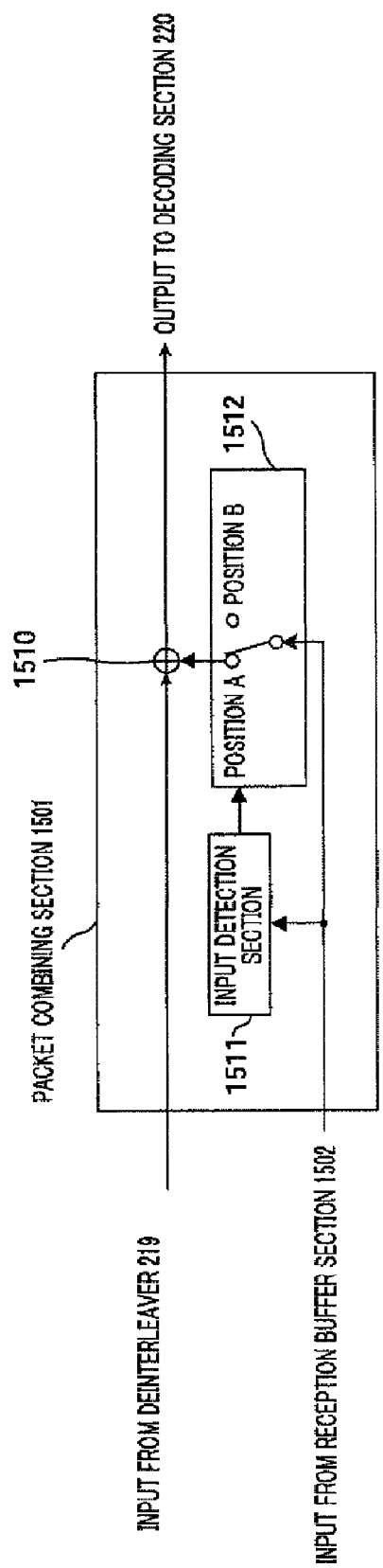
FIG. 36B is a block diagram showing an example of the configuration of a packet synthesizing section.

Packet combining section 1501 shown in FIG. 36B is equipped with input detection section 1511, switching section 1512, and addition section 1510. When a soft decision likelihood value of a packet received this time and a packet soft decision likelihood value accumulated up to the previous time are both input, packet combining section 1501 performs Combining Processing 1 below. On the other hand, when only a soft decision likelihood value of a packet received this time is input, packet combining section 1501 performs Combining Processing 2 below.

Combining Processing 1: In this case, the packet received this time is a retransmission packet, and therefore a soft decision likelihood value of the packet received this time and a packet soft decision likelihood value accumulated up to the previous time are combined by being added in units of code bits included in the packets. In the case of Combining Processing 1, input detection section 1511 detects that a soft decision likelihood value up to the previous time has been input from reception buffer section 1502. On detecting that a soft decision likelihood value has been input, input detection section 1511 switches the state of switching section 1512 to position A. By this means, a soft decision likelihood value of the packet received in the current reception processing and a packet soft decision likelihood value accumulated up to the previous time are combined by adder 1510. A combined packet soft decision likelihood value is output to decoding section 220 and reception buffer section 1502.

Combining Processing 2: In this case, the packet received this time is a new packet, and therefore a soft decision likelihood value of the packet received this time is output directly to decoding section 220 and reception buffer section 1502. That is to say, packet combining is not performed in this case. In the case of Combining Processing 2, nothing is input to input detection section 1511 from reception buffer section 1502. In this case, input detection section 1511 switches the state of switching section 1512 to position B. By this means, only a soft decision likelihood value of the packet received in the current reception processing is output to decoding section 220 and reception buffer section 1502.

Decoding section 220 performs decoding processing based on a soft decision likelihood value of each bit included in the combined output by packet by packet combining section 1501. A data packet decoded by decoding section 220 is sent to error detection section 1503 and received data output section 1504.

Using an error detection code added by packet generation section 1402 of transmitting apparatus 1400 (terminal), error detection section 1503 determines whether or not an error is included in the decoded data packet. Error detection section 1503 generates NACK (Negative Acknowledgment) as a response signal if an error is detected in the decoded data packet, or generates ACK (Acknowledgment) if an error is not detected. Error detection section 1503 sends the generated response signal to reception buffer section 1502, received data output section 1504, and retransmission control information generation section 1505.

When a soft decision likelihood value of packets up to this time is input from packet combining section 1501, reception buffer section 1502 stores this in internal memory. Then, when ACK (Acknowledgment) is input as a response signal from the error detection section, the soft decision likelihood value stored in internal memory is discarded. If NACK (Negative Acknowledgment) is input as a response signal, the soft decision likelihood value is kept stored in internal memory. A soft decision likelihood value stored up to this time is output to packet combining section 1501 at the same time as a soft decision likelihood value of the next packet is output from deinterleaver 219. If nothing is stored in the memory, nothing is output.

When ACK (Acknowledgment) is input from error detection section 1503 as a response signal, received data output section 1504 outputs as received data a part corresponding to transmission data within a data packet input from decoding section 220. If NACK (Negative Acknowledgment) has been input as a response signal, nothing is output. As described above, only data transmitted from transmitting apparatus 1400 (terminal) without error is output as received data.

Next, the transmission system of receiving apparatus 1500 (base station) will be described.

A response signal from error detection section 1503 is input to retransmission control information generation section 1505. Retransmission control information generation section 1505 calculates number of retransmissions Kr indicating how many times NACK (Negative Acknowledgment) has been input consecutively as a response signal. Retransmission control information generation section 1505 sends number of retransmissions Kr to frequency resource allocation control section 210, and sends a response signal to encoding section 221.

Frequency resource allocation control section 210 controls which of first and second subcarrier modulation section 104 and 105 outputs is allocated to which subcarriers based on per-subcarrier channel quality information output from channel quality measurement section 207 and number of retransmissions Kr. That is to say, in the same way as in Embodiment 1, frequency allocation information decided here is transmitted to transmitting apparatus 1400 (terminal) in FIG. 25, and in transmitting apparatus 1400 (terminal) control is performed as to which subcarriers first and second subcarrier modulation section 104 and 105 outputs are placed on based on this frequency allocation information. Also, frequency resource allocation information is stored in frequency resource allocation information storage section 211, and is used for separation of a first subcarrier modulation signal and second subcarrier modulation signal when a packet transmitted from transmitting apparatus 1400 (terminal) is received.

As described above, packet retransmission is possible between transmitting apparatus 1400 (terminal) and receiving apparatus 1500 (base station) in which subcarrier allocation is changed according to an HARQ number of retransmissions. In this embodiment, with regard to a packet soft decision likelihood value that is packet combining section output, changing subcarrier allocation enables variance in reception quality between bits allocated to a first subcarrier modulation signal and bits allocated to a second subcarrier modulation signal to be reduced, and allows an improvement in reception characteristics after error correction decoding to be expected.

In this embodiment, variance in reception quality between bits allocated to a first subcarrier modulation signal and bits allocated to a second subcarrier modulation signal is reduced by making the operation of subcarrier allocation control section 124-1 of transmitting apparatus 1400 (terminal) in FIG. 25 variable according to number of retransmissions Kr.

As a different mode, subcarrier allocation may be fixed, while an interleave pattern used in interleaver 102 and deinterleaver 219 operations is made variable according to number of retransmissions Kr. Specifically, an interleaver control section is provided that performs variable control of an interleave pattern of interleaver 102 according to the number of retransmissions. As a result, encoding section 101 output bits are allocated to different subcarriers in each retransmission, enabling variance in reliability between bits in a packet combining section output soft decision likelihood value to be reduced, and reception characteristics to be improved.

With this configuration, an apparatus can be made simpler than in the case of the previously described configuration. This is because only a number of interleavers necessary for number of retransmissions Kr need be provided, whereas a number of subcarrier allocation patterns necessary for a combination of number of retransmissions Kr and N1:N2 must be provided.

On the other hand, with regard to the method of changing an interleaver, it is difficult to implement flexible subcarrier placement according to the reception characteristics of individual subcarriers, and therefore the degree of quality improvement that can be achieved by pattern changing at the time of a retransmission is limited.

In this embodiment, a case has been described in which packet combining section 1501 of receiving apparatus 1500 (base station) in FIG. 34 simply adds soft decision likelihoods included in a received packet without regard to the number of retransmissions, but it is preferable to execute weighting according to per-bit reception quality before performing addition. That is to say, it is preferable to multiply a packet soft decision value by a large weighting coefficient for a packet with high reception quality, or by a small weighting coefficient for a packet with low reception quality, before performing addition.

As an indicator of channel quality, a packet average reception SINR or the like measured by channel quality measurement section 207 may be used. Although not shown in the drawings, if an average reception SINR is input to packet combining section 1501, and weighting proportional to the average reception SINR is executed before performing packet addition, the same kind of effect can be obtained as by performing maximal-ratio combining of packets.

Also, in this embodiment a case has been described in which a CC method is used as an HARQ method, but it is also possible to use an IR (Incremental Redundancy) method from among HARQ methods as a separate embodiment. Details of an IR method are given in Non-Patent Document 4, for example, and therefore a detailed description thereof is omitted here. Actually, in a broad sense, a CC method is also considered to be a form of IR method (see Non-Patent Document 5, for example). When a CC method is used, the same encoded bit sequence as in an initial transmission is transmitted as a retransmission packet, whereas when an IR method is used, a different encoded bit sequence from that in an initial transmission is transmitted as a retransmission packet.

With an IR method, an encoded bit sequence forming a retransmission packet includes the same bits as transmitted up to the previous time and newly added bits (such as a parity bit), and accordingly some bits transmitted up to the previous time are not included. Therefore, if the same bits are included in both packets to be combined when packet soft decision likelihood values are combined by packet combining section 1501, those soft decision likelihood values are added before output, and for a bit included in only one of the packets, a logarithmic likelihood value of that bit is output directly. In general, an IR method enables better reception quality to be obtained than a CC method by transmitting with new encoded bits added (see Non-Patent Document 4, etc.).

(Embodiment 7)

In this embodiment, a description will be given of a configuration that provides an HARQ function when a transmitting apparatus that transmits a signal in which first and second subcarrier modulation signals are mixed is provided in a base station.

Below, only configuration parts that differ from Embodiment 6 will be described.

Figure 35:
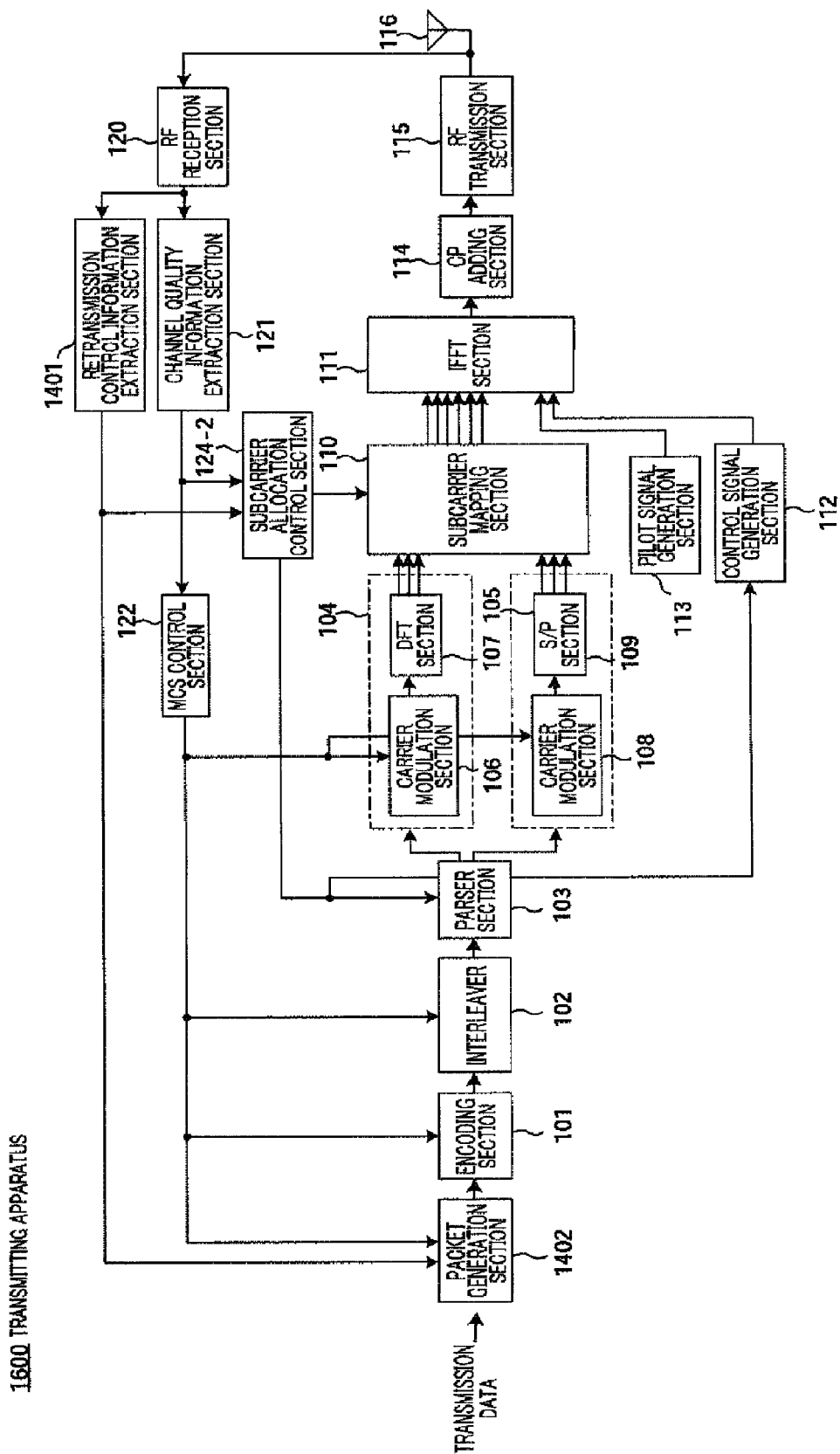
FIG. 35 is a block diagram showing a configuration of a transmitting apparatus of Embodiment 7.

FIG. 35, in which parts corresponding to those in FIG. 3, FIG. 10, and FIG. 25 are assigned the same reference codes as in FIG. 3, FIG. 10, and FIG. 25, shows the configuration of transmitting apparatus 1600 of this embodiment. Transmitting apparatus 1600 is provided in a base station.

Channel quality information extraction section 121 of transmitting apparatus 1600 extracts channel quality information transmitted from a receiving apparatus (terminal) from a received signal. Retransmission control information extraction section 1401 calculates a number of retransmissions based on a response signal transmitted from the receiving apparatus.

Based on the channel quality information, subcarrier allocation control section 124-2 decides which subcarriers in the transmission band are to be used by transmitting apparatus 1600 when transmitting. In addition, based on the channel quality information and number of retransmissions, subcarrier allocation control section 124-2 decides subcarrier distribution for allocating a first subcarrier modulation signal and second subcarrier modulation signal, and outputs the results to parser section 103 and subcarrier mapping section 110.

FIG. 36A, in which parts corresponding to those in FIG. 5, FIG. 11, and FIG. 34 are assigned the same reference codes as in FIG. 5, FIG. 11, and FIG. 34, shows a configuration of a receiving apparatus of this embodiment. Receiving apparatus 1700 is provided in a terminal.

In this embodiment, subcarrier allocation in accordance with a number of retransmissions is decided by transmitting apparatus 1600 (base station) in FIG. 35 and reported to receiving apparatus 1700 (terminal). Therefore, in receiving apparatus 1700 (terminal), frequency resource allocation information extraction section 601 extracts subcarrier allocation information transmitted from transmitting apparatus 1600. Then, based on the extracted subcarrier allocation information, subcarrier mapping section 208 can separate a subcarrier group to which a first subcarrier modulation signal is allocated and a subcarrier group to which a second subcarrier modulation signal is allocated.

According to this embodiment, the same kind of effect can be obtained as in Embodiment 6.

In the above embodiment, in order for subcarrier allocation to be controlled by transmitting apparatus 1600 (base station) based on channel quality information observed by receiving apparatus 1700 (terminal), channel quality information is reported to transmitting apparatus 1600 (base station) from receiving apparatus 1700 (terminal). Here, possible ways of reducing overhead due to the reporting signal are a mode whereby channel quality information reported from a terminal to a base station is kept to the minimum necessary for deciding an MCS, such as an average reception SINR of all subcarrier groups used, for example, or a mode whereby an MCS itself is reported and channel quality information is not reported. Even in such cases, the reception quality of subcarrier groups to which first and second subcarrier modulation signals are allocated fluctuates greatly in each retransmission if observed only for the respective subcarrier groups because subcarrier allocation is changed according to the number of retransmissions, and therefore reception characteristics can be improved by executing weighting in accordance with reception quality in receiving apparatus 1700 (terminal) before performing soft decision likelihood combining.

(Embodiment 8)

In this embodiment, a description will be given of a configuration in which an IR method is applied from among HARQ methods, and a modulation symbol corresponding to each code bit is assigned to a first or second subcarrier modulation signal according to the importance of the code bit.

Figure 37:
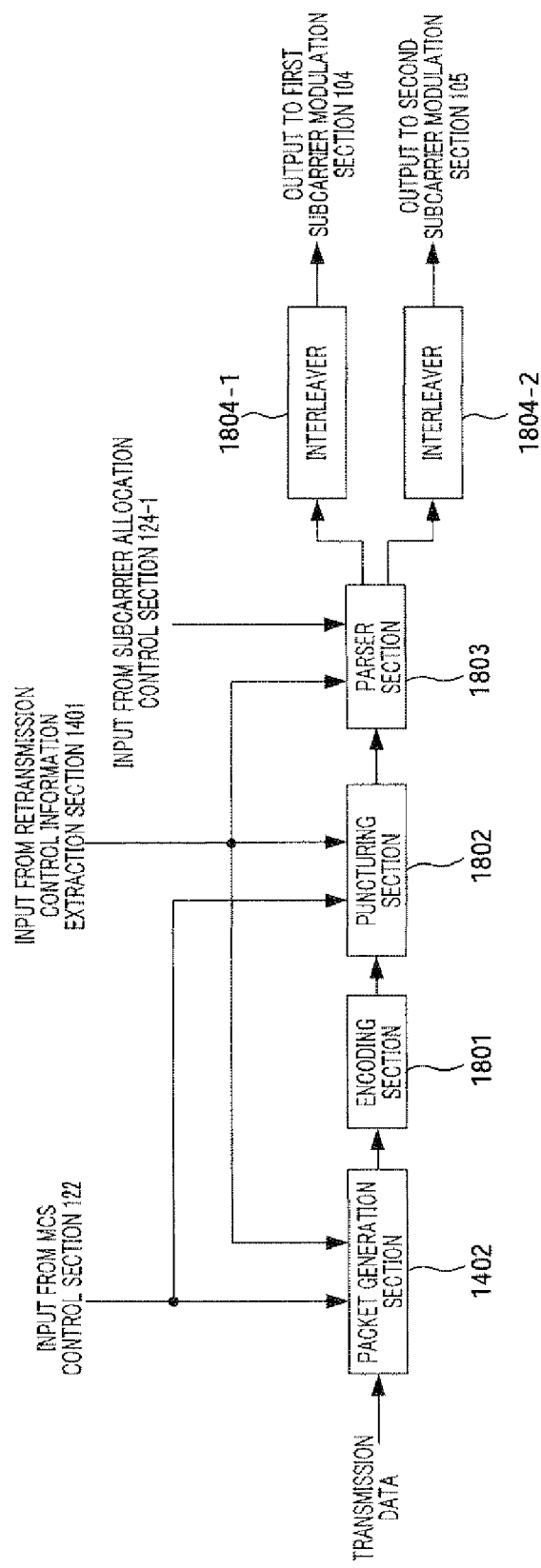
FIG. 37 is a block diagram showing another configuration of a transmitting apparatus of Embodiment 8.

FIG. 37, in which parts corresponding to those in FIG. 3 and FIG. 25 are assigned the same reference codes as in FIG. 3 and FIG. 25, shows the configuration of the principal parts of transmitting apparatus 1800 of this embodiment. In FIG. 37, only configuration peripheral parts newly proposed in this embodiment are shown; the rest of the configuration is the same as in FIG. 25, and is omitted here.

Based on transmission data, a coding rate, and an M-ary modulation value, packet generation section 1402 generates a new packet if ACK (Acknowledgment) has been input as a response signal, or a retransmission packet if NACK (Negative Acknowledgment) has been input, and outputs the generated packet to encoding section 1801.

Encoding section 1801 encodes the data packet and generates a coded packet, and outputs this to puncturing section 1802. The coded packet is composed of two kinds of bit sequences: systematic bits indicating the same value as the data packet, and parity bits generated by applying convolutional encoding or block encoding to the data packet. If a Turbo code is used as an error correction code, turbo encoding with coding rate $r=\frac{1}{3}$ should be performed. For example, when an $r=\frac{1}{3}$ Turbo code is used, one systematic bit sequence and two different parity bit sequences are generated, and are output to puncturing section 1802.

Using a coding rate input from MCS control section 122 and number of retransmissions Kr input from retransmission control information extraction section 1401, puncturing section 1802 performs puncturing on the coded packet, and outputs a post-puncturing signal to parser section 1803. Puncturing section 1802 changes a selection pattern of puncture bits that are eliminated from a coded packet according to number of retransmissions Kr.

A puncture bit selection pattern employed when a Turbo code is used for encoding is shown in Non-Patent Document 6, for instance. A puncture bit selection pattern employed when an LDPC code is used for encoding is shown in Non-Patent Document 7, for instance.

If channel quality fluctuation in each retransmission is large, the coding rate decided by MCS control section 122 may be changed each time a retransmission is performed.

As a result of changing the coding rate as described above, the puncture bit selection pattern changes. By newly transmitting puncture bits that were not transmitted the previous time in this way, better characteristics can generally be obtained with an IR method than with a CC method.

Based on distribution information from subcarrier allocation control section 124-1, parser section 1803 outputs a bit sequence forming an input coded packet to either interleaver 1804-1 or interleaver 1804-2. At this time, parser section 1803 preferentially outputs systematic bits within the coded packet to interleaver 1804-2 if number of retransmissions Kr=0, or outputs parity bits preferentially to interleaver 1804-2 if Kr>0.

Interleaver 1804-1 interleaves an input encoded bit sequence in accordance with a predetermined interleave pattern, and outputs post-interleaving data to first subcarrier modulation section 104. Similarly, interleaver 1804-2 interleaves an input encoded bit sequence in accordance with a predetermined interleave pattern, and outputs post-interleaving data to second subcarrier modulation section 105.

By employing the above configuration, systematic bits can be transmitted allocated preferentially to a second subcarrier modulation signal when number of retransmissions Kr=0. Thus, the characteristic of second subcarrier modulation signal reception quality being better than first subcarrier modulation signal reception quality can be utilized to improve the reception quality of high-importance systematic bits as information, and to improve overall transmission signal reception quality.

When number of retransmissions Kr>0, parity bits can be transmitted allocated preferentially to a second subcarrier modulation signal. Thus, overall transmission signal reception quality can be improved by improving the reception quality of parity bits newly generated for a retransmission. Incidentally, when Kr>0, systematic bits have already been transmitted at least once, and therefore a reception quality improvement effect is relatively low even if they are transmitted allocated to a second subcarrier modulation signal.

Figure 38:
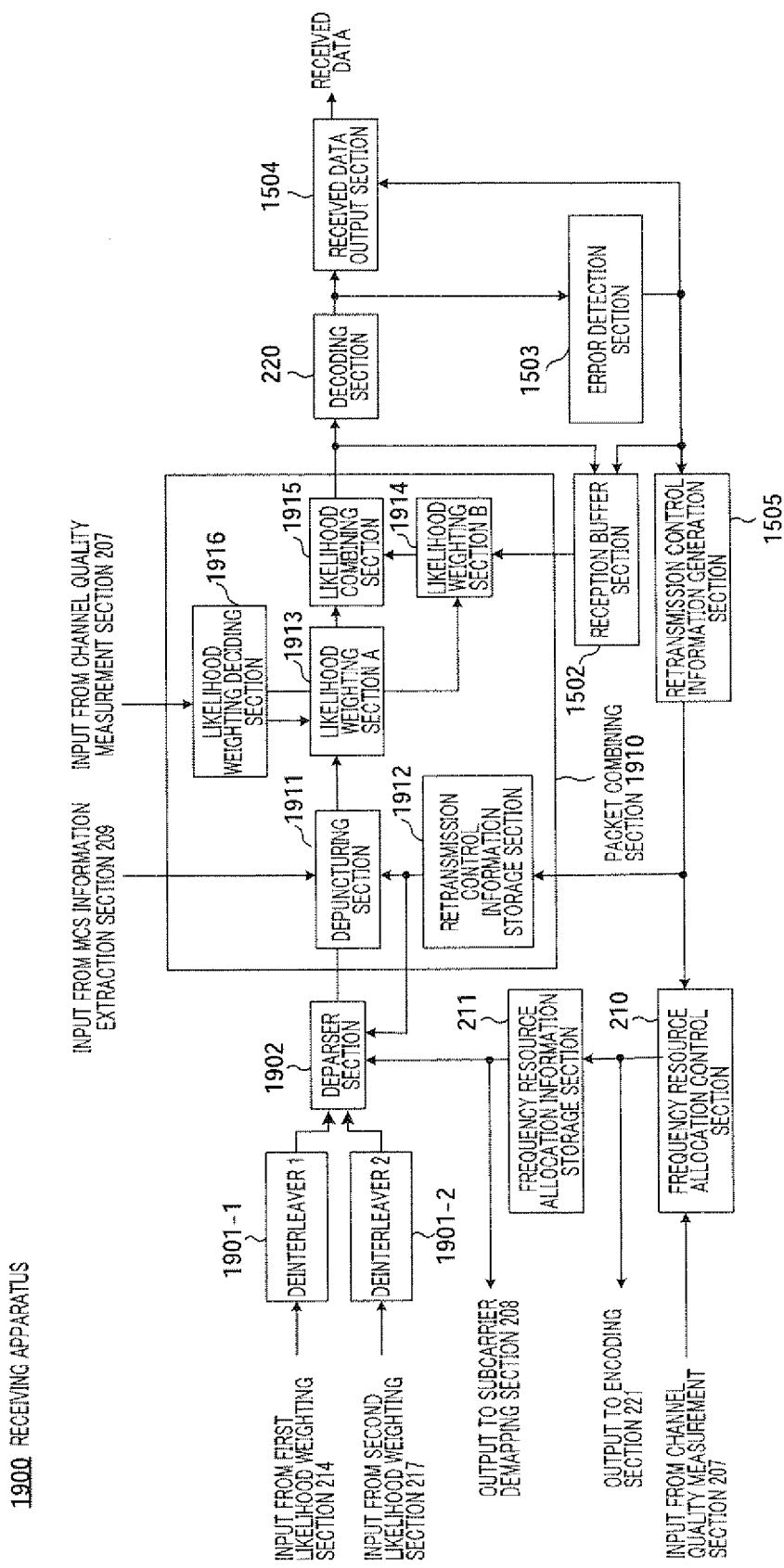
FIG. 38 is a block diagram showing another configuration of a receiving apparatus of Embodiment 8.

FIG. 38, in which parts corresponding to those in FIG. 5 and FIG. 34 are assigned the same reference codes as in FIG.

5 and FIG. 34, shows the configuration of the principal parts of receiving apparatus 1900 of this embodiment. In FIG. 38, only configuration peripheral parts newly proposed in this embodiment are shown; the rest of the configuration is the same as in FIG. 34, and is omitted here.

Deinterleaver 1901-1 deinterleaves soft decision likelihood values input from first likelihood weighting section 214 in accordance with a predetermined interleave pattern, and outputs a post-deinterleaving signal to deparser section 1902. Similarly, deinterleaver 1901-2 deinterleaves soft decision likelihood values input from second likelihood weighting section 217 in accordance with a predetermined interleave pattern, and outputs a post-deinterleaving signal to deparser section 1902.

Deparser section 1902 performs an operation that is the reverse of the operation by parser section 1803 of transmitting apparatus 1800, using frequency resource allocation information from frequency resource allocation information storage section 211 and retransmission control information stored in retransmission control information storage section 1912. By this means, deparser section 1902 makes soft decision likelihood values input from first and second likelihood weighting sections 214 and 217 a serial signal. Deparser section 1902 outputs encoded packet soft decision likelihood values made into a serial signal to packet combining section 1910.

The internal configuration of packet combining section 1910 is described below.

Packet combining section 1910 performs different weighting on soft decision likelihood values of a newly received transmission packet and packets previously received and accumulated in reception buffer section 1502, and then performs combining and output. Weighting is decided by likelihood weighting deciding section 1916 using channel quality information input from channel quality measurement section 207, and weighting coefficients are output to likelihood weighting section A (1913) and likelihood weighting section B (1914). If the channel quality of a packet newly received this time is better than the average channel quality in previous packet reception, a relatively large weighting coefficient is output to likelihood weighting section A (1913), and a small weighting coefficient is output to likelihood weighting section B (1914). Conversely, if the channel quality of a packet newly received this time is relatively poor, a smaller weighting coefficient is output to likelihood weighting section A (1913) than to likelihood weighting section B (1914).

Using number of retransmissions Kr stored in retransmission control information storage section 1912 and a coding rate input from MCS information extraction section 209, depuncturing section 1911 performs depuncturing processing on an encoded packet input from deparser section 1902, and outputs a post-depuncturing-processing signal to likelihood weighting section A (1913).

Using a likelihood weighting coefficient input from likelihood weighting deciding section 1916, likelihood weighting section A (1913) weights a soft decision likelihood value of an encoded packet input from depuncturing section 1911, and outputs a post-weighting signal to likelihood combining section 1915.

Similarly, when an encoded packet output from likelihood weighting section A (1913) is a retransmission packet, likelihood weighting section B (1914) weights a soft decision likelihood value of an encoded packet input from reception buffer section 1502 using a weighting coefficient input from likelihood weighting deciding section 1916, and outputs a post-weighting signal to likelihood combining section 1915. When an encoded packet output from likelihood weighting section A (1913) is a new packet, nothing is input to likelihood weighting section B (1914) from reception buffer section 1502, as described in Embodiment 6, and likelihood weighting section B (1914) does not output anything.

By means of the above configuration, weighting can be performed that increases soft decision likelihood value reliability for a packet with good reception quality.

If an encoded packet has been input only from likelihood weighting section A (1913), likelihood combining section 1915 outputs the encoded packet directly to decoding section 220. If encoded packets have been input from both likelihood weighting section A (1913) and likelihood weighting section B (1914), likelihood combining section 1915 adds their soft decision likelihood values in bit units, and outputs the addition result to decoding section 220.

Decoding section 220 decodes a soft decision likelihood value of an input encoded packet, and outputs the decoded result to received data output section 1504. When ACK (Acknowledgment) is input from error detection section 1503, received data output section 1504 outputs received data.

As described above, according to this embodiment, provision is made for bits that include important information in each retransmission to be transmitted allocated to a second subcarrier modulation signal whose reception quality is expected to be relatively good, enabling soft decision likelihood values of packets with good reception quality to be utilized effectively on the receiving side, and post-decoding reception quality to be improved.

(Embodiment 9)

In this embodiment, a description will be given of a configuration that provides the HARQ function described in Embodiments 6 and 8 in the MIMO transmitting apparatus described in Embodiment 4.

As explained in Embodiment 4, a MIMO transmitting apparatus has a plurality of antennas. Possible configurations here are an MCW (Multiple CodeWord) configuration that simultaneously transmits an independent packet from each antenna, and an SCW (Single CodeWord) configuration that transmits one packet using all the antennas.

Figure 39:
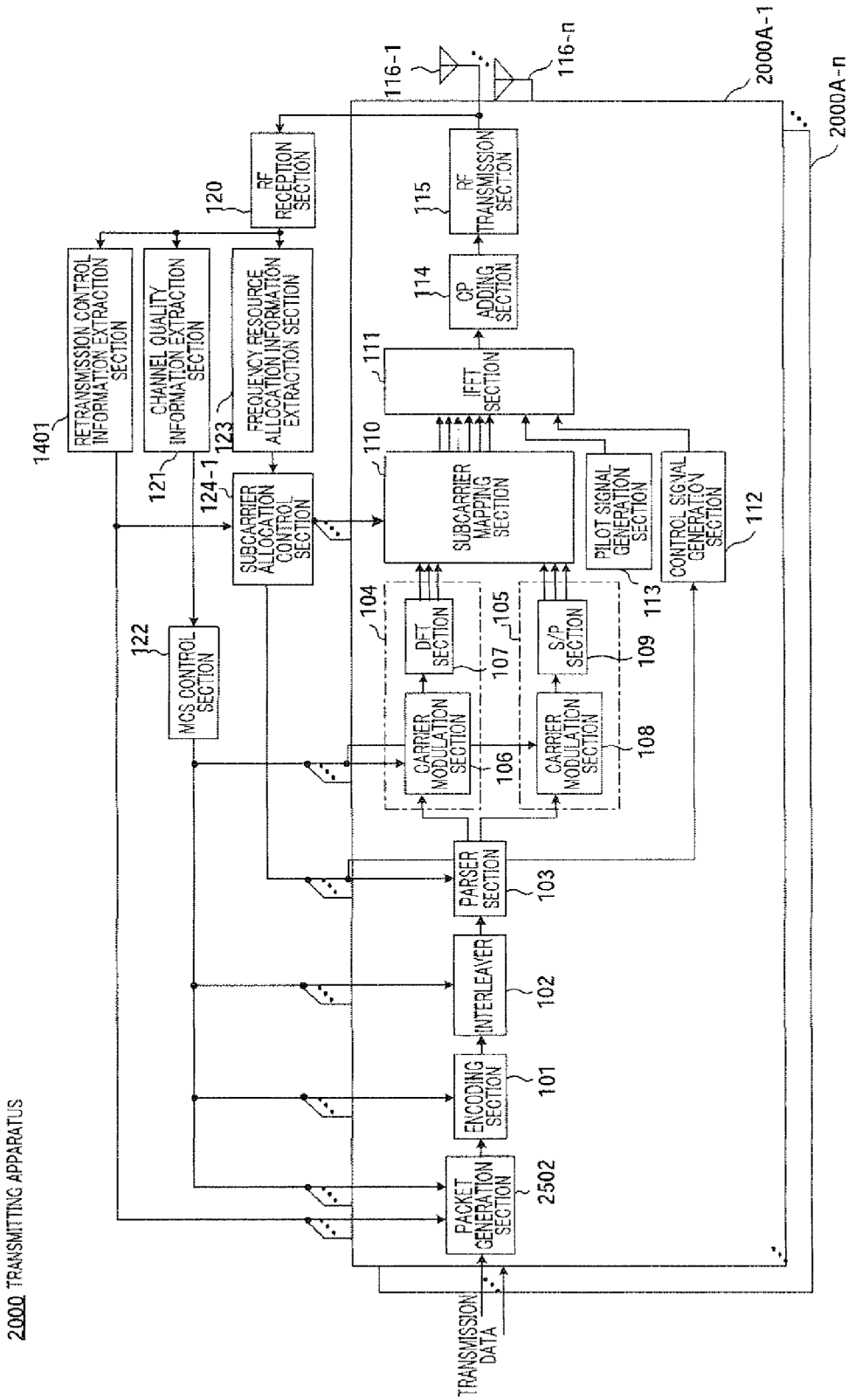
FIG. 39 is a block diagram showing a configuration of an MCW-configuration transmitting apparatus according to Embodiment 9.
Figure 40:
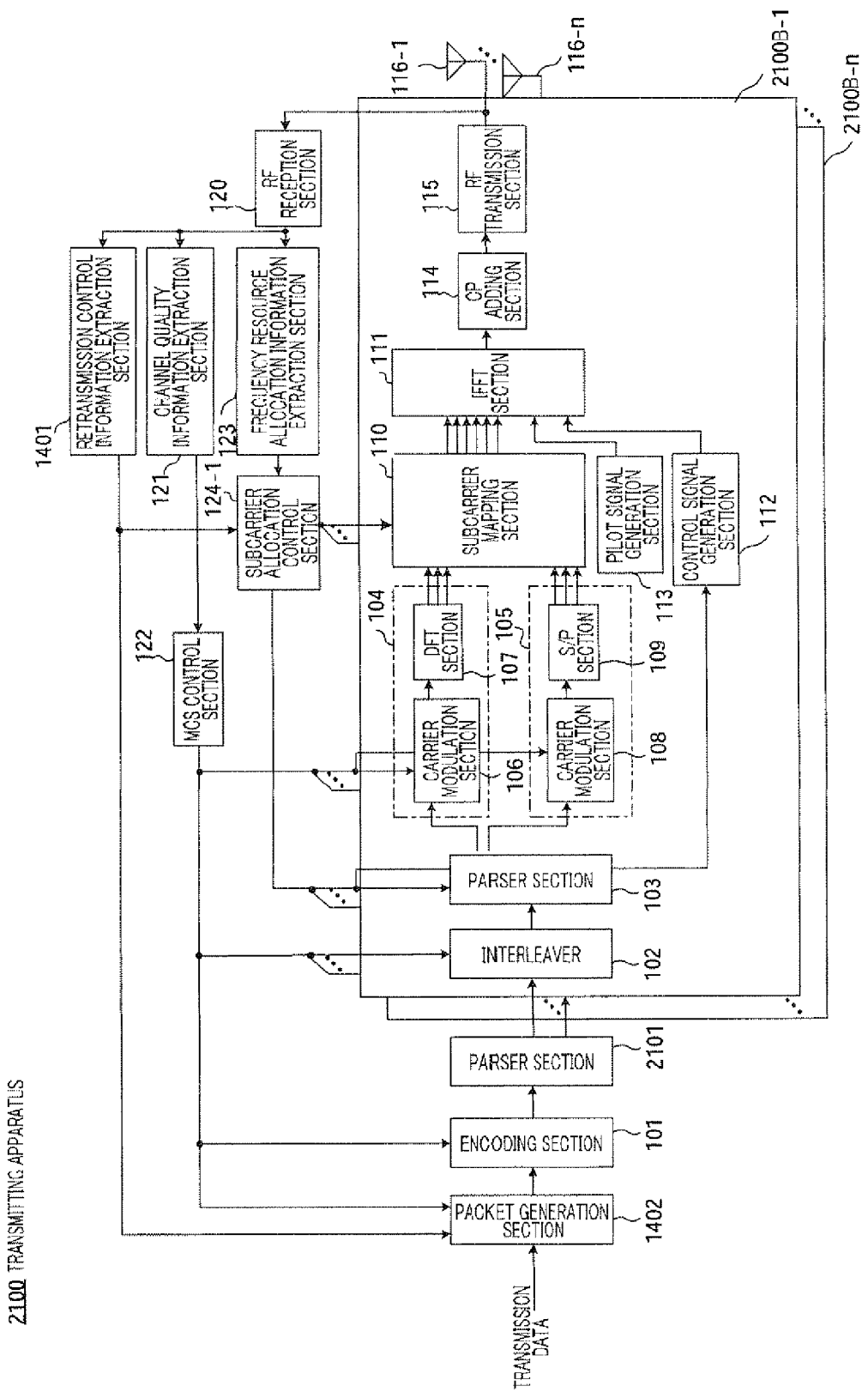
FIG. 40 is a block diagram showing a configuration of an SCW-configuration transmitting apparatus according to Embodiment 9.

FIG. 39, in which parts corresponding to those in FIG. 16 and FIG. 25 are assigned the same reference codes as in FIG. 16 and FIG. 25, shows a configuration of a transmitting apparatus of this embodiment corresponding to an MCW configuration. FIG. 40, in which parts corresponding to those in FIG. 16 and FIG. 25 are assigned the same reference codes as in FIG. 16 and FIG. 25, shows a configuration of a transmitting apparatus of this embodiment corresponding to an SCW configuration. Transmitting apparatus 2000 in FIG. 39 and transmitting apparatus 2100 in FIG. 40 each have n transmitting antennas 116-1 through 116-n, and perform MIMO communication.

Transmitting apparatus 2000 employing an MCW configuration, shown in FIG. 39, is equipped with n transmission blocks 2000A-1 through 2000A-n, containing packet generation section 2502 through RF transmission section 115, corresponding to the antennas. Independent transmission data is input to packet generation section 2502 of each of transmission blocks 2000A-1 through 2000A-n, undergoes execution of a series of radio transmission processing operations comprising packet generation, encoding, and modulation individually, and is transmitted from corresponding transmitting antenna 116-1 through 116-n.

With an MCW configuration, a plurality of packets are transmitted simultaneously, and therefore a situation is assumed in which an error is detected in only one of those packets. In this case, a retransmission packet and a new packet are transmitted simultaneously using a plurality of antennas at the time of the next transmission. At this time, as explained in Embodiment 4, with regard to identical subcarriers space-multiplexed using a plurality of antennas, it is desirable to transmit the same kind of (first or second) subcarrier modulation signal. By this means, when a space demultiplexing method is applied to space-multiplexed subcarrier modulation signals of the same kind in a receiving apparatus, a nonlinear space demultiplexing method such as MLD can be applied since second subcarrier modulation signals are space-multiplexed as the same kind of subcarrier modulation signals.

In addition, it is desirable for allocation to subcarriers of first and second subcarrier groups made common on an antenna-by-antenna basis to be decided based on the reception quality of a channel that transmits a retransmission packet for which number of retransmissions Kr is largest among a plurality of packets transmitted simultaneously. In this way, the reception quality of a retransmission packet can be improved in particular among simultaneously transmitted packets, and error-free transmission can be achieved in a small number of retransmissions.

On the other hand, transmitting apparatus 2100 employing an SCW configuration, shown in FIG. 40, is equipped with only one packet generation section 1402 and one encoding section 101, and an encoded packet output from encoding section 101 is distributed to n transmission blocks 2100B-1 through 21008-n via parser section 2101. Thereafter, signals distributed by parser section 2101 individually undergo execution of a series of radio transmission processing operations by interleaver 102 through RF transmission section 115, and are transmitted from an antenna in the case of an SCW configuration, only one packet is transmitted using a plurality of antennas simultaneously, and therefore subcarrier allocation can be selected on the same kind of basis as in Embodiment 4 even when transmitting a retransmission packet.

(Embodiment 10)

Figure 41:
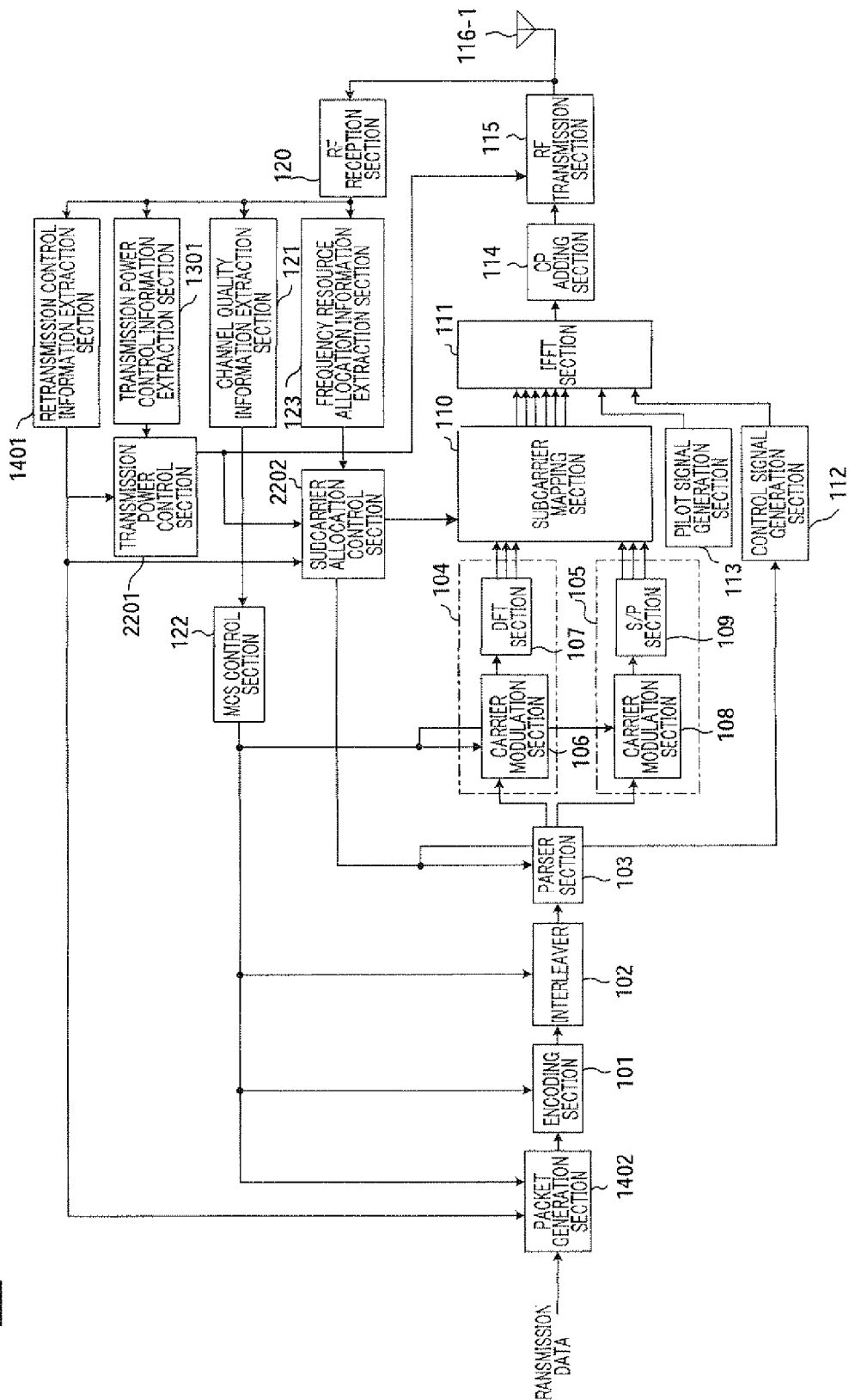
FIG. 41 is a block diagram showing a configuration of a transmitting apparatus of Embodiment 10.

FIG. 41, in which parts corresponding to those in FIG. 3, FIG. 21, and FIG. 25 are assigned the same reference codes as in FIG. 3, FIG. 21, and FIG. 25, shows the configuration of the principal parts of transmitting apparatus 2200 of this embodiment. Transmitting apparatus 2200 has transmission power control information extraction section 1301 in the same way as transmitting apparatus 1300 described in Embodiment 5. In addition, transmitting apparatus 2200 has transmission power control section 2201. Transmission power control information from transmission power control information extraction section 1301 and a number of retransmissions from retransmission control information extraction section 1401 are input to transmission power control section 2201.

Transmission power control section 2201 decides reference transmission power P0 based on transmission power control information reported from a receiving apparatus and extracted by transmission power control information extraction section 1301. If number of retransmissions Kr=0, reference transmission power P0 is sent to RF transmission section 115 and subcarrier allocation control section 2202 as transmission power information. If number of retransmissions Kr>0, a positive value in accordance with number of retransmissions Kr is added to reference transmission power P0, and the resulting value is sent to RF transmission section 115 and subcarrier allocation control section 2202 as transmission power information. In this way, the probability of communication succeeding can be increased by performing transmission with transmission power for suppressing interference vis-à-vis another transmitting apparatus set low when transmitting a new packet, and increasing transmission power only when a retransmission becomes necessary.

Subcarrier allocation control section 2202 variably controls the ratio of first and second subcarrier modulation signals in subcarrier allocation in accordance with the relationship shown in FIG. 23 based on transmission power control information, in the same way as in Embodiment 5. Here, in a system in which transmission power is stipulated by peak transmission power, which is the maximum value of instantaneous power of a transmission signal included in one packet, permissible peak transmission power increases in accordance with an increase in the number of retransmissions, and therefore transmission power limitation due to a PAPR decreases, and the proportion of a second subcarrier modulation signal for which the PAPR becomes larger can be increased. By this means, interference can be suppressed by setting transmission power low when a retransmission does not occur, and when a retransmission occurs the probability of a retransmission succeeding can be increased by increasing the second subcarrier modulation signal proportion.

On the other hand, in a system in which transmission power is stipulated by the average power of a transmission signal included in one packet, set average transmission power increases in accordance with an increase in the number of retransmissions, and therefore the difference between peak transmission power and set average power becomes smaller, and a transmission power margin due to a PAPR decreases. When the transmission power margin falls below PAPR maximum value Dmax at this time, such as at the cell edge distant from the base station, provision is made for the first subcarrier modulation signal proportion to be increased and the second subcarrier modulation signal proportion to be decreased.

This processing is effective when there is little residual multipath interference when a first subcarrier modulation signal is equalized, and an improvement in reception quality due to increased first and second subcarrier modulation signal average transmission power exceeds degradation of reception quality due to a decrease in the second subcarrier modulation signal proportion, such as when a channel frequency characteristic obtained from channel quality information extraction section 121 is nearly flat. Furthermore, this processing is also effective when residual multipath interference robustness is comparatively good, and BPSK or QPSK having a low M-ary modulation value is used as a modulation method.

On the other hand, when a drop in reception quality due to a decrease in the second subcarrier modulation signal proportion exceeds an improvement in reception quality due to increased average transmission power, such as when 16QAM or 64QAM having a high M-ary modulation value is used as a modulation method, it is desirable to perform processing that increases transmission power in a range that satisfies a PAPR limitation, without changing the first and second subcarrier modulation signal ratio.

Examples of transmission power control by transmission power control section 2201 based on the number of retransmissions and modulation method are shown in FIG. 42. Here, the maximum transmission power that can be utilized, decided by a system stipulation or transmitting apparatus capability, is called maximum transmission power. When residual multipath interference robustness is comparatively good, and BPSK, QPSK, or the like is used as a modulation method, the probability of a retransmission succeeding is increased by increasing the transmission power (average transmission power or peak transmission power) set value in accordance with an increase in the number of retransmissions, as shown in FIG. 42A.

On the other hand, when 16QAM, 64QAM, or the like having comparatively poor residual multipath interference robustness is used as a modulation method, the maximum value of transmission power that is increased in accordance with an increase in the number of retransmissions is set to a value having a fixed back-off Dx from the maximum transmission power (where $D\min \leqq Dx \leqq \max$), as shown in FIG. 42B. In this way, when a modulation method with poor residual multipath interference robustness is used, a back-off relative to the maximum transmission power is secured for transmission power, and transmission power is increased within a range in which the second subcarrier modulation signal proportion is not reduced below a fixed level.

Back-off Dx is decided by the maximum value of transmission power at which an improvement in reception quality due to increased transmission power exceeds degradation of reception quality due to a decrease in the second subcarrier modulation signal proportion.

Figure 43:
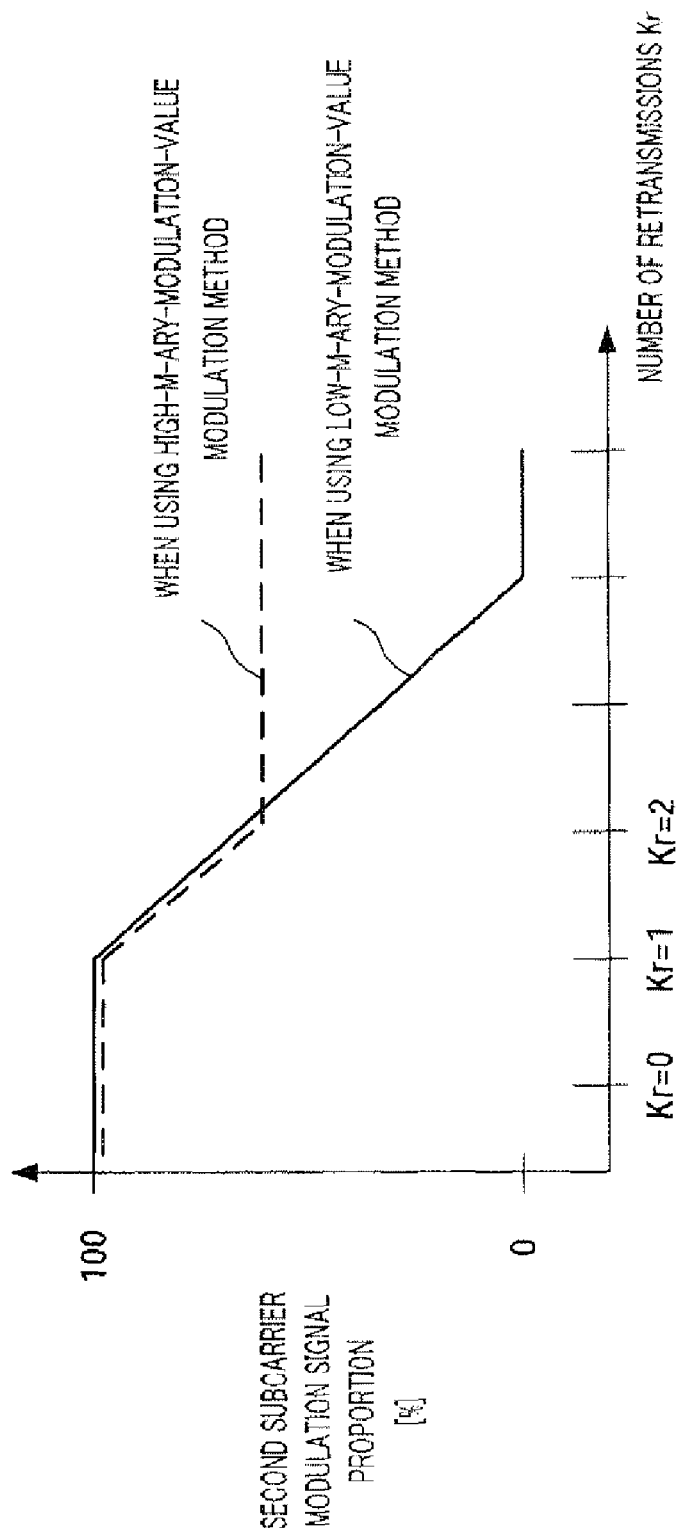
FIG. 43 is a drawing showing examples of the proportion of a second subcarrier modulation signal decided by a subcarrier allocation control section.

Examples of the proportion of a second subcarrier modulation signal decided by subcarrier allocation control section 2202 when transmission power is set in accordance with the above examples are shown in FIG. 43. When a modulation method with a low M-ary modulation value, such as BPSK or QPSK, is used, the second subcarrier modulation signal proportion is decreased to 0% as transmission power increases in accordance with an increase in the number of retransmissions. On the other hand, when a modulation method with a high M-ary modulation value, such as 16QAM or 64QAM, is used, transmission power is increased in accordance with an increase in the number of retransmissions within a range in which the second subcarrier modulation signal proportion does not fall below a fixed level.

As described above, according to this embodiment, the probability of a retransmission succeeding can be increased by keeping transmission power low and reducing interference when a retransmission does not occur, and increasing transmission power to the maximum power at which reception quality improves according to the modulation method used when a retransmission occurs.

(Embodiment 11)

Figure 44:
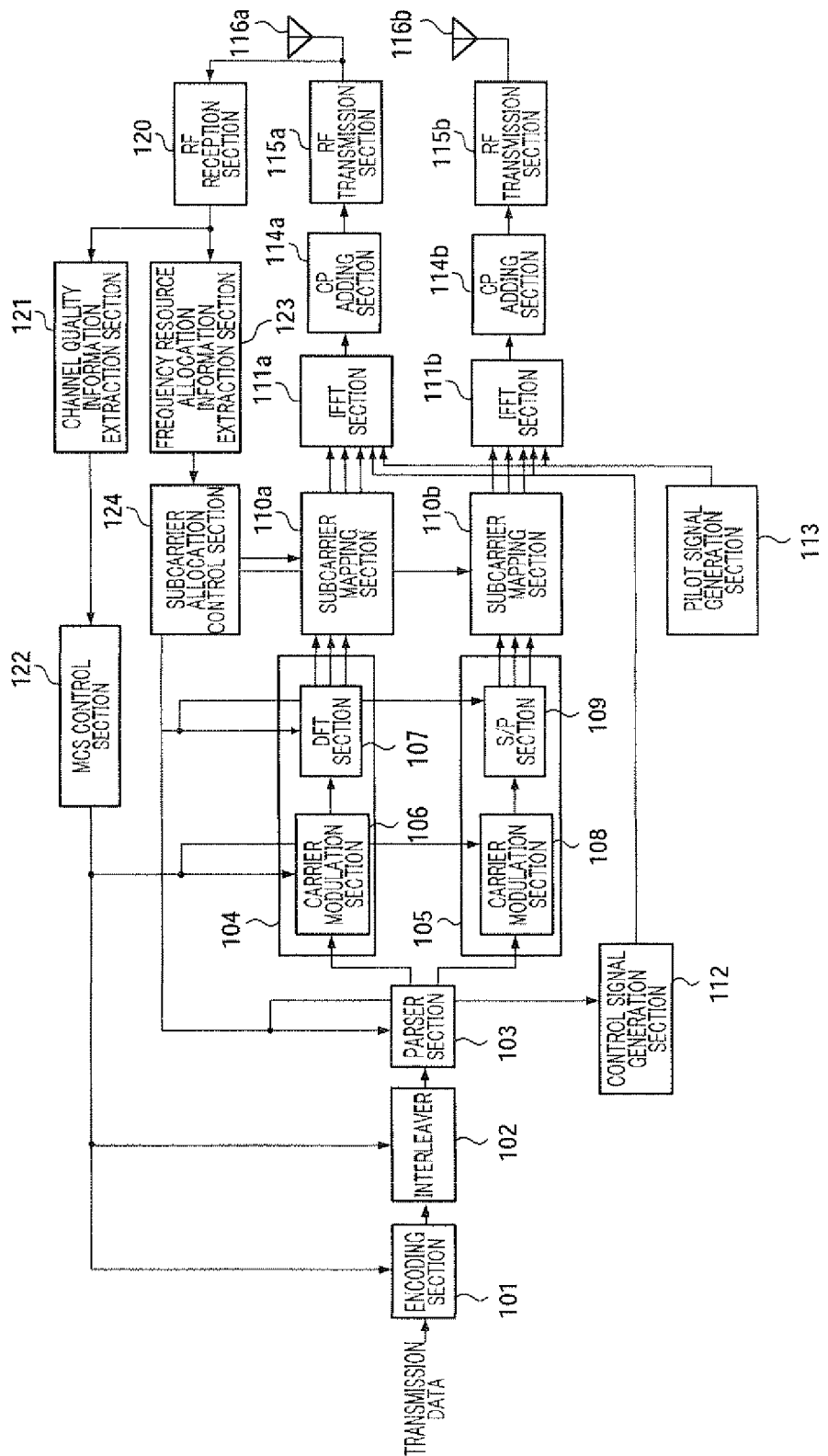
FIG. 44 is a block diagram showing a configuration of a transmitting apparatus of Embodiment 11.

FIG. 44 shows a configuration of a transmitting apparatus according to Embodiment 11 of the present invention. As with transmitting apparatus 100 described in Embodiment 1, transmitting apparatus 2300 is provided in a terminal, and performs uplink transmission. Transmitting apparatus 2300 of this embodiment has the same kind of basic configuration as transmitting apparatus 100 described in Embodiment 1. Transmitting apparatus 2300 of this embodiment is equipped with a plurality of antennas. In FIG. 44, a configuration equipped with two transmitting antennas is shown as an example.

Only configuration parts that differ from Embodiment 1 are described below.

Subcarrier mapping section 110a places first subcarrier modulation section 104 output on subcarriers based on control information from subcarrier allocation control section 124, and outputs the resulting output to IFFT section 111a.

Subcarrier mapping section 110b places second subcarrier modulation section 105 output on subcarriers based on control information from subcarrier allocation control section 124, and outputs the resulting output to IFFT section 111b.

Figure 45A:
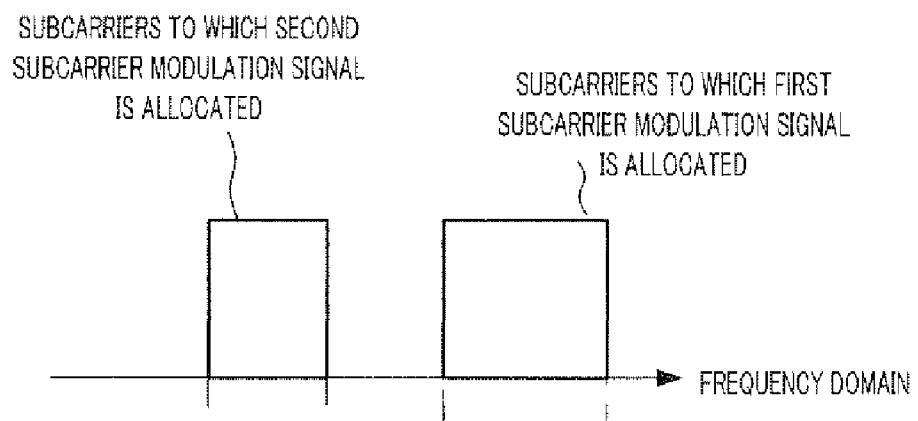
FIG. 45A shows a result of frequency domain allocation by a subcarrier allocation control section.
Figure 45B:
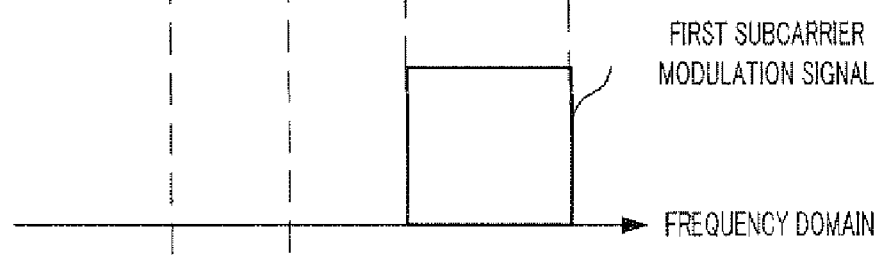
FIG. 45B shows a subcarrier mapping section 110a subcarrier mapping result.
Figure 45C:
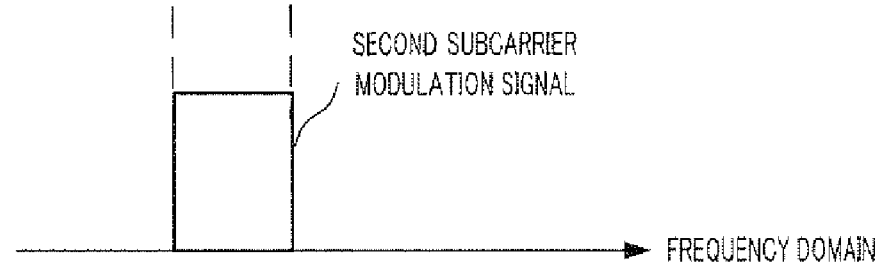
FIG. 45C shows a subcarrier mapping section 110b subcarrier mapping result.

FIG. 45 shows examples of the nature of subcarrier modulation signal mapping by subcarrier allocation control section 124 and subcarrier mapping sections 110a and 110b. FIG. 45A shows a result of frequency domain allocation by subcarrier allocation control section 124, FIG. 45B shows a subcarrier mapping section 110a subcarrier mapping result, and FIG. 45C shows a subcarrier mapping section 110b subcarrier mapping result.

As shown in FIG. 45A, subcarrier allocation control section 124 decides subcarriers to which a first subcarrier modulation signal is allocated and subcarriers to which a second subcarrier modulation signal is allocated.

As shown in FIG. 45B, subcarrier mapping section 110a maps a first subcarrier modulation signal to subcarriers based on first subcarrier modulation signal subcarrier allocation information according to subcarrier allocation control section 124. Similarly, as shown in FIG. 45C, subcarrier mapping section 110b maps a second subcarrier modulation signal to subcarriers based on second subcarrier modulation signal subcarrier allocation information according to subcarrier allocation control section 124.

In addition to a first subcarrier modulation signal data signal from subcarrier mapping section 110a, a control signal from control signal generation section 112 and a pilot signal from pilot signal generation section 113 are input to IFFT section 111a. IFFT section 111a performs Ns-unit-size IFFT processing on these input signals.

Here, a pilot signal used for channel estimation on the receiving side is transmitted allocated to some or all of the subcarriers to which a first subcarrier modulation signal is mapped. By this means, when transmission is performed using a plurality of antennas, information as to which antenna a first or second subcarrier modulation signal is transmitted from need not be transmitted included in a control signal or the like. That is to say, reception processing can be performed appropriately on the receiving side by performing channel estimation using a pilot signal.

CP adding section 114a adds a CP (Cyclic Prefix) to an IFFT section 111a output signal. RF transmission section 115a executes predetermined radio transmission processing such as up-conversion and transmission power control on a signal output from CP adding section 114a, and sends a post-processing signal to antenna 116a.

Meanwhile, in addition to a second subcarrier modulation signal data signal from subcarrier mapping section 110b, a control signal from control signal generation section 112 and a pilot signal from pilot signal generation section 113 are input to IFFT section 111b. IFFT section 111b performs Ns-unit-size IFFT processing on these input signals.

Here, a pilot signal used for channel estimation on the receiving side is transmitted allocated to some or all of the subcarriers to which a second subcarrier modulation signal is mapped. By this means, when transmission is performed using a plurality of antennas, information as to which antenna a first or second subcarrier modulation signal is transmitted from need not be transmitted included in a control signal or the like. That is to say, reception processing can be performed appropriately on the receiving side by performing channel estimation using a pilot signal.

CP adding section 114b adds a CP (Cyclic Prefix) to an IFFT section 111b output signal. RF transmission section 115b executes predetermined radio transmission processing such as up-conversion and transmission power control on a signal output from CP adding section 114b, and sends a post-processing signal to antenna 116b.

By means of the above configuration, it is possible for transmitting apparatus 2300 to transmit different subcarrier modulation signals from each of a plurality of antennas. By this means, the number of subcarriers input to each of IFFT sections 111a and 111b can be reduced compared with transmitting apparatus 100 of Embodiment 1. Since a property of a PAPR stipulated by an IFFT section output signal is to be decreased by a reduction in the number of input subcarriers, it is thus possible to achieve a PAPR decrease by means of the configuration of this embodiment.

A control signal from control signal generation section 112 may be transmitted using either IFFT section 111a or IFFT section 111b.

Figure 46:
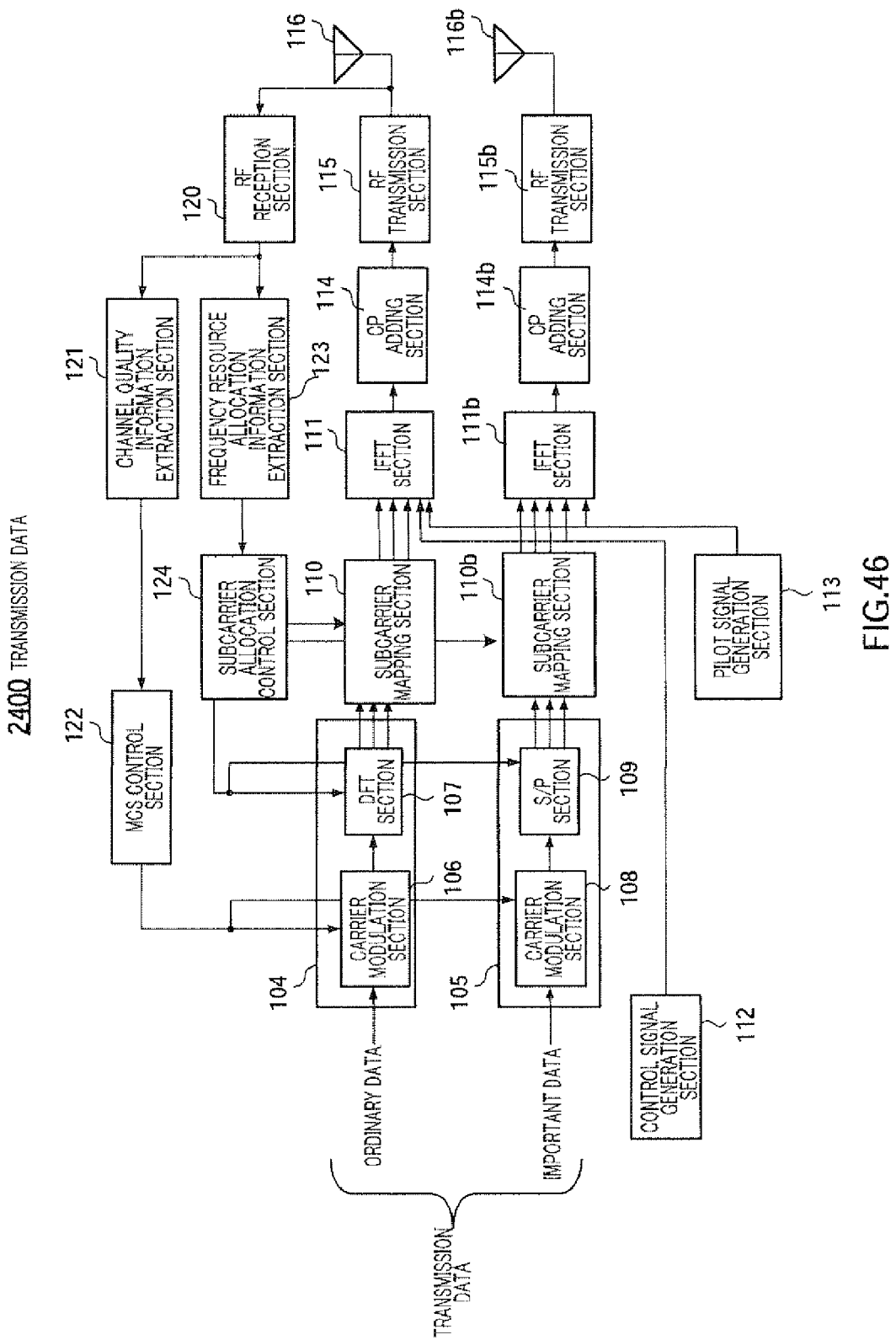
FIG. 46 is a block diagram showing another configuration of a transmitting apparatus of Embodiment 11.

FIG. 46, in which parts corresponding to those in FIG. 44 are assigned the same reference codes as in FIG. 44, shows another example of a configuration of a transmitting apparatus of this embodiment. In FIG. 44, the configuration ahead of first and second subcarrier modulation sections 104 and 105 is omitted.

In transmitting apparatus 2400, important data among transmission data is input to second subcarrier modulation section 105. On the other hand, in transmitting apparatus 2400, ordinary data without a high degree of importance among transmission data is input to first subcarrier modulation section 104. By this means, in addition to the effect obtained by the configuration of transmitting apparatus 2300, an effect of improving the overall transmission signal reception quality can be obtained by utilizing the characteristic whereby the reception quality of a second subcarrier modulation signal is better than that of a first subcarrier modulation signal.

Important data includes a control signal. As another example, when an error correction encoder (encoding section 101 in FIG. 44) has a configuration that uses a systematic code (turbo code, LDPC, or the like), a systematic bit may be transmitted as important data allocated preferentially to a second subcarrier modulation signal, and a parity bit may be transmitted as ordinary data allocated to a first subcarrier modulation signal.

FIG. 44 shows a case in which one encoding section 101 is provided in transmitting apparatus 2300 as an example, but a plurality of encoding sections may also be provided, and, for example, provision may be made for a first subcarrier modulation signal and a second subcarrier modulation signal to be encoded by separate encoding sections. This also applies to other embodiments described later herein.

In this embodiment, reception processing can be performed by means of the same kind of configuration as in receiving apparatus 200 (FIG. 5) or 400 (FIG. 9) described in Embodiment 1.

(Embodiment 12)

Figure 47:
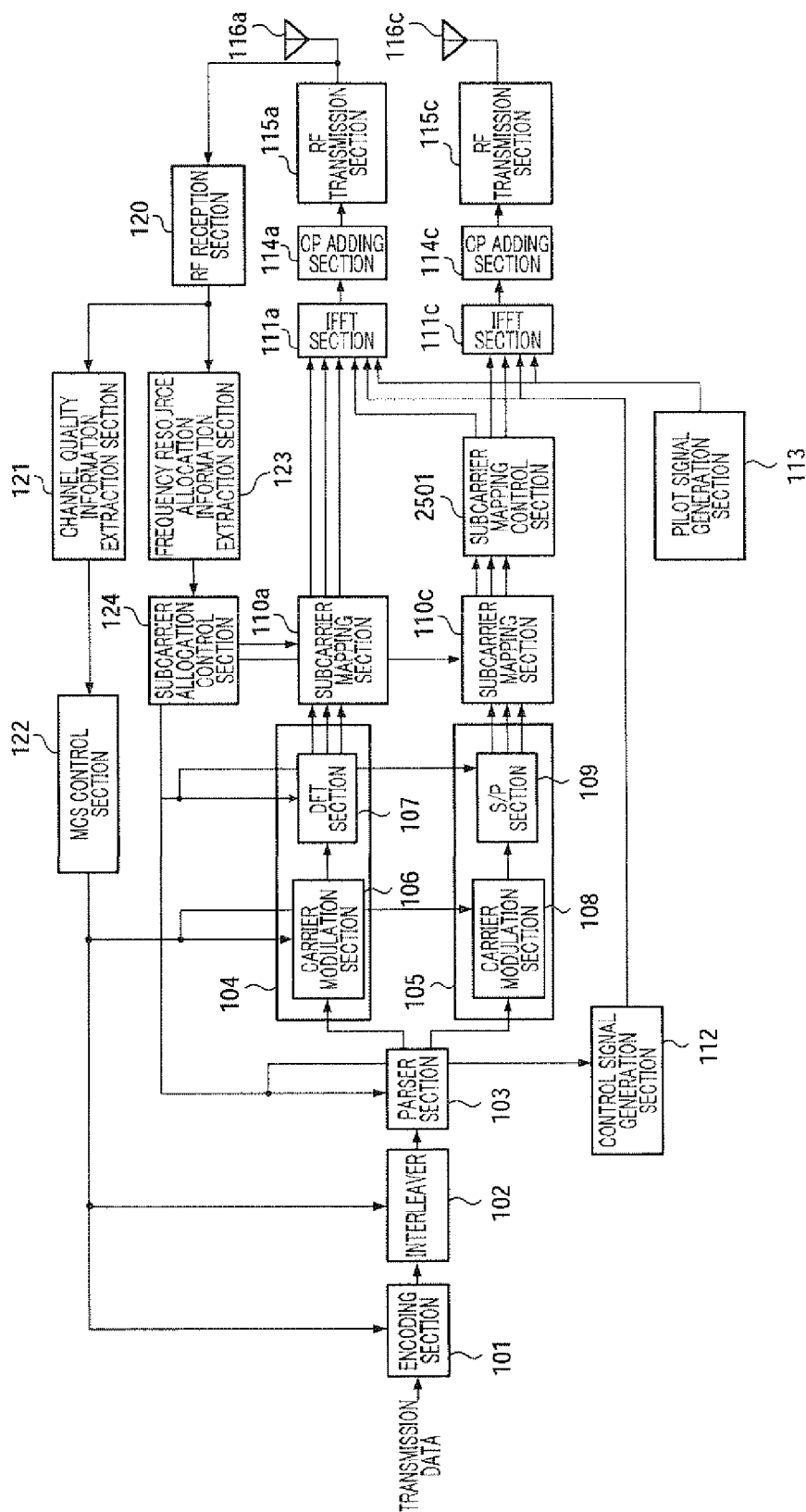
FIG. 47 is a block diagram showing a configuration of a transmitting apparatus of Embodiment 12.

FIG. 47 shows a configuration of a transmitting apparatus according to Embodiment 12 of the present invention. As with transmitting apparatus 100 described in Embodiment 1, transmitting apparatus 2500 is provided in a terminal, and performs uplink transmission. Transmitting apparatus 2500 of this embodiment has the same kind of basic configuration as transmitting apparatus 100 described in Embodiment 1. Transmitting apparatus 2500 of this embodiment is equipped with a plurality of antennas. In FIG. 47, a configuration equipped with two transmitting antennas is shown as an example.

Only configuration parts that differ from Embodiment 1 are described below.

Subcarrier mapping section 110a places first subcarrier modulation section 104 output on subcarriers based on control information from subcarrier allocation control section 124, and outputs the resulting output to IFFT section 111a.

Subcarrier mapping section 110c places second subcarrier modulation section 105 output on subcarriers based on control information from subcarrier allocation control section 124, and outputs the resulting output to subcarrier mapping control section 2501.

Figure 48A:
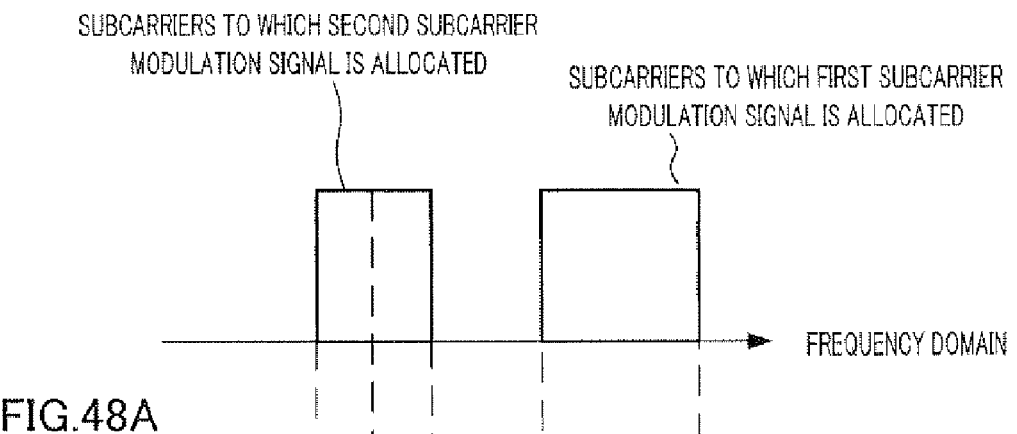
FIG. 48A shows a result of frequency domain allocation by a subcarrier allocation control section.
Figure 48B:
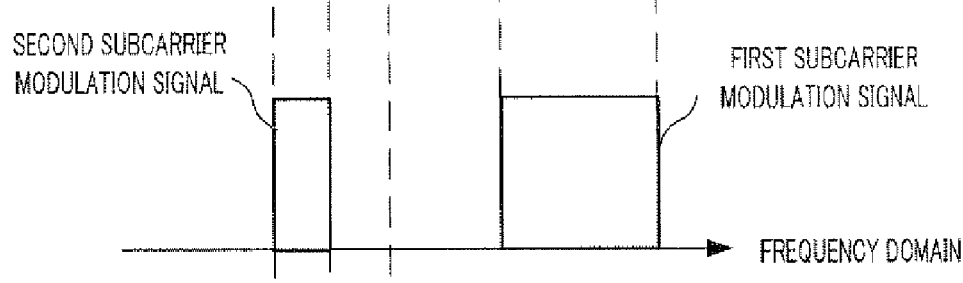
FIG. 48B shows a subcarrier mapping section 110a subcarrier mapping result.
Figure 48C:
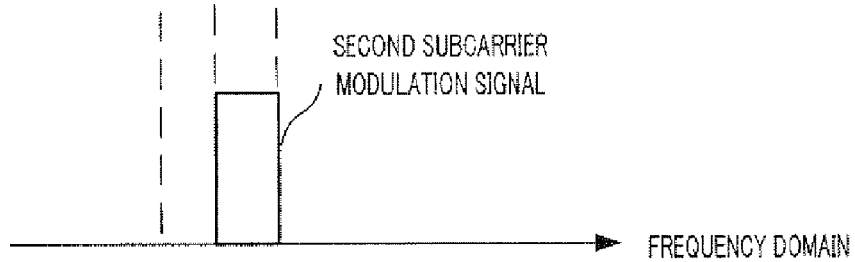
FIG. 48C shows a subcarrier mapping section 110b subcarrier mapping result.

FIG. 48 shows examples of the nature of subcarrier modulation signal mapping by subcarrier allocation control section 124, subcarrier mapping sections 110a and 110c, and subcarrier mapping control section 2501. FIG. 48A shows a result of frequency domain allocation by subcarrier allocation control section 124, FIG. 48B shows subcarrier signals input to IFFT section 111a, and FIG. 48C shows subcarrier signals input to IFFT section 111c.

As shown in FIG. 48A, subcarrier allocation control section 124 decides subcarriers to which a first subcarrier modulation signal is allocated and subcarriers to which a second subcarrier modulation signal is allocated.

As shown in FIG. 48B and FIG. 48C, subcarrier mapping control section 2501 distributes subcarrier mapping section 110c output based on a predetermined rule, and performs output to IFFT section 111a and IFFT section 111c. Here, a rule whereby input subcarrier signals are output distributed in specific proportions may be used as a predetermined rule. Alternatively, a rule whereby distribution and output are performed based on a specific number of subcarriers may be used as a predetermined rule.

In addition to a first subcarrier modulation signal data signal from subcarrier mapping section 110a, a second subcarrier modulation signal data signal from subcarrier mapping control section 2501, a control signal from control signal generation section 112, and a pilot signal from pilot signal generation section 113 are input to IFFT section 111a. IFFT section 111a performs Ns-unit-size IFFT processing on these input signals.

Here, a pilot signal used for channel estimation on the receiving side is transmitted allocated to some or all of the subcarriers to which a first subcarrier modulation signal is mapped, and to some or all of the subcarriers to which a second subcarrier modulation signal from subcarrier mapping control section 2501 is mapped. By this means, when transmission is performed using a plurality of antennas, information as to which antenna a first or second subcarrier modulation signal is transmitted from need not be transmitted included in a control signal or the like. That is to say, reception processing can be performed appropriately on the receiving side by performing channel estimation using a pilot signal.

CP adding section 114a adds a CP (Cyclic Prefix) to an IFFT section 111a output signal. RF transmission section 115a executes predetermined radio transmission processing such as up-conversion and transmission power control on a signal output from CP adding section 114a, and sends a post-processing signal to antenna 116a.

Meanwhile, in addition to a second subcarrier modulation signal data signal from subcarrier mapping control section 2501, a control signal from control signal generation section 112 and a pilot signal from pilot signal generation section 113 are input to IFFT section 111c. IFFT section 111c performs Ns-unit-size IFFT processing on these input signals.

Here, a pilot signal used for channel estimation on the receiving side is transmitted allocated to some or all of the subcarriers to which a second subcarrier modulation signal is mapped. By this means, when transmission is performed using a plurality of antennas, information as to which antenna a first or second subcarrier modulation signal is transmitted from need not be transmitted included in a control signal or the like. That is to say, reception processing can be performed appropriately on the receiving side by performing channel estimation using a pilot signal.

CP adding section 114c adds a CP (Cyclic Prefix) to an IFFT section 111c output signal. RF transmission section 115c executes predetermined radio transmission processing such as up-conversion and transmission power control on a signal output from CP adding section 114c, and sends a post-processing signal to antenna 116c.

A control signal from control signal generation section 112 may be transmitted using either IFFT section 111a or IFFT section 111c.

By means of the above configuration, it is possible for transmitting apparatus 2500 to transmit subcarrier signals mapped to different frequency subcarriers using a plurality of antennas. Also, transmitting apparatus 2500 transmits a subcarrier modulation signal allocated to a first subcarrier modulation signal from one antenna, and distributes a subcarrier modulation signal allocated to a second subcarrier modulation signal and transmits it from a different antenna. By this means, since a property of a PAPR stipulated by an IFFT section output signal is to be decreased by a reduction in the number of input subcarriers, it is possible to further reduce the PAPR of a second subcarrier modulation signal while maintaining a low first subcarrier modulation signal PAPR.

In this embodiment, a case has been described in which transmitting apparatus 2500 is provided in a terminal and performs uplink transmission, but it is also possible to apply this embodiment to a case in which a transmitting apparatus that transmits a signal in which first and second subcarrier modulation signals are mixed is provided in a base station (that is, a case in which a signal in which first and second subcarrier modulation signals are mixed is transmitted in downlink), as described in Embodiment 2. In this case, the configuration from subcarrier mapping section 110 onward in FIG. 10 should be replaced by the configuration from subcarrier mapping sections 110a and 110c onward of this embodiment.

(Embodiment 13)

Figure 49:
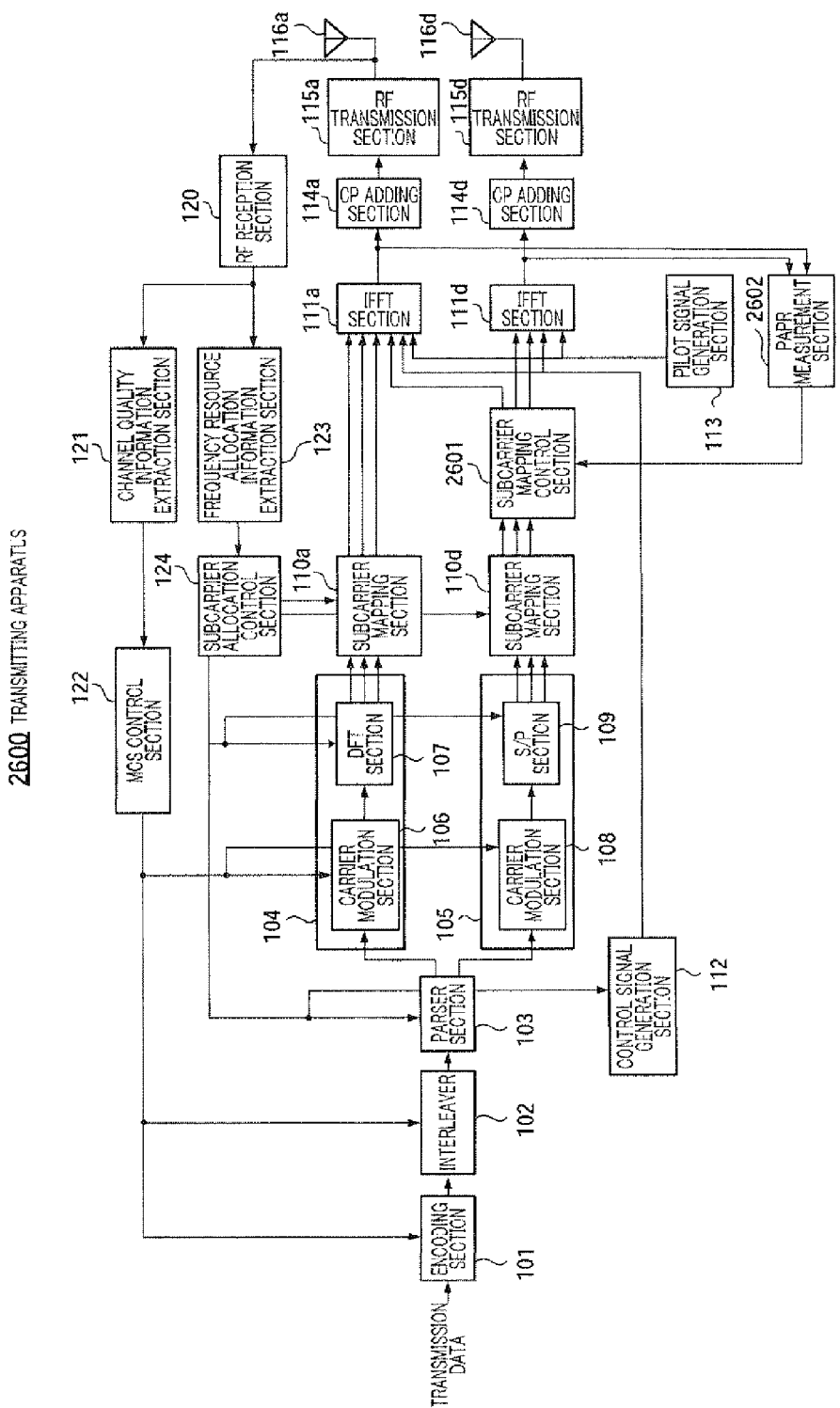
FIG. 49 is a block diagram showing a configuration of a transmitting apparatus of Embodiment 13.

FIG. 49 shows a configuration of a transmitting apparatus according to Embodiment 13 of the present invention. As with transmitting apparatus 100 described in Embodiment 1, transmitting apparatus 2600 is provided in a terminal, and performs uplink transmission. Transmitting apparatus 2600 of this embodiment has the same kind of basic configuration as transmitting apparatus 100 described in Embodiment 1. Transmitting apparatus 2600 of this embodiment is equipped with a plurality of antennas. In FIG. 49, a configuration equipped with two transmitting antennas is shown as an example.

Only configuration parts that differ from Embodiment 1 are described below.

Subcarrier mapping section 110a places first subcarrier modulation section 104 output on subcarriers based on control information from subcarrier allocation control section 124, and outputs the resulting output to IFFT section 111a.

Subcarrier mapping section 110d places second subcarrier modulation section 105 output on subcarriers based on control information from subcarrier allocation control section 124, and outputs the resulting output to subcarrier mapping control section 2601.

Figure 1:
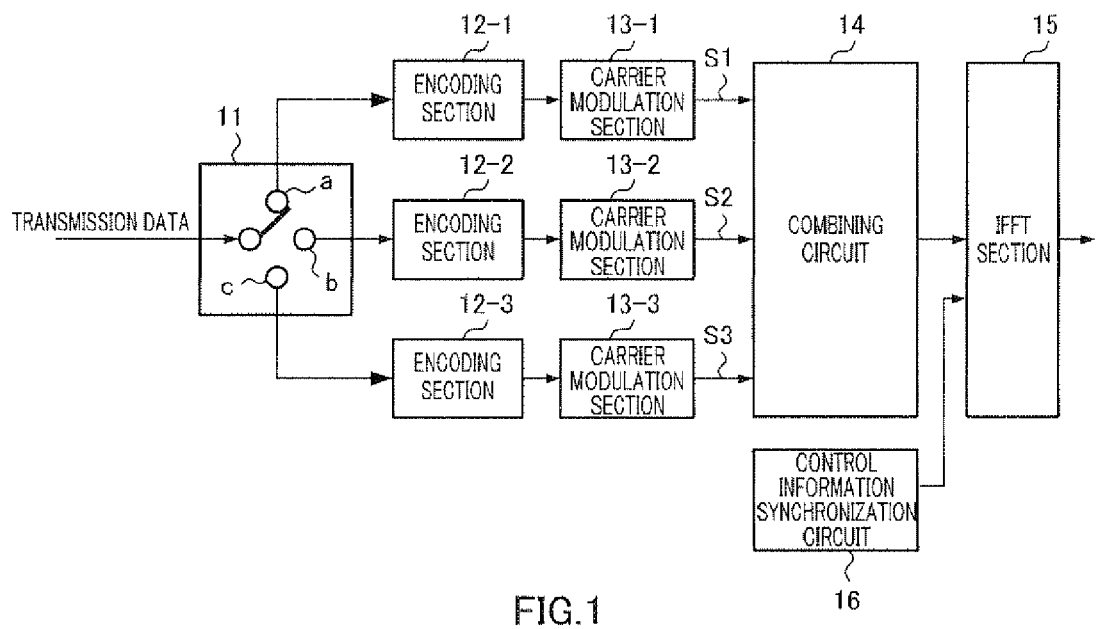
FIG. 1 is a block diagram showing a configuration of a radio transmitter using conventional layered modulation.
Figure 2:
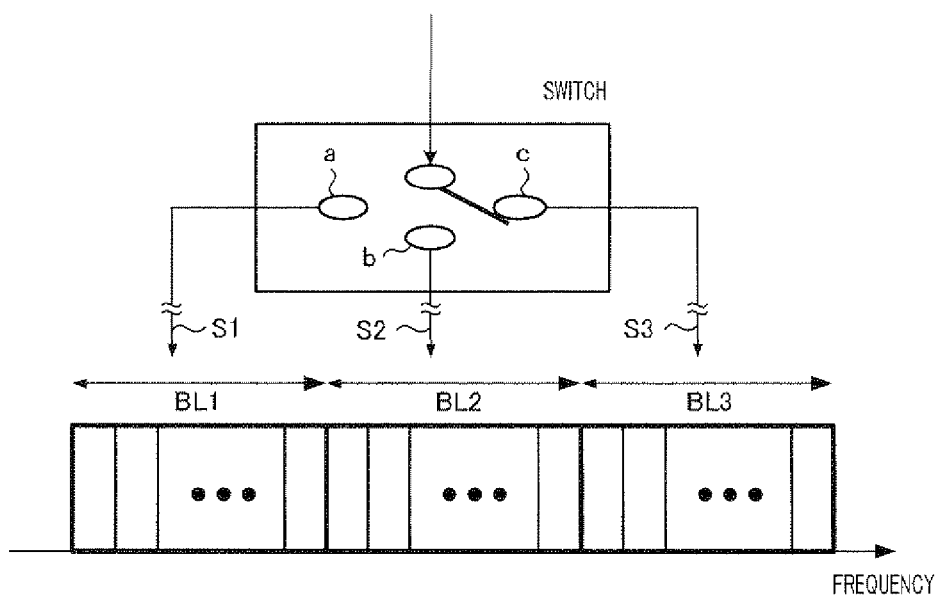
FIG. 2 is a drawing illustrating frequency block allocation by radio transmitter using conventional layered modulation.

FIG. 50 shows examples of the nature of subcarrier modulation signal mapping by subcarrier allocation control section 124, subcarrier mapping sections 110a and 110d, and subcarrier mapping control section 2601. FIG. 50A shows a result of frequency domain allocation by subcarrier allocation control section 124. FIG. 50B-1 shows subcarrier signals input to IFFT section 111a when the subcarrier mapping control section 2601 mapping pattern is A, and FIG. 50B-2 shows subcarrier signals input to IFFT section 111d when the subcarrier mapping control section 2601 mapping pattern is A. FIG. 50C-1 shows subcarrier signals input to IFFT section 111a when the subcarrier mapping control section 2601 mapping pattern is B, and FIG. 50C-2 shows subcarrier signals input to IFFT section hid when the subcarrier mapping control section 2601 mapping pattern is B.

As shown in FIG. 50A, subcarrier allocation control section 124 decides subcarriers to which a first subcarrier modulation signal is allocated and subcarriers to which a second subcarrier modulation signal is allocated.

Subcarrier mapping control section 2601 outputs subcarrier mapping section 110d output to IFFT section 111a and IFFT section 111d by selecting one of a plurality of different predetermined rules, and distributing a second subcarrier modulation signal according to that rule.

FIG. 50B (subcarrier mapping pattern A) and FIG. 50C (subcarrier mapping pattern B) show examples of different distribution rules used by subcarrier mapping control section 2601. Here, a rule whereby input subcarrier signals are output distributed in specific proportions may be used as a predetermined rule. Alternatively, a rule whereby distribution and output are performed based on a specific number of subcarriers may be used as a predetermined rule.

In addition to a first subcarrier modulation signal data signal from subcarrier mapping section 110a, a second subcarrier modulation signal data signal from subcarrier mapping control section 2601, a control signal from control signal generation section 112, and a pilot signal from pilot signal generation section 113 are input to IFFT section 111a. IFFT section 111a performs Ns-unit-size IFFT processing on these input signals.

Here, a pilot signal used for channel estimation on the receiving side is transmitted allocated to some or all of the subcarriers to which a first subcarrier modulation signal is mapped, and to some or all of the subcarriers to which a second subcarrier modulation signal from subcarrier mapping control section 2601 is mapped. By this means, when transmission is performed using a plurality of antennas, information as to which antenna a first or second subcarrier modulation signal is transmitted from need not be transmitted included in a control signal or the like. That is to say, reception processing can be performed appropriately on the receiving side by performing channel estimation using a pilot signal.

Meanwhile, in addition to a second subcarrier modulation signal data signal from subcarrier mapping control section 2601, a control signal from control signal generation section 112 and a pilot signal from pilot signal generation section 113 are input to IFFT section 111d. IFFT section 111d performs Ns-unit-size IFFT processing on these input signals.

Here, a pilot signal used for channel estimation on the receiving side is transmitted allocated to some or all of the subcarriers to which a second subcarrier modulation signal is mapped. By this means, when transmission is performed using a plurality of antennas, information as to which antenna a first or second subcarrier modulation signal is transmitted from need not be transmitted included in a control signal or the like. That is to say, reception processing can be performed appropriately on the receiving side by performing channel estimation using a pilot signal.

Based on an IFFT section 111a output signal and IFFT section 111d output signal, PAPR measurement section 2602 measures a PAPR of each output signal.

If a measured PAPR is greater than or equal to a predetermined value, subcarrier mapping control section 2601 performs processing to change the subcarrier mapping pattern (subcarrier distribution rule) as described below.

Subcarrier mapping pattern change processing: If a PAPR measurement section 2602 PAPR measurement result is greater than or equal to a predetermined value, subcarrier mapping control section 2601 changes the subcarrier mapping pattern. For example, subcarrier mapping control section 2601 changes a mapping pattern of subcarrier signals input to IFFT section 111a and subcarrier signals input to IFFT section 111*d* by changing subcarrier mapping pattern A as shown in FIG. 50B-1 and FIG. 50B-2 to subcarrier mapping pattern B, different from subcarrier mapping pattern A, as shown in FIG. 50C-1 and FIG. 50C-2.

Based on an IFFT section 111*a* output signal and IFFT section 111*d* output signal after the subcarrier mapping pattern change processing, PAPR measurement section 2602 again measures a PAPR of each output signal. If a measured PAPR is greater than or equal to a predetermined value, subcarrier mapping control section 2601 changes the subcarrier mapping pattern again. On the other hand, if the measured PAPRs are smaller than the predetermined value, subcarrier mapping control section 2601 does not change the subcarrier mapping pattern.

If PAPRs measured for all sub carrier mapping patterns as a result of repeating the above processing do not become smaller than the predetermined value, subcarrier mapping control section 2601 selects the subcarrier mapping pattern for which the PAPRs are lowest from among all the subcarrier mapping patterns.

CP adding section 114*a* adds a CP (Cyclic Prefix) to an IFFT section 111*a* output signal. RF transmission section 115*a* executes predetermined radio transmission processing such as up-conversion and transmission power control on a signal output from CP adding section 114*a*, and sends a post-processing signal to antenna 116*a*.

CP adding section 114*d* adds a CP (Cyclic Prefix) to an IFFT section 111*d* output signal. RF transmission section 115*d* executes predetermined radio transmission processing such as up-conversion and transmission power control on a signal output from CP adding section 114*d*, and sends a post-processing signal to antenna 116*d*.

A control signal from control signal generation section 112 may be transmitted using either IFFT section 111*a* or IFFT section 111*d*.

By means of the above configuration, it is possible for transmitting apparatus 2600 to transmit subcarrier signals mapped to different frequency subcarriers using a plurality of antennas. Also, transmitting apparatus 2600 transmits a subcarrier modulation signal allocated to a first subcarrier modulation signal from one antenna, and distributes a subcarrier modulation signal allocated to a second subcarrier modulation signal and transmits it from a different antenna. By this means, since a property of a PAPR stipulated by an IFFT section output signal is to be decreased by a reduction in the number of input subcarriers, it is possible to further reduce the PAPR of a second subcarrier modulation signal while maintaining a low first subcarrier modulation signal PAPR.

Furthermore, transmitting apparatus 2600 uses a subcarrier mapping pattern for which a PAPR becomes smaller than when distributing a second subcarrier modulation signal to different antennas. By this means, a combination of subcarrier signals for which a PAPR becomes lower can be selected. As a result, it is possible for transmitting apparatus 2600 of this embodiment to reduce a PAPR to a greater extent than in Embodiment 12.

In this embodiment, a case has been described in which transmitting apparatus 2600 is provided in a terminal and performs uplink transmission, but it is also possible to apply this embodiment to a case in which a transmitting apparatus that transmits a signal in which first and second subcarrier modulation signals are mixed is provided in a base station (that is, a case in which a signal in which first and second subcarrier modulation signals are mixed is transmitted in downlink), as described in Embodiment 2. In this case, the configuration from subcarrier mapping section 110 onward in FIG. 10 should be replaced by the configuration from subcarrier mapping sections 110*a* and 110*d* onward of this embodiment.

(Embodiment 14)

Figure 51:
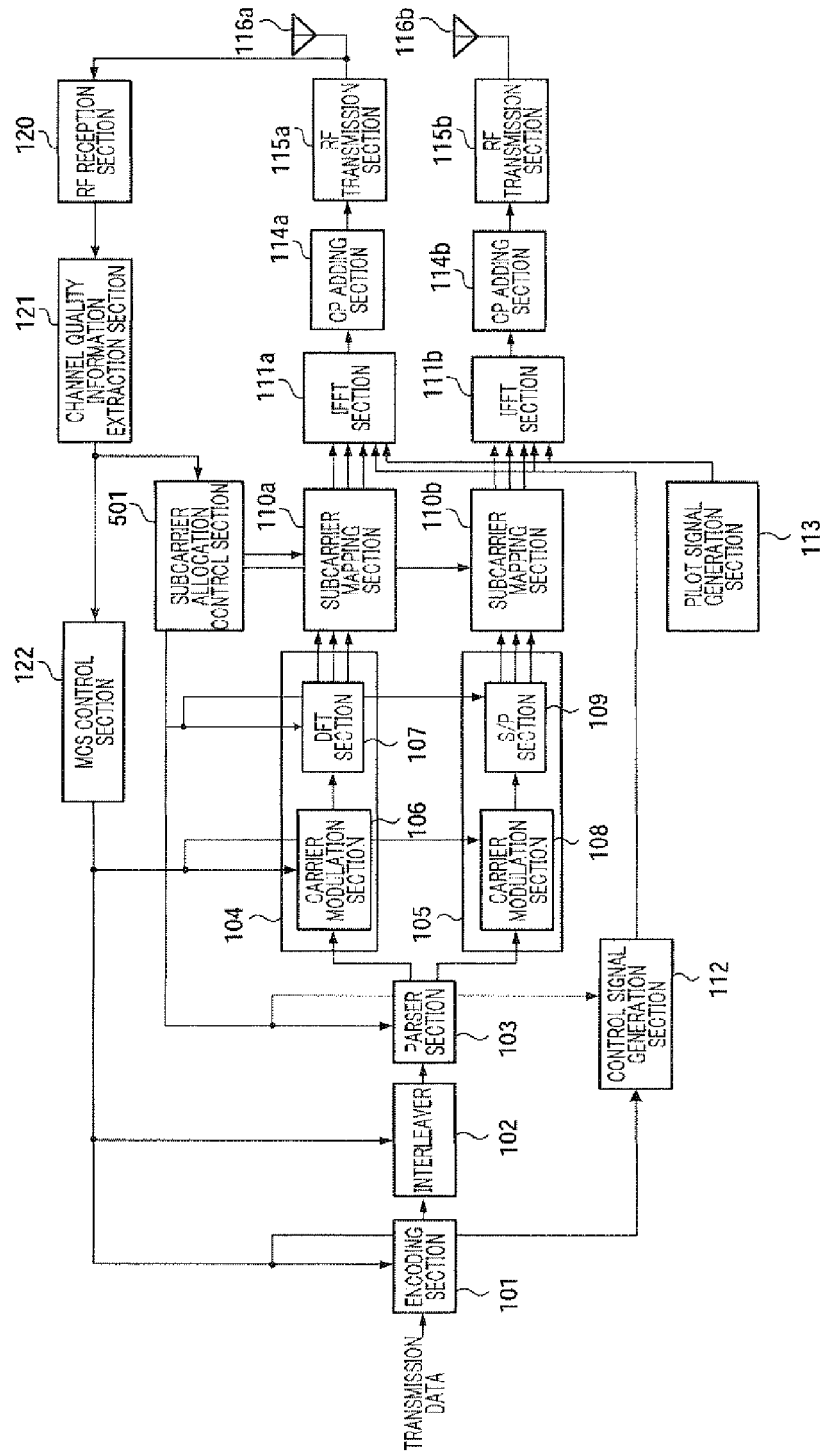
FIG. 51 is a block diagram showing a configuration of a transmitting apparatus of Embodiment 14.

FIG. 51 shows a configuration of a transmitting apparatus according to Embodiment 14 of the present invention. As with transmitting apparatus 500 described in Embodiment 2, transmitting apparatus 2700 is provided in a base station, and performs downlink transmission. Transmitting apparatus 2700 of this embodiment has the same kind of basic configuration as transmitting apparatus 500 described in Embodiment 2. Transmitting apparatus 2700 of this embodiment is equipped with a plurality of antennas. In FIG. 51, a configuration equipped with two transmitting antennas is shown as an example.

FIG. 51, in which parts corresponding to those in FIG. 10 are assigned the same reference codes as in FIG. 10, shows the configuration of transmitting apparatus 2700 of this embodiment.

Only configuration parts that differ from Embodiment 2 are described below.

Subcarrier mapping section 110*a* places first subcarrier modulation section 104 output on subcarriers based on control information from subcarrier allocation control section 501, and outputs the resulting output to IFFT section 111*a*.

Subcarrier mapping section 110*b* places second subcarrier modulation section 105 output on subcarriers based on control information from subcarrier allocation control section 501, and outputs the resulting output to IFFT section 111*b*.

FIG. 45 shows examples of the nature of subcarrier modulation signal mapping by subcarrier allocation control section 501 and subcarrier mapping sections 110*a* and 110*b*.

As shown in FIG. 45A, subcarrier allocation control section 501 decides subcarriers to which a first subcarrier modulation signal is allocated and subcarriers to which a second subcarrier modulation signal is allocated.

As shown in FIG. 45B, subcarrier mapping section 110*a* maps a first subcarrier modulation signal to subcarriers based on first subcarrier modulation signal subcarrier allocation information according to subcarrier allocation control section 501. Similarly, as shown in FIG. 45C, subcarrier mapping section 110*b* maps a second subcarrier modulation signal to subcarriers based on second subcarrier modulation signal subcarrier allocation information according to subcarrier allocation control section 501.

In addition to a first subcarrier modulation signal data signal from subcarrier mapping section 110*a*, a control signal from control signal generation section 502 and a pilot signal from pilot signal generation section 113 are input to IFFT section 111*a*. IFFT section 111*a* performs Ns-unit-size IFFT processing on these input signals.

Here, a pilot signal used for channel estimation on the receiving side is transmitted allocated to some or all of the subcarriers to which a first subcarrier modulation signal is mapped. By this means, when transmission is performed using a plurality of antennas, information as to which antenna a first or second subcarrier modulation signal is transmitted from need not be transmitted included in a control signal or the like. That is to say, reception processing can be performed appropriately on the receiving side by performing channel estimation using a pilot signal.

CP adding section 114*a* adds a CP (Cyclic Prefix) to an IFFT section 111*a* output signal. RF transmission section 115*a* executes predetermined radio transmission processing such as up-conversion and transmission power control on a signal output from CP adding section 114*a*, and sends a post-processing signal to antenna 116*a*.

Meanwhile, in addition to a second subcarrier modulation signal data signal from subcarrier mapping section 110b, a control signal from control signal generation section 502 and a pilot signal from pilot signal generation section 113 are input to IFFT section 111b. IFFT section 111b performs Ns-unit-size IFFT processing on these input signals.

Here, a pilot signal used for channel estimation on the receiving side is transmitted allocated to some or all of the subcarriers to which a second subcarrier modulation signal is mapped. By this means, when transmission is performed using a plurality of antennas, information as to which antenna a first or second subcarrier modulation signal is transmitted from need not be transmitted included in a control signal or the like. That is to say, reception processing can be performed appropriately on the receiving side by performing channel estimation using a pilot signal.

CP adding section 114b adds a CP (Cyclic Prefix) to an IFFT section 111b output signal. RF transmission section 115b executes predetermined radio transmission processing such as up-conversion and transmission power control on a signal output from CP adding section 114b, and sends a post-processing signal to antenna 116b.

By means of the above configuration, it is possible for transmitting apparatus 2700 to transmit different subcarrier modulation signals from each of a plurality of antennas. By this means, the number of subcarriers input to each of IFFT sections 111a and 111b can be reduced compared with transmitting apparatus 500 of Embodiment 2. Since a property of a PAPR stipulated by an IFFT section output signal is to be decreased by a reduction in the number of input subcarriers, it is thus possible to achieve a PAPR decrease by means of the configuration of this embodiment.

A control signal from control signal generation section 112 may be transmitted using either IFFT section 111a or IFFT section 111b.

FIG. 51 shows a case in which one encoding section 101 is provided in transmitting apparatus 2700 as an example, but a plurality of encoding sections may also be provided, and, for example, provision may be made for a first subcarrier modulation signal and a second subcarrier modulation signal to be encoded by separate encoding sections. This also applies to other embodiments described later herein.

In this embodiment, reception processing can be performed by means of the same kind of configuration as in receiving apparatus 600 (FIG. 11) described in Embodiment 2.

(Embodiment 15)

Figure 52:
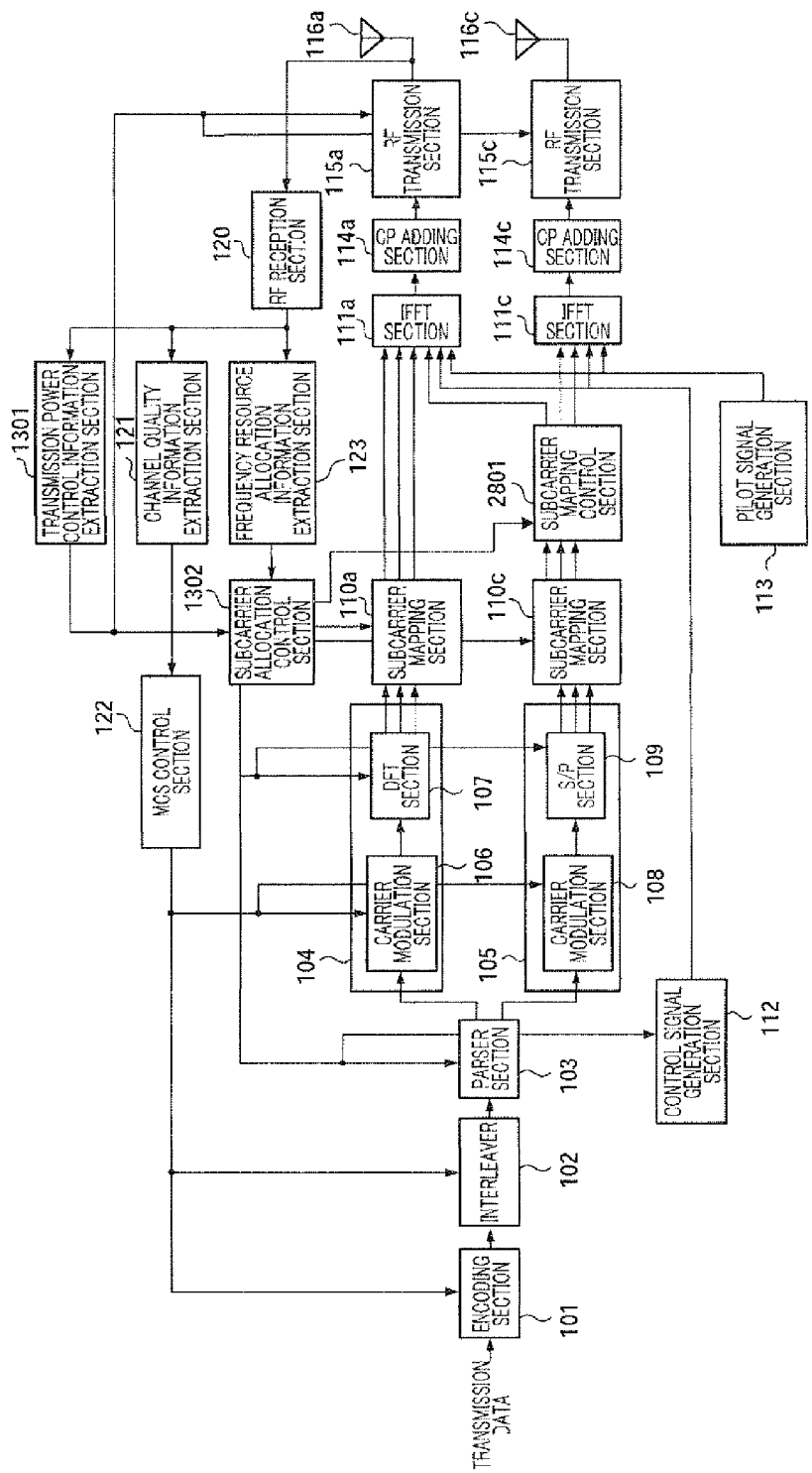
FIG. 52 is a block diagram showing a configuration of a transmitting apparatus of Embodiment 15.

FIG. 52, in which parts corresponding to those in FIG. 21 are assigned the same reference codes as in FIG. 21, shows a configuration of a transmitting apparatus of this embodiment. Transmitting apparatus 2800 has transmission power control information extraction section 1301 in the same way as transmitting apparatus 1300 (FIG. 13) described in Embodiment 5. Transmission power control information extraction section 1301 extracts transmission power control information reported from a receiver, applies this to RF transmission section 115, and sends this to RF transmission sections 115a and 115b and also to subcarrier allocation control section 1302.

Transmitting apparatus 2800 of this embodiment has the same kind of basic configuration as transmitting apparatus 1300 described in Embodiment 5. Transmitting apparatus 2800 of this embodiment is equipped with a plurality of antennas. In FIG. 52, a configuration equipped with two transmitting antennas is shown as an example.

Only configuration parts that differ from Embodiment 5 are described below.

Subcarrier allocation control section 1302 variably controls the ratio of first and second subcarrier modulation signals in subcarrier allocation based on transmission power control information. Specifically, subcarrier allocation control section 1302 performs control so that the second subcarrier modulation signal proportion is increased as transmission power decreases from maximum transmission power, as shown in FIG. 23.

At this time, the PAPR characteristic when the second subcarrier modulation signal proportion is varied is measured in advance for each M-ary modulation value used, as shown in FIG. 22, and an index of the control in FIG. 23 is set based on PAPR maximum value Dmax when the proportion is made 100 [%].

Subcarrier mapping section 110a places first subcarrier modulation section 104 output on subcarriers based on control information from subcarrier allocation control section 1302, and outputs the resulting output to IFFT section 111a.

Subcarrier mapping section 110c places second subcarrier modulation section 105 output on subcarriers based on control information from subcarrier allocation control section 1302, and outputs the resulting output to subcarrier mapping control section 2801.

FIG. 48 shows examples of the nature of subcarrier modulation signal mapping by subcarrier allocation control section 1302, subcarrier mapping sections 110a and 110c, and subcarrier mapping control section 2801.

As shown in FIG. 48A, subcarrier allocation control section 1302 decides subcarriers to which a first subcarrier modulation signal is allocated and subcarriers to which a second subcarrier modulation signal is allocated.

As shown in FIG. 48B and FIG. 48C, subcarrier mapping control section 2801 distributes subcarrier mapping section 110c output based on a predetermined rule, and performs output to IFFT section 111a and IFFT section 111c.

Here, the second subcarrier modulation signal distribution ratio for IFFT section 111a and IFFT section 111b is changed based on subcarrier allocation control section 1302 information. For example, the smaller the number of first subcarrier modulation signals input to IFFT section 111a from subcarrier mapping section 110a, the higher the proportion of second subcarrier modulation signals output to IFFT section 111a is made. By this means, it is possible to prevent either one of the number of subcarrier modulation signals input to IFFT section 111a and the number of subcarrier modulation signals input to IFFT section 111b from greatly exceeding the other, enabling the PAPR to be reduced.

In addition to a first subcarrier modulation signal data signal from subcarrier mapping section 110a, a second subcarrier modulation signal data signal from subcarrier mapping control section 2801, a control signal from control signal generation section 112, and a pilot signal from pilot signal generation section 113 are input to IFFT section 111a. IFFT section 111a performs Ns-unit-size IFFT processing on these input signals.

Here, a pilot signal used for channel estimation on the receiving side is transmitted allocated to some or all of the subcarriers to which a first subcarrier modulation signal is mapped, and to some or all of the subcarriers to which a second subcarrier modulation signal from subcarrier mapping control section 2801 is mapped. By this means, when transmission is performed using a plurality of antennas, information as to which antenna a first or second subcarrier modulation signal is transmitted from need not be transmitted included in a control signal or the like. That is to say, reception processing can be performed appropriately on the receiving side by performing channel estimation using a pilot signal.

CP adding section 114a adds a CP (Cyclic Prefix) to an IFFT section 111a output signal. RF transmission section 115a executes predetermined radio transmission processing such as up-conversion and transmission power control on a signal output from CP adding section 114a, and sends a post-processing signal to antenna 116a.

Meanwhile, in addition to a second subcarrier modulation signal data signal from subcarrier mapping control section 2801, a control signal from control signal generation section 112 and a pilot signal from pilot signal generation section 113 are input to IFFT section 111c. IFFT section 111c performs Ns-unit-size IFFT processing on these input signals.

Here, a pilot signal used for channel estimation on the receiving side is transmitted allocated to some or all of the subcarriers to which a second subcarrier modulation signal is mapped. By this means, when transmission is performed using a plurality of antennas, information as to which antenna a first or second subcarrier modulation signal is transmitted from need not be transmitted included in a control signal or the like. That is to say, reception processing can be performed appropriately on the receiving side by performing channel estimation using a pilot signal.

CP adding section 114c adds a CP (Cyclic Prefix) to an IFFT section 111c output signal. RF transmission section 115c executes predetermined radio transmission processing such as up-conversion and transmission power control on a signal output from CP adding section 114c, and sends a post-processing signal to antenna 116c.

A control signal from control signal generation section 112 may be transmitted using either IFFT section 111a or IFFT section 111c.

By means of the above configuration, it is possible for transmitting apparatus 2800 to transmit subcarrier signals mapped to different frequency subcarriers using a plurality of antennas. Also, transmitting apparatus 2800 transmits a subcarrier modulation signal allocated to a first subcarrier modulation signal from one antenna, and distributes a subcarrier modulation signal allocated to a second subcarrier modulation signal and transmits it from a different antenna. By this means, since a property of a PAPR stipulated by an IFFT section output signal is to be decreased by a reduction in the number of input subcarriers, it is possible to further reduce the PAPR of a second subcarrier modulation signal while maintaining a low first subcarrier modulation signal PAPR.

Furthermore, in transmitting apparatus 2800, when the ratio of first subcarrier modulation signals and second subcarrier modulation signals is changed by subcarrier allocation control section 1302 in line with transmission power, also, the number of subcarrier modulation signals input to IFFT section 111a and the number of subcarrier modulation signals input to IFFT section 111c are adjusted by subcarrier mapping control section 2801 based on subcarrier allocation control section 1302 information, enabling the PAPR to be reduced.

In this embodiment, a case has been described in which transmitting apparatus 2800 is provided in a terminal and performs uplink transmission, but it is also possible to apply this embodiment to a case in which a transmitting apparatus that transmits a signal in which first and second subcarrier modulation signals are mixed is provided in a base station (that is, a case in which a signal in which first and second subcarrier modulation signals are mixed is transmitted in downlink), as described in Embodiment 2.

(Embodiment 1)

Figure 53:
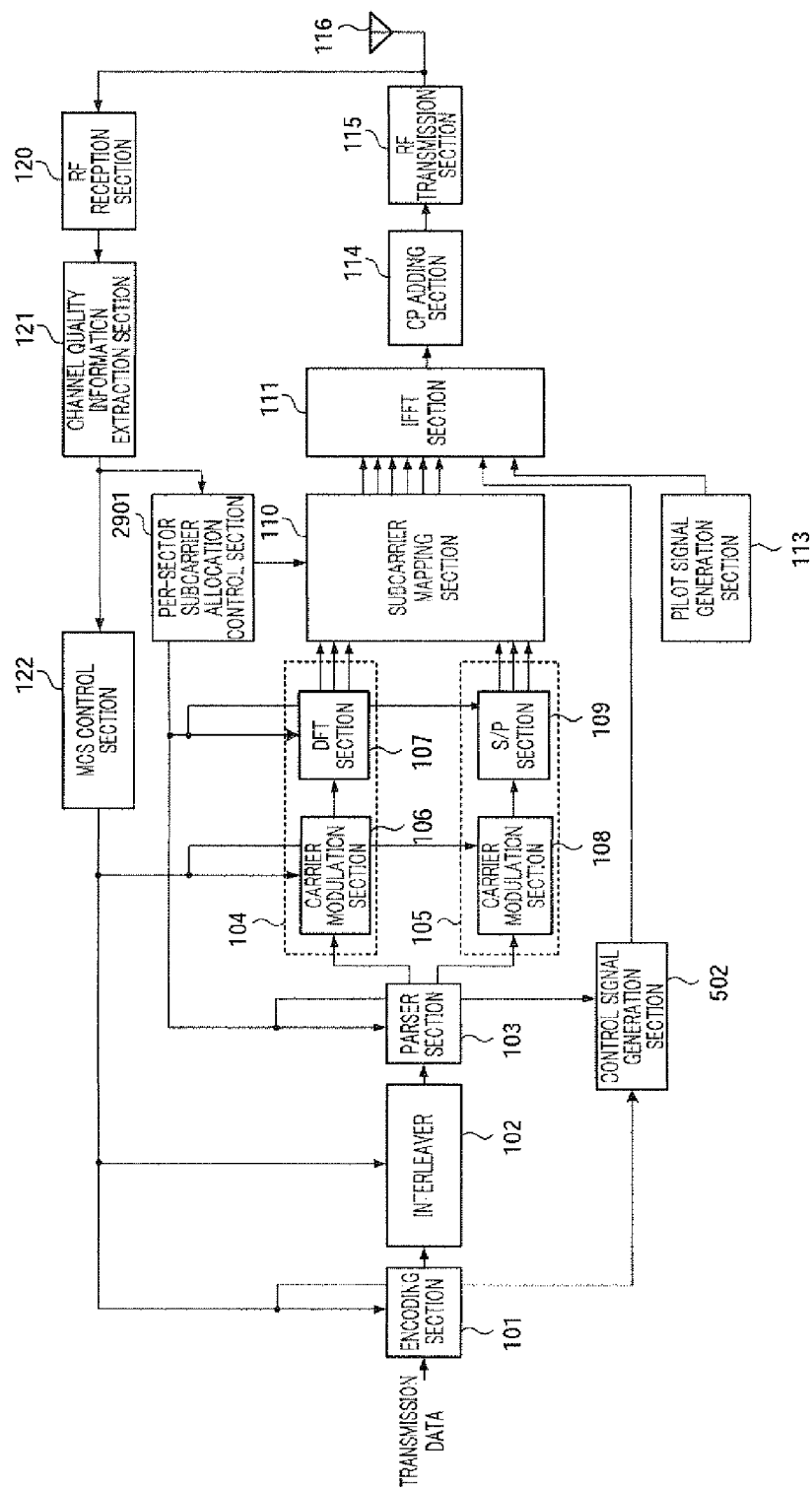
FIG. 53 is a block diagram showing a configuration of a transmitting apparatus of Embodiment 16.

FIG. 53, in which parts corresponding to those in FIG. 10 described in Embodiment 2 are assigned the same reference codes as in FIG. 10, shows the configuration of transmitting apparatus 2900 of this embodiment. Transmitting apparatus 2900 is provided in a base station.

Only configuration parts that differ from Embodiment 2 (FIG. 10) are described below.

Transmitting apparatus 2900 has per-sector subcarrier allocation control section 2901. Per-sector subcarrier allocation control section 2901 controls whether a first subcarrier modulation signal is allocated or a second subcarrier modulation signal is allocated on a sector-by-sector basis.

Channel quality information extraction section 121 of transmitting apparatus 2900 extracts channel quality information transmitted from a receiving apparatus (terminal) from a received signal. The channel quality information is output to MCS control section 122 and per-sector subcarrier allocation control section 2901.

Per-sector subcarrier allocation control section 2901 controls whether a first subcarrier modulation signal is allocated or a second subcarrier modulation signal is allocated on a sector-by-sector basis, in accordance with a previously established allocation rule. According to this allocation rule, different subcarrier modulation signals are used in adjacent sectors. That is to say, when a first subcarrier modulation signal is allocated and transmitted in a first sector, a second subcarrier modulation signal is allocated and transmitted in a second sector adjacent to the first sector. By this means, interference from or to another sector can be whitened.

This is because, when the same subcarriers are used in adjacent sectors, the relationship to a signal of a sector to which a first subcarrier modulation signal has been allocated of a signal of a sector to which a second subcarrier modulation signal has been allocated is as follows. Namely, for a subcarrier modulation signal transmitted by a base station, in the case of the former a first subcarrier modulation signal is transmitted as a time domain signal, whereas for the latter a second subcarrier modulation signal is transmitted as a frequency domain signal. Due to this relationship, since a whitened frequency domain signal (or nearly whitened signal) inflicts interference on a time domain signal, and interference is whitened to a greater extent than when the same subcarrier modulation signals are transmitted between sectors, the effect of that interference can be reduced. As a result, infliction and reception of interference between sectors can be reduced.

Based on the channel quality information, per-sector subcarrier allocation control section 2901 also decides which subcarriers in the transmission band are to be used by transmitting apparatus 2900 when transmitting. In addition, per-sector subcarrier allocation control section 2901 outputs a selection result as to which of a first subcarrier modulation signal or a second subcarrier modulation signal is to be used to parser section 103 and subcarrier mapping section 110.

Control signal generation section 502 generates a control signal including subcarrier allocation information and information on an MCS allocated to a subcarrier (MCS information) for reporting to the receiving apparatus.

Figure 54:
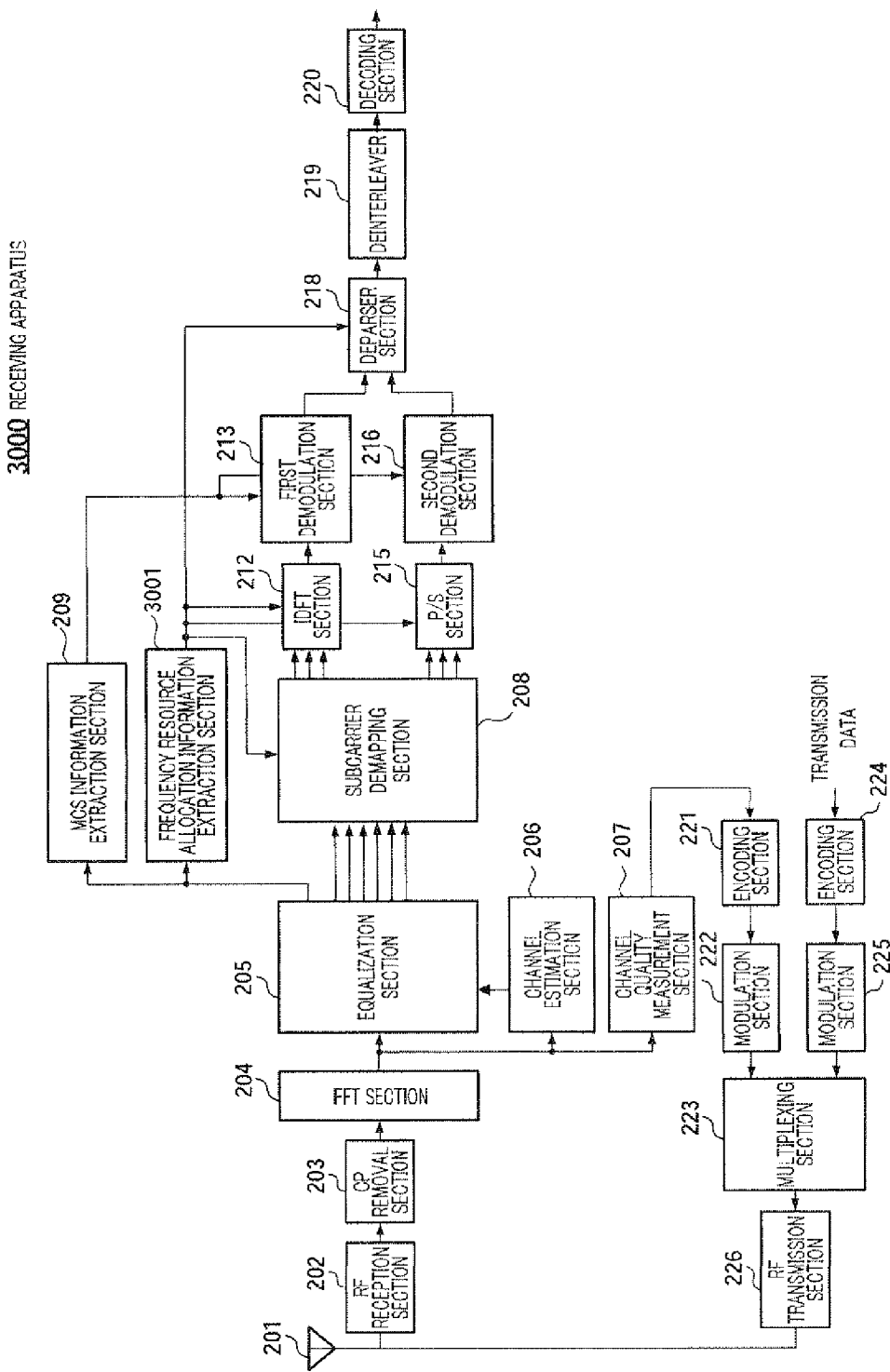
FIG. 54 is a block diagram showing a configuration of a receiving apparatus of Embodiment 16.

FIG. 54, in which parts corresponding to those in FIG. 5 are assigned the same reference codes as in FIG. 5, shows a configuration of a receiving apparatus of this embodiment. Receiving apparatus 3000 is provided in a terminal.

Frequency resource allocation information extraction section 3001 extracts frequency resource allocation information included in a control signal transmitted by transmitting apparatus 2900. Frequency resource allocation information is information indicating which subcarrier modulation signal, a first or second, has been mapped to which subcarriers.

Frequency resource allocation information extraction section 3001 sends extracted frequency resource allocation information to subcarrier mapping section 208, IDFT section 212, P/S section 215, and deparser section 218.

According to this embodiment, the same kind of effect can be obtained as with Embodiment 1. Also, using different subcarrier modulation signals for adjacent sectors enables interference from or to another sector to be whitened. As a result, infliction and reception of interference between sectors can be reduced.

In this embodiment, a case has been described in which transmitting apparatus 2900 is provided in a base station and performs downlink transmission, but it is also possible to apply this embodiment to a case in which a transmitting apparatus that transmits either a first or second subcarrier modulation signal is provided in a terminal apparatus (that is, a case in which transmission is performed in downlink), as described in Embodiment 1. In this case, per-sector subcarrier allocation control section 2901 should decide whether a first subcarrier modulation signal is used or a second subcarrier modulation signal is used according to which sector the terminal belongs to. By this means, inter-sector interference can be reduced in the same way as when transmitting apparatus 2900 is provided in a base station.

The disclosures of Japanese Patent Application No. 2007-77887, filed on Mar. 23, 2007, Japanese Patent Application No. 2007-270647, filed on Oct. 17, 2007, and Japanese Patent Application No. 2008-70074, filed on Mar. 18, 2008, including the specifications, drawings and abstracts, are incorporated herein by reference in their entirety.

Industrial Applicability

A radio transmitting apparatus and radio receiving apparatus of the present invention add innovation to layered modulation technology and can flexibly respond to a demand for securement of an error rate characteristic when using a high transmission rate, and for an increase in cell coverage, and can be widely applied to radio communication equipment such as mobile phones, their base stations, and the like, for example.

The invention claimed is:

1. A radio transmitting apparatus that transmits a layered-modulated OFDM signal, the radio transmitting apparatus comprising:
    a first subcarrier modulation section that forms a first subcarrier modulation signal obtained by converting a plurality of modulation signals to a frequency domain;
    a second subcarrier modulation section that forms a second subcarrier modulation signal obtained by parallel conversion of a plurality of modulation signals;
    an inverse Fourier transform section that forms an OFDM signal by performing an inverse Fourier transform on the first and second subcarrier modulation signals;
    a subcarrier mapping section that is provided ahead of the inverse Fourier transform section and controls allocation of the first and second subcarrier modulation signals to a plurality of subcarriers forming the OFDM signal; and
    a section that performs variable control of proportions of the first subcarrier modulation signal and the second subcarrier modulation signal included in the OFDM signal.

2. The radio transmitting apparatus according to claim 1, wherein the second subcarrier modulation section modulates a signal having a higher degree of importance than a signal modulated by the first subcarrier modulation section.

3. The radio transmitting apparatus according to claim 1, further comprising a section that performs variable control, according to transmission power, of proportions of the first subcarrier modulation signal and the second subcarrier modulation signal included in the OFDM signal.

4. The radio transmitting apparatus according to claim 1, wherein a low-rate signal is allocated preferentially to the first subcarrier modulation section.

5. The radio transmitting apparatus according to claim 1, wherein a high-rate signal is allocated preferentially to the second subcarrier modulation section.

6. The radio transmitting apparatus according to claim 1, wherein the subcarrier mapping section, when performing space multiplex transmission among a plurality of the radio transmitting apparatuses, allocates the first and second subcarrier modulation signals to a common subcarrier for another radio transmitting apparatus.

7. The radio transmitting apparatus according to claim 1 that is a radio transmitting apparatus that performs automatic retransmission request control in packet units, further comprising:
    a retransmission request detection section that detects a retransmission request reported from a receiving apparatus, and a number of retransmission requests that is a number of times the retransmission request has been reported; and
    a subcarrier allocation control section that variably controls allocation to and placement on the plurality of subcarriers of the first and second subcarrier modulation signals by the subcarrier mapping section according to the number of retransmission requests.

8. The radio transmitting apparatus according to claim 7, further comprising a subcarrier placement information storage section that stores in advance a plurality of items of information on placement on subcarriers of the first and second subcarrier modulation signals,
    wherein the subcarrier allocation control section selects subcarrier placement information used according to the number of retransmissions from among subcarrier placement information stored in the subcarrier placement information storage section, and performs allocation of the first and second subcarrier modulation signals based on selected subcarrier placement information.

9. The radio transmitting apparatus according to claim 8, further comprising a frequency resource allocation information detection section that detects subcarrier placement information of the first and second subcarrier modulation signals reported from a receiving apparatus,
    wherein the subcarrier allocation control section decides placement of allocated subcarriers of the first and second subcarrier modulation signals using the subcarrier placement information detected by the frequency resource allocation information detection section when the retransmission request detection section does not detect a retransmission request, and selects subcarrier placement information from the subcarrier placement information storage section and decides placement of allocated subcarriers of the first and second subcarrier modulation signals when the retransmission request detection section detects a retransmission request.

10. The radio transmitting apparatus according to claim 1 that is a radio transmitting apparatus that performs automatic retransmission request control in packet units, further comprising:
    a retransmission request detection section that detects a retransmission request reported from a receiving apparatus, and a number of retransmission requests that is a number of times the retransmission request has been reported;
    a subcarrier allocation control section that variably controls allocation to and placement on the plurality of subcarriers of the first and second subcarrier modulation signals by the subcarrier mapping section; and a transmission power control section that variably controls transmission power according to the number of retransmission requests, wherein the subcarrier allocation control section variably controls proportions of the first subcarrier modulation signal and the second subcarrier modulation signal included in the OFDM signal according to transmission power controlled by the transmission power control section.

11. The radio transmitting apparatus according to claim 1, further comprising a per-sector subcarrier allocation control section that controls whether a first subcarrier modulation signal is transmitted or a second subcarrier modulation signal is transmitted on a sector-by-sector basis.

12. A radio transmitting apparatus that transmits a layered-modulated OFDM signal, the radio transmitting apparatus comprising:

a first subcarrier modulation section that forms a first subcarrier modulation signal obtained by converting a plurality of modulation signals to a frequency domain;

a second subcarrier modulation section that forms a second subcarrier modulation signal obtained by parallel conversion of a plurality of modulation signals;

an inverse Fourier transform section that forms an OFDM signal by performing an inverse Fourier transform on the first and second subcarrier modulation signals; and a subcarrier mapping section that is provided ahead of the inverse Fourier transform section and controls allocation of the first and second subcarrier modulation signals to a plurality of subcarriers forming the OFDM signal, wherein a control signal is modulated using a previously stipulated subcarrier modulation section of the first and second subcarrier modulation sections.

13. A radio transmitting apparatus that transmits a layered-modulated OFDM signal, the radio transmitting apparatus comprising:

a first subcarrier modulation section that forms a first subcarrier modulation signal obtained by converting a plurality of modulation signals to a frequency domain;

a second subcarrier modulation section that forms a second subcarrier modulation signal obtained by parallel conversion of a plurality of modulation signals;

an inverse Fourier transform section that forms an OFDM signal by performing an inverse Fourier transform on the first and second subcarrier modulation signals;

a subcarrier mapping section that is provided ahead of the inverse Fourier transform section and controls allocation of the first and second subcarrier modulation signals to a plurality of subcarriers forming the OFDM signal; and a plurality of antennas, wherein the subcarrier mapping section allocates the first and second subcarrier modulation signals to a common subcarrier among antennas.

14. A radio transmitting apparatus that transmits a layered-modulated OFDM signal, the radio transmitting apparatus comprising:

a first subcarrier modulation section that forms a first subcarrier modulation signal obtained by converting a plurality of modulation signals to a frequency domain;

a second subcarrier modulation section that forms a second subcarrier modulation signal obtained by parallel conversion of a plurality of modulation signals;

an inverse Fourier transform section that forms an OFDM signal by performing an inverse Fourier transform on the first and second subcarrier modulation signals;

a subcarrier mapping section that is provided ahead of the inverse Fourier transform section and controls allocation of the first and second subcarrier modulation signals to a plurality of subcarriers forming the OFDM signal;

an encoder that executes error correction encoding processing on a transmission bit sequence; and a parser section that distributes output of the encoder to the first and second subcarrier modulation sections, wherein the first and second subcarrier modulation sections include a carrier modulation section that modulates a post-error-correction-encoding transmission bit sequence input from the parser section.

15. A radio transmitting apparatus that transmits a layered-modulated OFDM signal, the radio transmitting apparatus comprising:

a first subcarrier modulation section that forms a first subcarrier modulation signal obtained by converting a plurality of modulation signals to a frequency domain;

a second subcarrier modulation section that forms a second subcarrier modulation signal obtained by parallel conversion of a plurality of modulation signals;

an inverse Fourier transform section that forms an OFDM signal by performing an inverse Fourier transform on the first and second subcarrier modulation signals;

a subcarrier mapping section that is provided ahead of the inverse Fourier transform section and controls allocation of the first and second subcarrier modulation signals to a plurality of subcarriers forming the OFDM signal;

an encoder that executes error correction encoding processing on a transmission bit sequence;

an interleaver that interleaves output of the encoder; and a parser section that distributes output of the interleaver, wherein the first and second subcarrier modulation sections include a carrier modulation section that modulates a post-error-correction-encoding transmission bit sequence input from the parser section.

16. A radio transmitting apparatus that transmits a layered-modulated OFDM signal from first and second antennas, the radio transmitting apparatus comprising:

a first subcarrier modulation section that forms a first subcarrier modulation signal obtained by converting a plurality of modulation signals to a frequency domain;

a second subcarrier modulation section that faints a second subcarrier modulation signal obtained by parallel conversion of a plurality of modulation signals;

a first inverse Fourier transform section that forms an OFDM signal transmitted from the first antenna by performing an inverse Fourier transform on the first subcarrier modulation signal;

a second inverse Fourier transform section that forms an OFDM signal transmitted from the second antenna by performing an inverse Fourier transform on the second subcarrier modulation signal;

a first subcarrier mapping section that is provided ahead of the first inverse Fourier transform section and controls allocation of the first subcarrier modulation signal to a plurality of subcarriers forming the OFDM signal; and a second subcarrier mapping section that is provided ahead of the second inverse Fourier transform section and controls allocation of the second subcarrier modulation signal to a plurality of subcarriers forming the OFDM signal.

17. The radio transmitting apparatus according to claim 16, wherein the second subcarrier modulation section modulates a signal having a higher degree of importance than a signal modulated by the first subcarrier modulation section.

18. The radio transmitting apparatus according to claim 16, further comprising a subcarrier mapping control section that distributes the second subcarrier modulation signal to the first inverse Fourier transform section and the second inverse Fourier transform section.

19. The radio transmitting apparatus according to claim 18, further comprising a PAPR measurement section that measures a PAPR of output signals of the first and second inverse Fourier transform sections, wherein the subcarrier mapping control section changes a subcarrier mapping pattern of the second subcarrier modulation signal according to a measured PAPR.

20. The radio transmitting apparatus according to claim 18, wherein the subcarrier mapping control section changes a distribution proportion of the second subcarrier modulation signal input to the first inverse Fourier transform section according to a number of the first subcarrier modulation signals input to the first inverse Fourier transform section.

* * * * *

UNITED STATES PATENT AND TRADEMARK OFFICE
CERTIFICATE OF CORRECTION

PATENT NO. : 8,265,182 B2
APPLICATION NO. : 12/532165
DATED : September 11, 2012
INVENTOR(S) : Takaaki Kishigami et al.

It is certified that error appears in the above-identified patent and that said Letters Patent is hereby corrected as shown below:

Title Page;

Item (56) References Cited, Other Publications, Page 2, first column, line 20, incorrectly reads:
"vol. com-19, No. 5, Oct. 1971, pp. 628-634, p. 2, line 16"
and should read:
"vol. com-19, No. 5, Oct. 1971, pp. 628-634".

Item (56) References Cited, Other Publications, Page 2, second column, line 3, incorrectly reads:
"Jul. 1982, pp. 1701-1719, p. 2, line 20"
and should read:
"Jul. 1982, pp. 1701-1719".

Item (56) References Cited, Other Publications, Page 2, second column, line 6, incorrectly reads:
"IEEE vol. com-33, No. 5, May 1985, pp. 385-393, p. 2, line 23"
and should read:
"IEEE vol. com-33, No. 5, May 1985, pp. 385-393".

Item (56) References Cited, Other Publications, Page 2, second column, line 9, incorrectly reads:
"1988, pp. 389-400, p. 2, line 27"
and should read:
"1988, pp. 389-400".

Signed and Sealed this
Second Day of July, 2013

Teresa Stanek Rea
*Acting Director of the United States Patent and Trademark Office*

Item (56) References Cited, Other Publications, Page 2, second column, lines 11-12, incorrectly reads:

"Access (UTRA)," 3GPP TR 25.814 v7.1.0, Sep. 2006, 132 pages, p. 2, line 30"

and should read:

"Access (UTRA)," 3GPP TR 25.814 v7.1.0, Sep. 2006, 132 pages".

Item (56) References Cited, Other Publications, Page 2, second column, line 14, incorrectly reads:

"Dec. 2006, 84 pages, p. 2, line 32"

and should read:

"Dec. 2006, 84 pages".

Item (56) References Cited, Other Publications, Page 2, second column, line 17, incorrectly reads:

"42bis, R1-051167, Oct. 2005, 22 pages, p. 2, line 34"

and should read:

"42bis, R1-051167, Oct. 2005, 22 pages".

In the Claims:

Claim 16, column 50, line 54 incorrectly reads:

"a second subcarrier modulation section that faints a second"

and should read:

"a second subcarrier modulation section that forms a second".